US012066786B2

(12) United States Patent
Kamoshida et al.

(10) Patent No.: US 12,066,786 B2
(45) Date of Patent: Aug. 20, 2024

(54) CARTRIDGE AND DRUM UNIT FOR ELECTROPHOTOGRAPHIC IMAGE FORMING APPARATUS

(71) Applicant: CANON KABUSHIKI KAISHA, Tokyo (JP)

(72) Inventors: Shigemi Kamoshida, Tokyo (JP); Takeshi Arimitsu, Odawara (JP); Isao Koishi, Yokohama (JP); Yusuke Niikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/098,766

(22) Filed: Jan. 19, 2023

(65) Prior Publication Data

US 2023/0161289 A1 May 25, 2023

Related U.S. Application Data

(60) Division of application No. 17/504,626, filed on Oct. 19, 2021, now abandoned, which is a division of (Continued)

(30) Foreign Application Priority Data

Sep. 12, 2013 (JP) ................................ 2013-188917
Sep. 9, 2014 (JP) ................................ 2014-183708

(51) Int. Cl.
*G03G 21/16* (2006.01)
*G03G 21/18* (2006.01)

(52) U.S. Cl.
CPC ..... *G03G 21/1671* (2013.01); *G03G 21/1676* (2013.01); *G03G 21/1853* (2013.01)

(58) Field of Classification Search
CPC .......... G03G 21/1671; G03G 21/1676; G03G 21/1853; G03G 15/757
See application file for complete search history.

(56) References Cited

U.S. PATENT DOCUMENTS 5,946,531 A 8/1999 Miura et al.
5,983,054 A 11/1999 Kameyama
(Continued)

FOREIGN PATENT DOCUMENTS

CN 1346077 A 4/2002
CN 101114145 A 1/2008
(Continued)

OTHER PUBLICATIONS

Jul. 4, 2023 Office Action in Japanese Patent Application Pub. No. 2022-138961 (with English translation).
(Continued)

*Primary Examiner* — Sandra Brase
(74) *Attorney, Agent, or Firm* — Venable LLP

(57) ABSTRACT

A cartridge includes a photosensitive drum having a rotational axis about which the photosensitive drum is rotatable, a developing roller having a rotational axis about which the developing roller is rotatable, and a casing rotatably supporting the photosensitive drum and the developing roller. The coupling member is operatively connected to the photosensitive drum, with the coupling member including at least one projection capable of receiving a rotational force to rotate the photosensitive drum. A spring is provided with a movable part that is movable relative to the casing in a direction away from the rotational axis of the developing roller to urge the coupling member so that at least the projection of the coupling member moves away from the rotational axis of the developing roller.

39 Claims, 32 Drawing Sheets

Related U.S. Application Data application No. 16/867,657, filed on May 6, 2020, now Pat. No. 11,199,807, which is a division of application No. 16/052,060, filed on Aug. 1, 2018, now Pat. No. 10,671,015, which is a division of application No. 15/697,610, filed on Sep. 7, 2017, now Pat. No. 10,203,652, which is a division of application No. 15/052,192, filed on Feb. 24, 2016, now Pat. No. 9,791,825, which is a continuation of application No. PCT/JP2014/074754, filed on Sep. 11, 2014.

(56) References Cited

U.S. PATENT DOCUMENTS

| | | | |
|---|---|---|---|
| 6,002,896 | A | 12/1999 | Miyamoto et al. |
| 6,029,032 | A | 2/2000 | Watanabe et al. |
| 6,055,406 | A | 4/2000 | Kawai et al. |
| 6,061,538 | A | 5/2000 | Arimitsu et al. |
| 6,175,706 | B1 | 1/2001 | Watanabe et al. |
| 6,282,390 | B1 | 8/2001 | Miyabe et al. |
| 6,336,017 | B1 | 1/2002 | Miyamoto et al. |
| 6,351,620 | B1 | 2/2002 | Miyabe et al. |
| 6,442,359 | B1 | 8/2002 | Numagami et al. |
| 6,459,869 | B2 | 10/2002 | Nittani et al. |
| 6,463,234 | B2 | 10/2002 | Arimitsu et al. |
| 6,493,527 | B1 | 12/2002 | Higeta et al. |
| 6,684,041 | B2 | 1/2004 | Yokomori et al. |
| 6,859,629 | B2 | 2/2005 | Miura et al. |
| 6,898,399 | B2 | 5/2005 | Morioka et al. |
| 6,934,489 | B2 | 8/2005 | Yokomori et al. |
| 6,947,686 | B2 | 9/2005 | Kawal et al. |
| 6,968,142 | B2 | 11/2005 | Arimitsu et al. |
| 6,983,114 | B2 | 1/2006 | Arimitsu |
| 7,003,247 | B2 | 2/2006 | Koishi et al. |
| 7,039,339 | B2 | 5/2006 | Yokomori et al. |
| 7,046,942 | B2 | 5/2006 | Arimitsu et al. |
| 7,072,601 | B2 | 7/2006 | Kakitani et al. |
| 7,079,787 | B2 | 7/2006 | Ogino et al. |
| 7,139,502 | B2 | 11/2006 | Koishi et al. |
| 7,155,140 | B2 | 12/2006 | Arimitsu et al. |
| 7,158,749 | B2 | 1/2007 | Ueno et al. |
| 7,184,690 | B2 | 2/2007 | Ueno et al. |
| 7,200,349 | B2 | 4/2007 | Sato et al. |
| 7,283,766 | B2 | 10/2007 | Arimitsu et al. |
| 7,315,710 | B2 | 1/2008 | Ueno et al. |
| 7,457,566 | B2 | 11/2008 | Koishi et al. |
| 7,813,671 | B2 | 10/2010 | Nittani et al. |
| 7,856,192 | B2 | 12/2010 | Koishi et al. |
| 7,890,012 | B2 | 2/2011 | Koishi et al. |
| 7,978,999 | B2 | 7/2011 | Kamimura |
| 8,139,979 | B2 | 3/2012 | Koishi et al. |
| 8,208,830 | B2 | 6/2012 | Uratani et al. |
| 8,526,841 | B2 | 9/2013 | Koishi et al. |
| 8,731,439 | B2 | 5/2014 | Kamimura |
| 8,862,015 | B2 | 10/2014 | Koishi et al. |
| 8,867,962 | B2 | 10/2014 | He |
| 9,134,669 | B2 | 9/2015 | Sato et al. |
| 9,791,825 | B2 | 10/2017 | Kamoshida et al. |
| 10,203,652 | B2 | 2/2019 | Kamoshida et al. |
| 10,671,015 | B2 | 6/2020 | Kamoshida et al. |
| 2001/0022902 | A1 | 9/2001 | Nittani et al. |
| 2001/0036373 | A1 | 11/2001 | Higeta et al. |
| 2002/0018666 | A1 | 2/2002 | Noda et al. |
| 2002/0025191 | A1 | 2/2002 | Kitayama |
| 2002/0061205 | A1 | 5/2002 | Tsuda et al. |
| 2006/0120755 | A1 | 6/2006 | Saiki |
| 2008/0138115 | A1 | 6/2008 | Chadani et al. |
| 2008/0152388 | A1 | 6/2008 | Ueno et al. |
| 2008/0170880 | A1 | 7/2008 | Hashimoto |
| 2008/0260428 | A1 | 10/2008 | Ueno et al. |
| 2009/0159970 | A1 | 6/2009 | Ichijo |
| 2009/0317129 | A1 | 12/2009 | Abe et al. |
| 2009/0317131 | A1 | 12/2009 | Morioka et al. |
| 2009/0317132 | A1 | 12/2009 | Asanuma et al. |
| 2009/0317134 | A1 | 12/2009 | Miyabe et al. |
| 2010/0034561 | A1 | 2/2010 | Batori et al. |
| 2010/0054778 | A1 | 3/2010 | Adachi et al. |
| 2010/0054823 | A1 | 3/2010 | Takasaka et al. |
| 2010/0221036 | A1 | 9/2010 | Hara et al. |
| 2011/0020031 | A1 | 1/2011 | Sato et al. |
| 2011/0038649 | A1 | 2/2011 | Miyabe |
| 2011/0058848 | A1 | 3/2011 | Takayama |
| 2011/0091239 | A1 | 4/2011 | Ueno et al. |
| 2011/0098452 | A1 | 4/2011 | Roy et al. |
| 2011/0103812 | A1 | 5/2011 | Takasaka et al. |
| 2011/0217073 | A1 | 9/2011 | He |
| 2011/0311261 | A1 | 12/2011 | Yamashita et al. |
| 2012/0070187 | A1 | 3/2012 | Takeuchi et al. |
| 2012/0121294 | A1 | 5/2012 | Kamimura |
| 2012/0201566 | A1 | 8/2012 | Abe et al. |
| 2012/0243905 | A1 | 9/2012 | Uratani et al. |
| 2013/0051841 | A1 | 2/2013 | Ohyama et al. |
| 2013/0085073 | A1 | 4/2013 | Meuleman et al. |
| 2013/0114971 | A1 | 5/2013 | Sasaki et al. |
| 2013/0209137 | A1 | 8/2013 | Hayashi et al. |
| 2013/0322924 | A1 | 12/2013 | Kondo et al. |
| 2014/0064784 | A1 | 3/2014 | Hayashi et al. |
| 2014/0147168 | A1 | 5/2014 | Morioka et al. |
| 2014/0270845 | A1 | 9/2014 | Kawakami et al. |
| 2015/0114870 | A1 | 4/2015 | Fujino et al. |
| 2015/0220020 | A1 | 8/2015 | Hayashi et al. |
| 2015/0277370 | A1 | 10/2015 | Maeshima et al. |
| 2016/0154376 | A1 | 6/2016 | Xiao et al. |
| 2016/0246250 | A1 | 8/2016 | Kamoshida et al. |

FOREIGN PATENT DOCUMENTS

| | | | |
|---|---|---|---|
| CN | 101308344 | A | 11/2008 |
| CN | 101568887 | | 10/2009 |
| CN | 101583910 | A | 11/2009 |
| CN | 101595433 | A | 12/2009 |
| CN | 101609298 | A | 12/2009 |
| CN | 101609299 | A | 12/2009 |
| CN | 2010-002690 | A | 1/2010 |
| CN | 201434968 | Y | 3/2010 |
| CN | 201537527 | U | 8/2010 |
| CN | 101819400 | A | 9/2010 |
| CN | 201607611 | A | 10/2010 |
| CN | 102037417 | A | 4/2011 |
| CN | 102053528 | | 5/2011 |
| CN | 102057333 | A | 5/2011 |
| CN | 102067043 | | 5/2011 |
| CN | 102067044 | A | 5/2011 |
| CN | 102067045 | A | 5/2011 |
| CN | 102076705 | A | 5/2011 |
| CN | 102109806 | A | 6/2011 |
| CN | 102132219 | A | 7/2011 |
| CN | 202033585 | U | 11/2011 |
| CN | 102289171 | A | 12/2011 |
| CN | 102323731 | A | 1/2012 |
| CN | 102385299 | A | 3/2012 |
| CN | 102411295 | A | 4/2012 |
| CN | 102466998 | A | 5/2012 |
| CN | 102467057 | A | 5/2012 |
| CN | 102955401 | A | 3/2013 |
| CN | 103092047 | A | 5/2013 |
| CN | 103149824 | A | 6/2013 |
| CN | 103246194 | A | 8/2013 |
| CN | 103279022 | A | 9/2013 |
| CN | 103293897 | A | 9/2013 |
| CN | 103970002 | A | 8/2014 |
| EP | 2 365 401 | A2 | 9/2011 |
| EP | 2 790 065 | A | 10/2014 |
| JP | 109-237027 | A | 9/1997 |
| JP | H11-202727 | A | 7/1999 |
| JP | 2000-035743 | A | 2/2000 |
| JP | 2000-132065 | A | 5/2000 |
| JP | 2000-194248 | A | 7/2000 |
| JP | 2001-013852 | A | 1/2001 |
| JP | 2001-125471 | A | 5/2001 |
| JP | 2001-272901 | A | 10/2001 |
| JP | 2002-040875 | A | 2/2002 |
| JP | 2002-149038 | A | 5/2002 |

(56) References Cited

FOREIGN PATENT DOCUMENTS

| | | | |
|---|---|---|---|
| JP | 2002-156891 | A | 5/2002 |
| JP | 2003-114601 | A | 4/2003 |
| JP | 2005-300846 | A | 10/2005 |
| JP | 2007-128113 | A | 5/2007 |
| JP | 2008-233867 | A | 10/2008 |
| JP | 2008-268927 | A | 11/2008 |
| JP | 2010-079283 | A | 4/2010 |
| JP | 2011-059407 | A | 3/2011 |
| JP | 2011-095603 | A | 5/2011 |
| JP | 2011-133682 | A | 7/2011 |
| JP | 2011-145670 | A | 7/2011 |
| JP | 2012-155071 | A | 8/2012 |
| JP | 2012-133392 | A | 9/2012 |
| JP | 2013-122616 | A | 6/2013 |
| JP | 2013-164630 | A | 8/2013 |
| KR | 10-1998-0025029 | A | 7/1998 |
| KR | 10-1998-0025031 | A | 7/1998 |
| KR | 10-1998-0025034 | A | 7/1998 |
| KR | 10-2001-0100805 | A | 11/2001 |
| KR | 100383708 | B | 5/2003 |
| RU | 2 488 868 | C2 | 7/2013 |
| WO | 2008/078836 | | 7/2008 |
| WO | 2008/081966 | A1 | 7/2008 |
| WO | 2009/153890 | A | 12/2009 |
| WO | 2010/024457 | A1 | 3/2010 |
| WO | 2011/091639 | A1 | 8/2011 |
| WO | 2013/085073 | A1 | 6/2013 |

OTHER PUBLICATIONS

Substantive Examination Report in Philippines Patent Application No. 1/2016/500548, dated Jan. 20, 2023.
Notice of Allowance in Korean Patent Application No. 10-2023-7004956, dated Feb. 24, 2023.
Substantive Examination Adverse Report in Malaysian Patent Application No. PI2019004992, dated Mar. 20, 2023.
Jan. 28, 2022 Office Action in Chinese Patent Application No. 201910756388.0.
Mar. 11, 2022 Notice of Allowance in Korean Patent Application No. 10-2022-7006064.
Mar. 9, 2022 Office Action in Chinese Patent Application No. 201910756314.7 (with English translation).
Mar. 25, 2022 Examination Report in Australian Patent Application No. 2021203064.
Apr. 15, 2022 Office Action in Chinese Patent Application No. 201910756321.7.
May 7, 2022 Office Action in Chinese Patent Application No. 201910756394.6.
May 20, 2022 Office Action in Chinese Patent Application No. 201910756320.2.
Jun. 28, 2022 Notice of Allowance in Korean Patent Application No. 2022-7019754.
Aug. 15, 2022 Decision on Grant in Russian Patent Application No. 2022101121 (with English translation).
Aug. 18, 2022 Office Action in Taiwanese Patent Application No. 110145082.
Aug. 26, 2022 Office Action in Philippines Patent Application No. Jan. 2016/500458.
Sep. 30, 2022 Notice of Allowance in Chinese Patent Application No. 201910758109.4.
Nov. 10, 2022 Notice fo Allowance in Korean Patent Application Pub. No. 10-2022-7034016.
Dec. 1, 2022 Notice of Acceptance in Australian Patent Application No. 2021203064.
Dec. 13, 2022 Extended Search Report in European Patent Application No. 22 176 112.5.
English translation of Japanese Patent Application Pub. No. 2001-013852 A.
English translation of Japanese Patent Application Pub. No. 2003-114601 A.
English translation of Japanese Patent Application Pub. No. 2005-300846 A.
English translation of Chinese Patent Application Pub. No. 1038970002 A.
Substantive Examination Report in Philippines Patent Application No. 1/2016/500458, dated Jan. 20, 2023.
Office Action in Korean Patent Application No. 10-2016-7008847, dated Mar. 31, 2017.
Extended Search Report in European Patent Application No. 16 20 0236, issued Apr. 17, 2017.
Extended Search Report in European Patent Application No. 14 84 4462, issued in Apr. 17, 2017.
Office Action in Taiwanese Patent Application No. 103131583, dated Jun. 22, 2016.
International Search Report and Written Opinion for International Patent Application No. PCT/JP2014/074754, dated Dec. 16, 2014.
Examination Report in Canadian Patent Application No. 2,923,987, mailed Feb. 20, 2018.
Apr. 6, 2018 Office Action in Chilean Patent Application No. 201600526.
Notice of Allowance in Korean Patent Application No. 10-2018-7008847, mailed Jun. 19, 2018.
Office Action in Russian Patent Application No. 2016113714, dated Apr. 27, 2018 (with English translation).
Office Action in Taiwanese Patent Application No. 106103518, dated Jul. 19, 2018.
Examination Report in Australian Patent Application No. 2017216445, dated Aug. 6, 2018.
Decision on Grant in Russian Patent Application No. 2016113714, mailed Aug. 10, 2018 (with English translation).
Office Action in Colombia Patent Application No. 16088043, dated Sep. 4, 2018 (with English translation).
Office Action in Indonesian Patent Application No. P-00201601897, dated Oct. 17, 2018 (with English translation).
Office Action in Chilean Patent Application No. 201600526, dated Nov. 22, 2018.
Dec. 11, 2018 Office Action in Korean Patent Application No. 10-2018-7027176.
Office Action in Chinese Patent Application No. 201480050056.6, dated April 2, 2019 (with English translation)
Office Action in Indian Patent Application No. 201647012036, dated Apr. 29, 2019.
Decision on Grant in Russian Patent Application No. 2018136383, mailed Sep. 11, 2014 (with English translation).
Oct. 25, 2019 Office Action in Taiwanese Patent Application No. 107128854.
Nov. 17, 2019 Office Action in United Arab Emirates Patent Application No. 0264/2016.
Nov. 11, 2019 Decision to Grant in Russian Patent Application Pub. No. 2019118071 (with English translation).
Communication in European Patent Application No. 16 200 236.4, dated Jul. 22, 2019.
Notice of Allowance in Korean Patent Application No. 10-2018-7027176, mailed Aug. 8, 2019.
Office Action in Colombian Patent Application No. 16088043, dated Nov. 29, 2019 (with English translation).
Mar. 17, 2020 Office Action in Brazilian Patent Application No. BR112016004701-0 (with English translation).
May 28, 2020 Examination Report in Australian Patent Application No. 2019213328.
May 13, 2020 Decision to Grant in Russian Patent Application No. 2020100502 (with English translation).
Examination Report in Indonesian Patent Application No. P00201900516, mailed Sep. 24, 2020 (with English translation).
Sep. 11, 2020 Examination Report in Malaysian Patent Application No. PI 2016700846.
Oct. 30, 2020 Notice of Allowance in Korean Patent Application No. 10-2019-7033196.
Dec. 16, 2020 Decision on Grant in Russian Patent Application Pub. No. 2020123175.
Jan. 22, 2021 Extended Search Report in European Patent Application No. 20193253.0.

(56) References Cited

OTHER PUBLICATIONS

Dec. 22, 2022 Examination Report in United Arab Emirates (UAE) Patent Application No. P264/2016.
Notice of Allowance in Philippines Patent Application No. 1/2016/500458, dated May 12, 2023.
May 8, 2021 Office Action in Chinese Patent Application No. 201910758109.4 (with English translation).
May 21, 2021 Notice of Allowance in Australian Patent Application No. 2019213328.
Jun. 10, 2021 Office Action in Chinese Patent Application No. 201910756388.0 (with English translation).
Jun. 29, 2021 Office Action in Chinese Patent Application No. 201910756390.8 (with English translation).
Jun. 30, 2021 Office Action in Chinese Patent Application No. 201910756314.7 (with English translation).
Jul. 19, 2021 Office Action in Russian Patent Application No. 2021103832 (with English translation).
Jul. 6, 2021 Office Action in Philippines Patent Application No. 1/2016/500458.
Aug. 31, 2021 Official Action in Chinese Patent Application No. 201910756320.2.
Aug. 31, 2021 Official Action in Chinese Patent Application No. 201910756321.7.
Sep. 3, 2021 Official Action in Chinese Patent Application No. 201910756328.9.
Sep. 7, 2021 Taiwanese Search Report in Taiwanese Patent Application No. 109124811.
Sep. 1, 2021 Office Action in Chinese Patent Application No. 201910756394.6 (with English translation).
Sep. 3, 2021 Office Action in Chinese Patent Application No. 201910756318.5 (with English translation).
Nov. 22, 2021 Notice of Allowance in Korean Patent Application No. 10-2021-7003235.
Nov. 24, 2021 Decision to Grant in Russian Patent Application No. 2021103832 (with English translation).
Nov. 15, 2021 Office Action in Indian Patent Application No. 201948043525.
Jul. 24, 2023 Notice of Allowance in Korean Patent Application No. 10-2023-7017626.
Nov. 7, 2023 Search Report in United Arab Emirates Patent Application No. P6000136/2020.
Nov. 10, 2023 Examination Report in Australian Patent Application Pub. No. 2023201536.
May 28, 2024 Notice of Allowance in Taiwanese Patent Application No. 112119379.
Jun. 19, 2024 Notice of Allowance in Malaysian Patent Application No. PI2019004992.

(a)

(b)

(a)

(b)

(a)

(b)

CARTRIDGE AND DRUM UNIT FOR ELECTROPHOTOGRAPHIC IMAGE FORMING APPARATUS

TECHNICAL FIELD

The present invention relates to a cartridge and a drum unit usable for an electrophotographic type image forming apparatus such as a laser beam printer.

BACKGROUND ART

In the field of the electrophotographic type image forming apparatus, the structure is known in which elements such as a photosensitive drum and a developing roller as rotatable members contributable for image formation are unified as a cartridge which is detachably mountable to a main assembly of the image forming apparatus (main assembly). Here, in order to rotate the photosensitive drum in the cartridge, it is desirable to transmit a driving force thereto from the main assembly. It is known, for this purpose, to transmit the driving force through engagement between a coupling member of the cartridge and a driving force transmitting portion such as a drive pin of the main assembly side of the apparatus.

In some types of image forming apparatuses, a cartridge is demountable in a predetermined direction substantial perpendicular to a rotational axis of the photosensitive drum. In a known main assembly, the drive pin of the main assembly is moved in the rotational axis direction by an opening and closing operation of a cover of the main assembly. More particularly, a patent specification 1 discloses a structure in which a coupling member provided at an end portion of the photosensitive drum is pivotably relative to the rotational axis of the photosensitive drum. With this structure, the coupling member provided on the cartridge is engaged with the drive pin provided in the main assembly, by which the driving force is capable of being transmitted from the main assembly to the cartridge, as is known.

PRIOR ART REFERENCE

Japanese Laid-open Patent Application 2008-233867.

SUMMARY OF THE INVENTION

The present invention provides a further improvement of the above-described prior-art.

According to an aspect of the present invention, there is provided a cartridge mountable to a main assembly of an electrophotographic image forming apparatus, said coupling member comprising a pivotable coupling member, wherein the main assembly including a rotatable engaging portion for engaging with said coupling member, and a coupling guide, positioned downstream of a rotational axis of the engaging portion with respect to a mounting direction of said cartridge, for being contacted by said coupling member pivoted relative to the rotational axis of the engaging portion to guide said coupling member to be parallel with the rotational axis of the engaging portion, said cartridge being mountable to the main assembly in the mounting direction substantially perpendicular to the rotational axis of the engaging portion, said cartridge comprising a frame; a rotatable member for carrying a developer; and a rotatable force receiving member for receiving a rotational force to be transmitted to said rotatable member; said coupling member including a free end portion having a receiving portion for receiving the rotational force from the engaging portion and a connecting portion having a transmitting portion for transmitting the rotational force received by said receiving portion to said force receiving member, said frame including a hole portion for exposing said free end portion to an outside of said frame, and a receiving portion, provided in a downstream of said hole portion with respect to the mounting direction, for receiving said coupling member when said coupling member is inclined toward a downstream side with respect to the mounting direction and for receiving said coupling guide in place of said coupling member with engagement of said coupling member with the engaging portion.

According to another aspect of the present invention, there is provided a drum unit dismountable from a main assembly of an electrophotographic image forming apparatus by moving in a predetermined direction substantially perpendicular to a rotational axis of an engaging portion rotatably provided in the main assembly, wherein a rotatable coupling member is mountable to said drum unit, the coupling including a free end portion having a receiving portion for receiving a rotational force from said engaging portion, and a connecting portion having a transmitting portion for transmitting the rotational force received by said receiving portion, said connecting portion being provided with a through-hole, wherein said coupling member is mountable to said drum unit by holding opposite end portions of a shaft penetrating the through-hole, said drum unit comprising a cylinder having a photosensitive layer; and a flange mounted to an end portion of said cylinder, said flange being provided with an accommodating portion capable of accommodating the connecting portion and capable of pivotably holding coupling member, an annular groove portion in said accommodating portion outside with respect to a radial direction of said cylinder, and a holding portion for holding the opposite end portions of the shaft penetrating said through-hole, wherein said groove portion and said holding portion overlap along a rotational axis direction of said cylinder.

EMBODIMENTS FOR CARRYING OUT THE INVENTION

Figure 1:
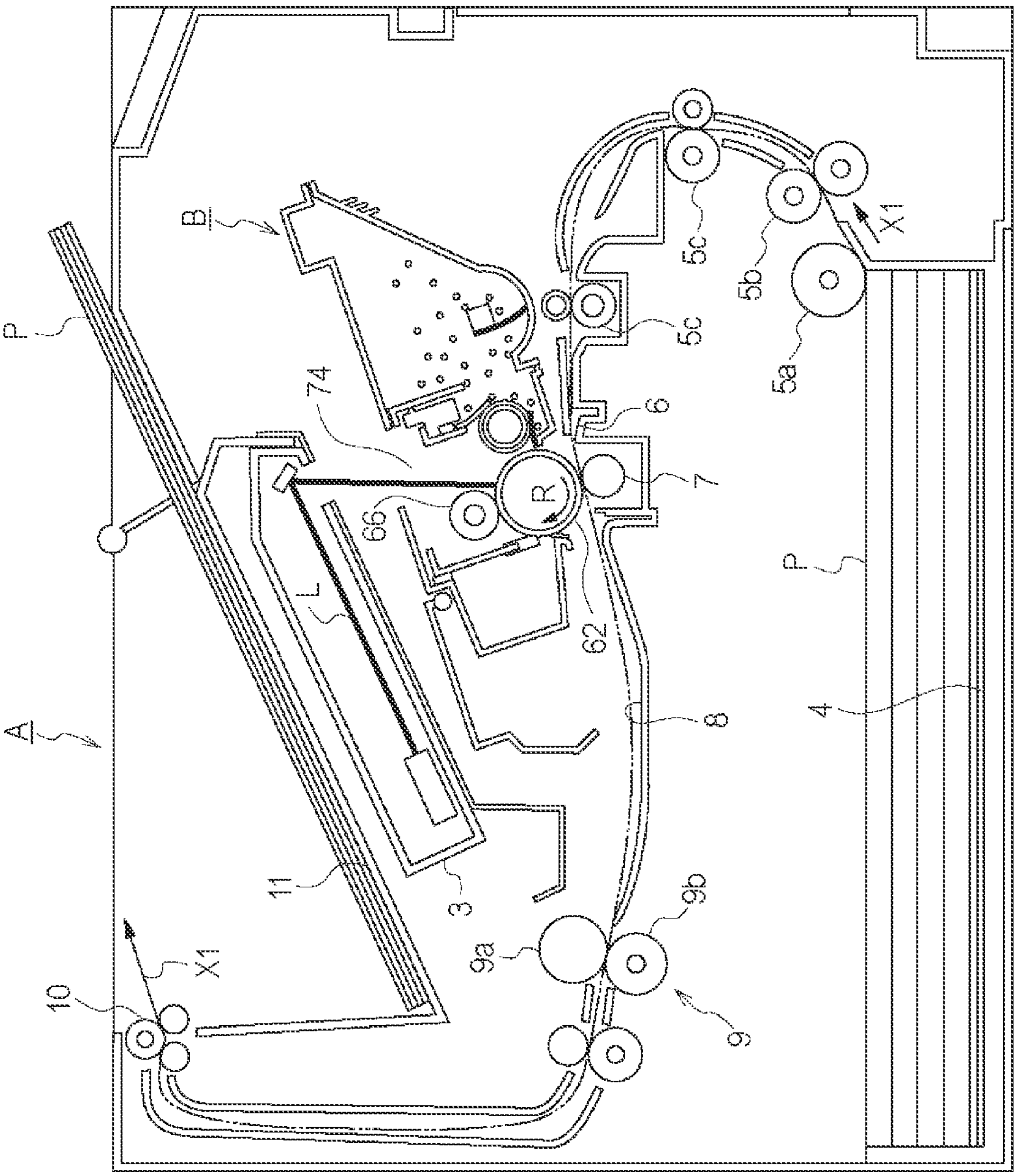
FIG. 1 is a sectional view of a main assembly of the image forming apparatus and a cartridge, according to an embodiment of the present invention.

Referring to the accompanying drawings, the embodiments of the present invention will be described.

Here, an electrophotographic image forming apparatus is an image forming apparatus using an electrophotographic type process. In the electrophotographic type process, an electrostatic image formed on a photosensitive member is developed toner. The developing system may be a one-component developing system, two-component developing system, dry type development or another system. An electrophotographic photosensitive drum comprises a drum configuration cylinder and a photosensitive layer thereon, usable with an electrophotographic type image forming apparatus.

A process means includes a charging roller, a developing roller and so on, which are actable on the photosensitive drum, for image formation. A process cartridge these cartridge including the photosensitive member or process means (cleaning blade, developing roller or the like) relating to the image formation. In the embodiment, a process cartridge comprises the photosensitive drum, the charging roller, the developing roller and the cleaning blade as a unit.

More particularly, it is a laser beam printer of the electrophotographic type widely usable as a multifunction machine, a facsimile machine, a printer or the like. Reference numeral or characters in the following descriptions are for referring to the drawings and do not limit the structure of the present invention. The dimensions or the like in the following descriptions are to clarify the relationships and do not limit the structure of the present invention.

A longitudinal direction of the process cartridge in the following description is a direction substantially perpendicular to a direction in which the process cartridge is mounted to the main assembly of the electrophotographic image forming apparatus. A longitudinal direction of the process cartridge is a direction parallel with a rotational axis of the electrophotographic photosensitive drum (direction crossing with a sheet feeding direction). A side of the process cartridge in the longitudinal direction thereof where the photosensitive drum receive a rotational force from the main assembly of the image forming apparatus is a driving side (driven side), and the opposite side is a non-driving side. In the following description, an upper part (upper side) is on the basis of the direction of gravity in the state that the image forming apparatus is installed, unless otherwise be described, and the opposite side is a lower part (lower side).

Embodiment 1

In the following, the laser beam printer according to this embodiment will be described in conjunction with the accompanying drawings. The cartridge in this embodiment comprises a photosensitive drum as a photosensitive member (image bearing member, rotatable member), and process means including a developing roller, a charging roller and a cleaning blade as a unit (process cartridge). The cartridge is detachably mountable to the main assembly. The cartridge is provided therein with a rotatable member (gear, photosensitive drum, flange, developing roller) which is rotatable by a rotational force from the main assembly Ad among them, a member for carrying and feeding a toner image is called carrying member.

Figure 2:
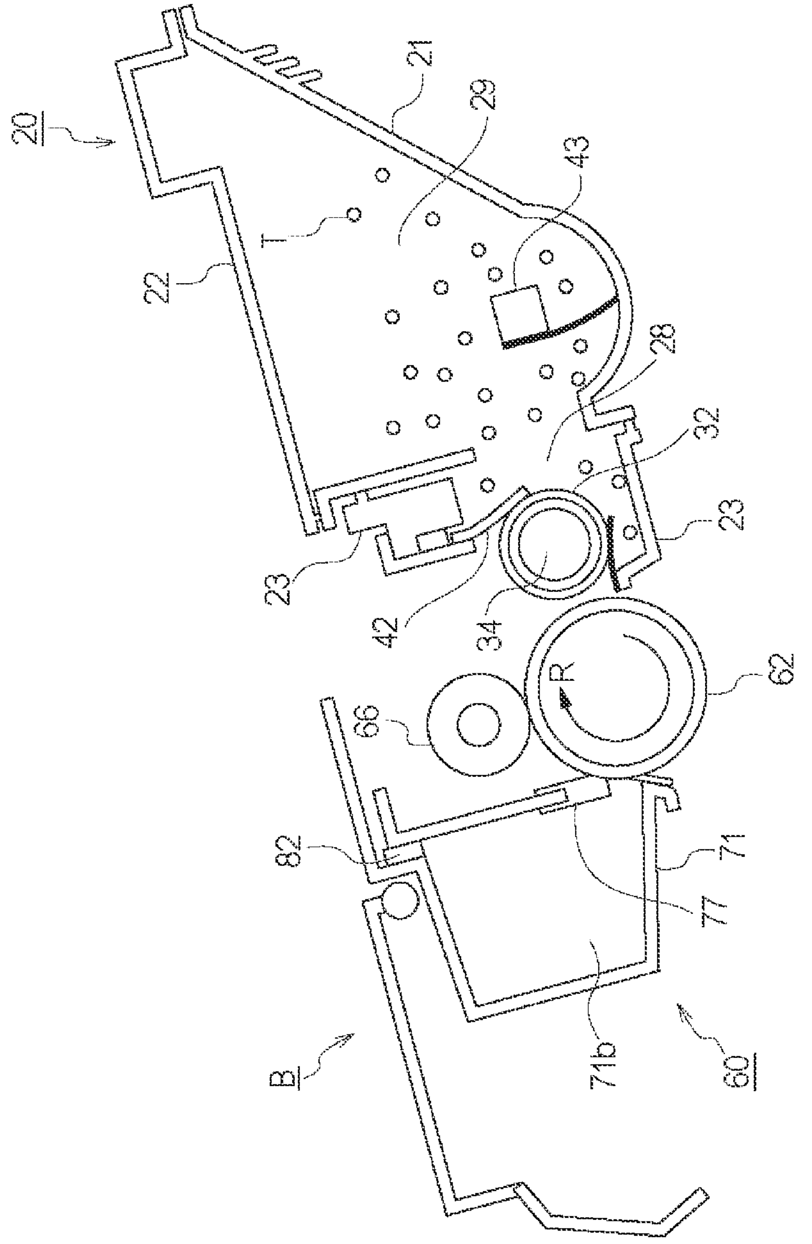
FIG. 2 is a sectional view of the cartridge according to the embodiment of the present invention.

Referring to FIGS. 1 and 2, a structure and an image forming process of the laser beam printer as the electrophotographic image forming apparatus will be described. And then, referring to FIGS. 3 and 4, the structure of the process cartridge will be described in detail.

1. Laser Beam Printer and Image Forming Process

FIG. 1 is a sectional view of a main assembly A of a laser beam printer (apparatus main assembly) which is an electrophotographic image forming apparatus and a process cartridge (cartridge B). FIG. 2 is a sectional view of the process cartridge B.

The main assembly A is portions of the laser beam printer other than the process cartridge B.

Referring to FIG. 1, the structure of the laser beam printer is an electrophotographic image forming apparatus will be described.

The electrophotographic image forming apparatus shown in FIG. 1 is a laser beam printer which uses electrophotographic technique and relative to a main assembly of which the process cartridge B is mountable and dismountable. When the process cartridge B is mounted to the apparatus main assembly A, the process cartridge B is disposed below a laser scanner unit 3 as exposure means (exposure device), with respect to the direction of gravity.

Below the process cartridge B, a sheet tray 4 accommodating sheets P (recording materials) on which images are formed by the image forming apparatus.

Furthermore, the apparatus main assembly A comprises a pick-up roller 5*a*, a feeding roller pair 5*b*, a feeding roller pair 5*c*, a transfer guide 6, a transfer roller 7, a feeding guide 8, a fixing device 9, a discharging roller pair 10 and a discharging tray 11, arranged in the order named from an upstream side along a sheet feeding direction X1. The fixing device 9 as fixing means comprises a heating roller 9*a* and a pressing roller 9*b*.

Referring to FIGS. 1 and 2, the image forming process will be described.

In response to a print starting signal, a rotatable photosensitive drum 62 (drum 62) is rotated at a predetermined peripheral speed (process speed) in an arrow R.

A charging roller 66 supplied with a bias voltage is contacted to an outer peripheral surface of the drum 62 to electrically charge the outer peripheral surface of the drum 62 uniformly.

The laser scanner unit 3 as exposure means outputs a laser beam L modulated in accordance with image information inputted to the laser beam printer. The laser beam L passes through an exposure window 74 provided in an upper surface of the process cartridge B and scanningly impinges on the outer peripheral surface of the drum 62. By this, a part on the charged photosensitive member is electrically discharged so that an electrostatic image (electrostatic latent image) is formed in the surface of the photosensitive drum.

On the other hand, as shown in FIG. 2, in a developing unit 20 as a developing device, a developer (toner T) in a toner chamber 29 is stirred and fed by a rotation of a feeding screw 43 as a feeding member into a toner supply chamber 28.

The toner T as the developer is carried on a surface of a developing roller 32 as developing means (process means, rotatable member) by a magnetic force of a magnet roller 34 (fixed magnet). The developing roller 32 functions as a rotatable member for carrying and feeding the developer into a developing zone to develop an electrostatic image formed on the photosensitive member. The toner T which is to be fed into the developing zone is regulated in a layer thickness on the peripheral surface of the developing roller 3, by a developing blade 42. The toner T is triboelectrically charged between the developing roller 32 and the developing blade 42.

The electrostatic image formed on the drum 62 is developed (visualized) by the toner T for carried on the surface of the developing roller. The drum 66 rotates in the direction of an arrow R, carrying a toner image provided by the development, As shown in FIG. 1, in timed relation with the output of the laser beam, the sheet P is fed out of the sheet tray 4 disposed in the lower portion of the apparatus main assembly A, the pick-up roller 5*a*, the feeding roller pair 5*b* and the feeding roller pair 5*c*.

The sheet P is supplied into a transfer position (transfer nip) which is between the drum 62 and the transfer roller 7, along the transfer guide 6. In the transfer position, the toner image is sequentially transferred from the drum 62 as the image bearing member onto the sheet P as the recording material.

The sheet P having the transferred toner image is separated from the drum 62 as the image bearing member and is fed to the fixing device 9 along the feeding guide 8. The sheet P passes through a fixing nip formed between the heating roller 9*a* and the pressing roller 9*b* in the fixing device 9. In the fixing nip, the unfixed toner image on the sheet P is pressed and heated so that it is fixed on the sheet P. Thereafter, the sheet P having the fixed toner image is fed by the discharging roller pair 10 and is discharged onto the discharging tray 11.

On the other hand, as shown in FIG. 2, on the surface of the drum 62 after the toner T is transferred onto the sheet, untransferred toner which has now been transferred onto the sheet remains on the drum surface. The untransferred toner is removed by a cleaning blade 77 contacting to the peripheral surface of the drum 62. By this, the toner remaining on the drum 62 is removed, and the cleaned drum 62 is charged again to be used for the next image forming process. The toner (untransferred toner) removed from the drum 62 is stored in a residual toner chamber 71*b* of a cleaning unit 60.

In this case, the charging roller 66, the developing roller 32 and the cleaning blade 77 function as process means acting on the drum 62. In the image forming apparatus of this embodiment, the untransferred toner is removed by the cleaning blade, but the present invention is applicable to a type (cleanerless type) In which the untransferred toner is adjusted in the electric charge and then collected simultaneously with the development by the developing device. In the cleanerless type, an assistance charging member (auxiliary charging brush or the like) for adjusting the electric charge of the untransferred toner also functions as the process means.

2. Structure of Process Cartridge

Figure 3:
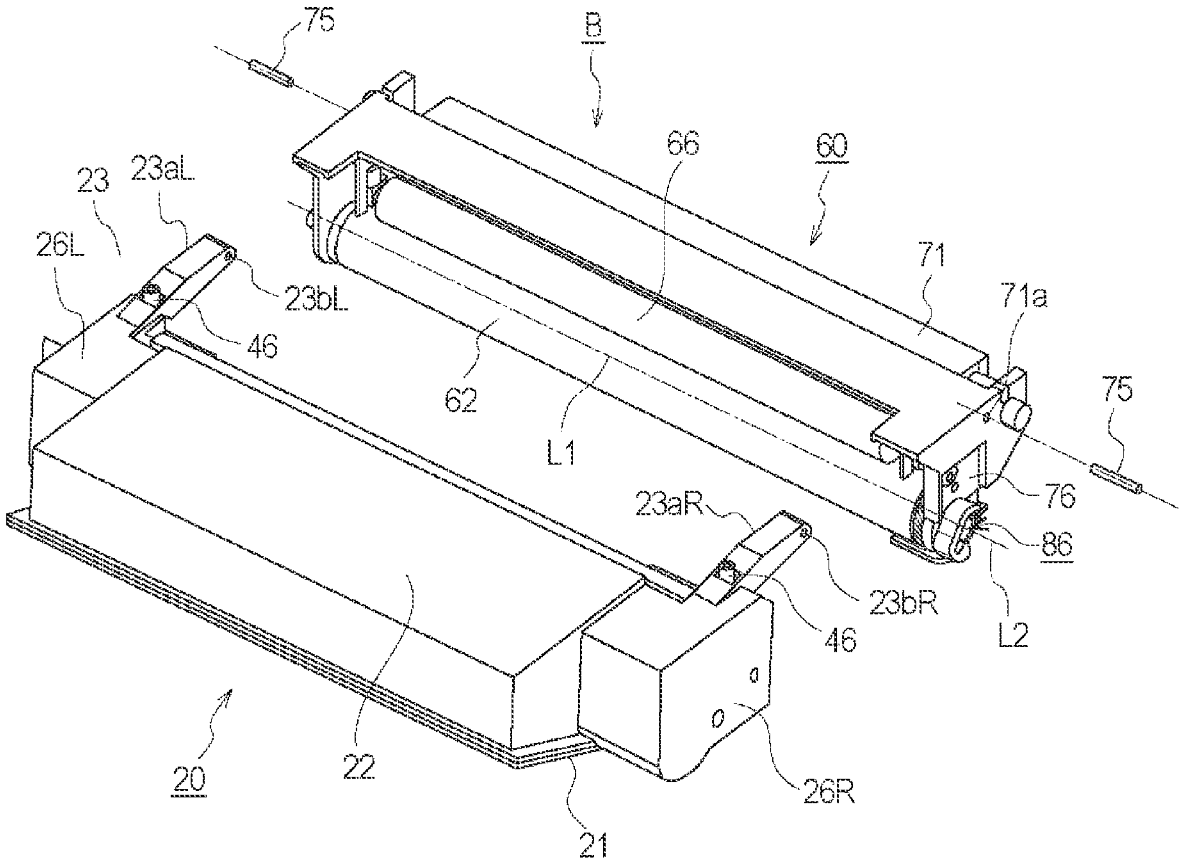
FIG. 3 is an exploded perspective view of the cartridge according to the embodiment.

Referring to FIGS. 2 and 3, the structure of the process cartridge B will be described in detail.

FIG. 3 is an exploded perspective view of the process cartridge B as the cartridge. A frame of the process cartridge can be disassembled into a plurality of units. In this embodiment, the process cartridge B comprises two units, namely the cleaning unit 60 and the developing unit 20. In this embodiment, the cleaning unit 60 including the drum 62 is connected with the developing unit 20 by two connection pins 75, but the present invention is not limited to such a case, and for example, three unit structure may be employed. The present invention is also applicable to such a case in which the units are not connected with coupling members such as pins, but a part of the units is exchangeable.

The cleaning unit 60 comprises a cleaning frame 71, the drum 62, the charging roller 66, the cleaning blade 77 and so on. A driving side end portion of the drum (cylinder) 62 as the rotatable member is provided with a coupling member 86 (coupling) as a driving force transmitting part. To the drum 62 as the rotatable member, a driving force is transmitted from the main assembly through the coupling member 86 (coupling). In other words, the coupling member 86 (coupling) as a drive transmission part is provided at the end portion (driven side end portion) where the drum 62 is driven by the apparatus main assembly A.

As shown in FIG. 3, the drum 62 (photosensitive drum) as the rotatable member is rotatable about a rotational axis L1 (axis L1) as the drum axis (rotational axis of the drum 62). The coupling member 86 as the driving force transmission member is rotatable about a rotational axis L2 (axis L2) as the coupling axis (rotational axis of the coupling). The coupling member 86 as the drive transmission member (driving force transmitting part) is inclinable (pivotable) relative to the drum 62. In other words, the axis L2 is inclinable relative to the axis L1, as will be described in detail hereinafter.

On the other hand, the developing unit 20 comprises a toner accommodating container 21, a closing member 22, a developing container 23, a first side member 26L (driving side), a second side member 26R (non-driving side), a developing blade 42, a developing roller 32 and a magnet roller 34. The toner container 21 contains toner T as the developer in this provided with a feeding screw 43 (stirring sheet) as a feeding member for feeding the toner. The developing unit 20 is provided with a spring (coil spring 46 in this embodiment) as an urging member for applying an urging force to regulate an attitude of the developing unit 20 and the cleaning unit 60 relative to each other. Furthermore, the cleaning unit 60 and the developing unit 20 are rotatably connected with each other by connection pins 75 (connection pins, pins) as connecting members to constitute the process cartridge B.

More specifically, arm portions **23*a*L, 23*a*R provided opposite end portions of the developing container 23 with respect to the longitudinal direction of the developing unit 20 (axial direction of the developing roller 32) is provided at free end portions rotation holes 23*b*L and 23*b*R. The rotation holes 23*b*L, 23*b*R are in parallel with the axis of the developing roller 32**.

Longitudinal opposite end portions of the cleaning frame 71 which is a frame (casing) of the cleaning unit are provided with respective holes **71*a* for receiving the connection pins 75. The arm portions 23*a*L and 23*a*R are aligned with a predetermined position of the cleaning frame 71, and the connection pins 75 are inserted through the rotation holes 23*b*L and 23*b*R and the holes 71*a*. By this, the cleaning unit 60 and the developing unit 20 are connected with each other rotatably about the connection pins 75** as the connecting members.

At this time, the coil spring 46 as the urging member mounted to the base portion of each of the arm portions **23*a*L and 23*a*R abuts to the cleaning frame 71, so that the developing unit 20 is urged to the cleaning unit 60 about the connection pin 75**.

By this, the developing roller 32 as the process means is assuredly urged toward the drum 62 as the rotatable member. Opposite end portions of the developing roller 32 are provided with respective ring configuration spacers (unshown) as gap holding members, by which the developing roller 32 is spaced from the drum 62 by a predetermined gap.

3. Mounting and Dismounting of Process Cartridge

Figure 4:
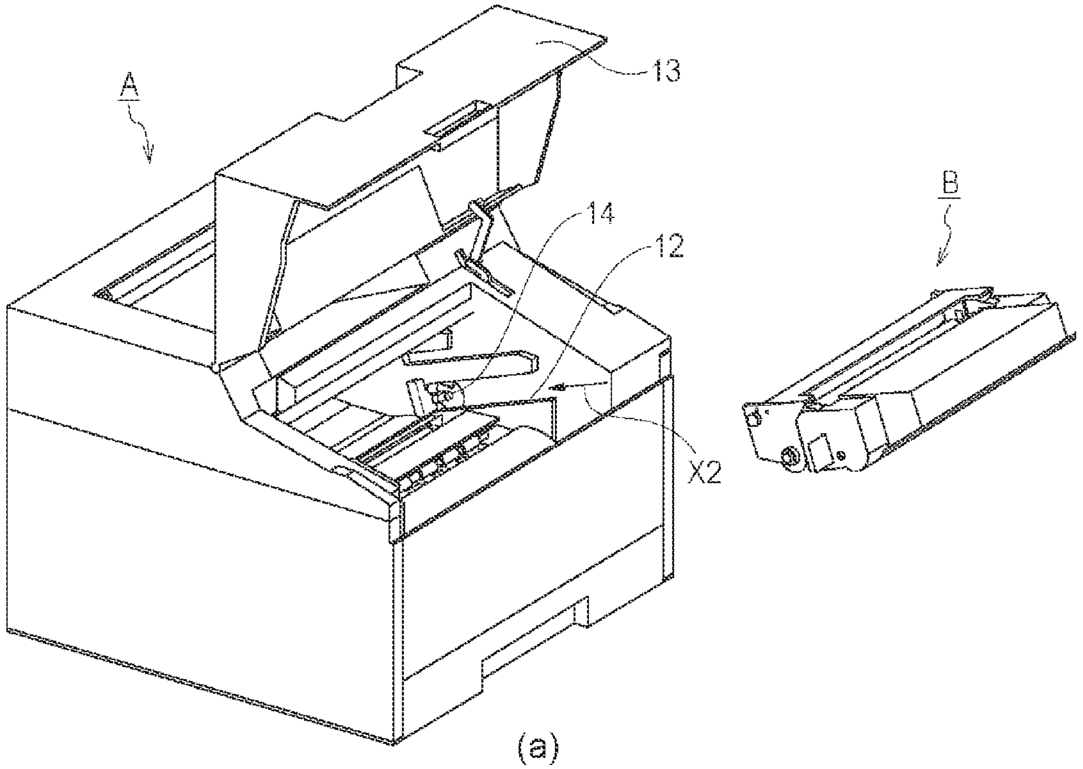
FIG. 4 is an illustration of behavior in the mounting and demounting of the cartridge relative to the main assembly, according to the embodiment of the present invention.
Figure 4:
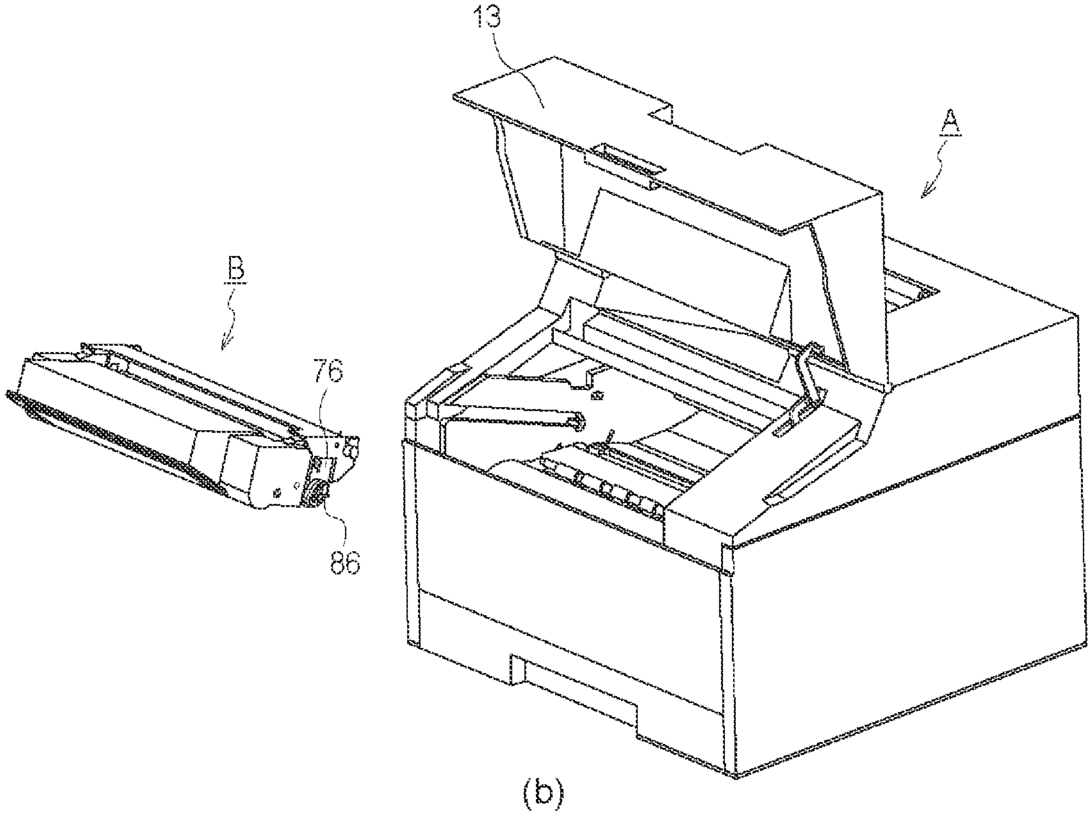
Figure 5:
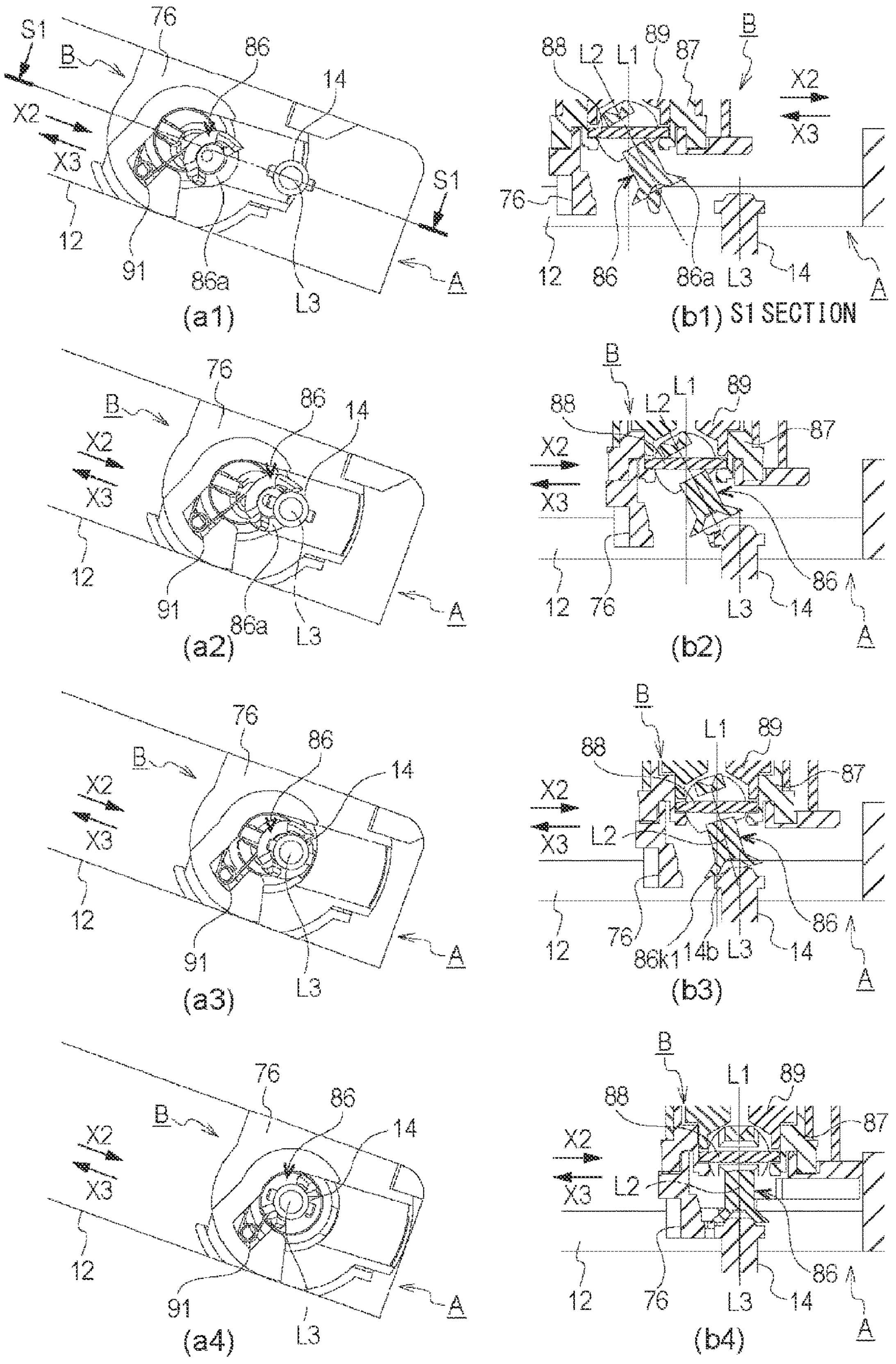
FIG. 5 is an illustrations of behavior in the mounting and demounting of the cartridge relative to the main assembly with a pivoting action of the coupling member, according to the embodiment of the present invention.

Referring to FIGS. 4 and 5, the description will be made as to the operation of mounting and dismounting of the process cartridge B relative to the apparatus main assembly A.

FIG. 4 is an illustration of mounting and demounting of the process cartridge B relative to the apparatus main assembly A. Part (a) of FIG. 4 is a perspective view as seen from the non-driving side, and part (b) is a perspective view as seen from the driving side. The driving side is a longitudinal end portion where the coupling member 86 of the process cartridge B is provided.

The apparatus main assembly A is provided with a rotatably door 13. FIG. 4 shows the main assembly in a state that the door 13 is open.

Inside the apparatus main assembly A is provided with a drive head 14 as a main assembly side engaging portion and a guiding member 12 as a guiding mechanism. The drive head 14 is a drive transmission mechanism of the main assembly side for transmitting the driving force to the cartridge mounted thereto through engagement with the coupling member 86 of the cartridge. By the rotation of the drive head 14 after the engagement, the rotational force can be transmitted to the cartridge. The drive head 14 can be deemed as a main assembly side coupling in the sense that it is engaged with the coupling of the process cartridge B to transmit the driving force. The drive head 14 as the main assembly side engaging portion is rotatably supported by the apparatus main assembly A. The drive head 14 includes a drive shaft **14*a* as a shaft portion, a drive pins 14*b* as an applying portions for applying the rotational force ((b3) of FIG. 5). In this embodiment, it is in the form of a drive pin, another structure can be employed, for example, a projection (projection) or projections projecting from the drive shaft 14*a* outwardly in a radial direction, and the driving force is transmitted from the surface of the projection to the cartridge. As a further alternative, a drive pin 14*a* may be press-fitted into the hole provided in the drive shaft 14*a*, and then is welded. In (b1) to (b4) of FIG. 5**, hatched portions indicate cut surfaces. The same applies to the subsequent drawings.

The guiding member 12 is a main assembly side guiding member for guiding the process cartridge B in the apparatus main assembly A. The guiding member 12 may be a plate-like member provided with a guiding groove or a member for guiding the process cartridge B at the lower surface of the process cartridge B while supporting it.

Referring to FIG. 5, the description will be made as to the process of mounting and dismounting of the process cartridge B relative to the apparatus main assembly A, while the coupling member 86 while the driving force transmitting part is inclining (pivoting, swing, whirling).

FIG. 5 is an illustration of the mounting and dismounting of the process cartridge B relative to the main assembly A while the driving force transmitting part is inclining (pivoting, swing, whirling). Parts (a1) to (a4) of FIG. 5 are enlarged views of the coupling member 86 and the parts therearound as seen from the driving side toward the non-driving side. Parts (b1) of FIG. 5 is a sectional view (S1 sectional view) taken along a line S1-S1 of (a1) of FIG. 5. Similarly, (b2), (b3) and (b4) of FIG. 5 are sectional views (S1 sectional views) taken along lines S1-S1 of (a2), (a3) and (a4) of FIG. 5.

The process cartridge B is mounted to the apparatus main assembly A in the process from (a1) to (a4) of FIG. 5, and the (a4) of FIG. 5 shows the state in which the mounting of the process cartridge B to the apparatus main assembly A is completed. In FIG. 5, the guiding member 12 and the drive head 14 as the parts of the apparatus main assembly A are shown, and the other members are parts of the process cartridge B.

An arrow X2 and an arrow X3 in FIG. 5 are substantially perpendicular to a rotational axis L3 of the drive head 14. The direction indicated by the arrow X2 will be called X2 direction, and the direction indicated by the arrow X3 will be called X3 direction. Similarly, the X2 direction and the X3 direction are substantially perpendicular to the axis L1 of the drum 62 of the process cartridge. In FIG. 5, the direction indicated by the arrow X2 is a direction in which the process cartridge B is mounted to the apparatus main assembly A (downstream with respect to the cartridge mounting direction). In the direction indicated by the arrow X3 is a direction in which the process cartridge B is dismounted from the main assembly (upstream with respect to the cartridge mounting direction). A mounting and demounting direction contains the directions indicated by the arrow X2 and the arrow X3. The mounting and the dismounting are carried out in the respective directions. The directions may be described by the upstream with respect to the mounting direction, the downstream with respect to the mounting direction, the upstream with respect to the dismounting direction or the downstream with respect to the dismounting direction depending on the convenience of the explanation.

As shown in FIG. 5, the process cartridge B is provided with a spring as an urging member (elastic member). In this embodiment, the spring is a twisting spring 91 (twisted coil spring, kick spring). The torsion coil spring 91 urges the coupling member such that a free end portion 86*a* of the coupling member is inclined toward the drive head 14. In other words, it urges the coupling member 86 such that in the mounting process of the process cartridge B, the free end portion 86*a* is inclined toward the downstream with respect to the mounting direction perpendicular to the rotational axis of the drive head 14. The process cartridge B advances into the apparatus main assembly A with this attitude (state) of the free end portion 86*a* of the coupling member 86 inclining toward the drive head 14 (detailed description will be made hereinafter).

In the rotational axis of drum 62 is the axis L1, the rotational axis of the coupling member 86 is the axis L2, and the rotational axis of the drive head 14 functioning main assembly side engaging portion is the axis L3. As shown in (b1) to (b3) of FIG. 5, the axis L2 is inclined relative to the axis L1 and the axis L3. The rotational axis of the drive head 14 is substantially coaxial with the rotational axis of the drive shaft 14*a*. A driving side flange 87 is provided at an end portion of the drum 62 and is rotatable integrally with the drum 62, and therefore, the rotational axis of the driving side flange 87 is coaxial with the rotational axis of the drum 62.

When the process cartridge B is inserted to an extent shown in (a3) and (b3) of FIG. 5, the coupling member 86 contacts to the drive head 14. In the example of (b3) of FIG. 5, the drive pin 14*b* as the rotational force applying portion is contacted by a standing-by portion 86*k*1 of the coupling member. By the contact, the position (inclination) of the coupling member 86 is regulated, so that the amount of the inclination (pivoting) of the axis L2 relative to the axis L1 (axis L3) gradually decreases.

In this embodiment, the drive pin 14*b* as the applying portion is contacted by the standing-by portion 86*k*1 of the coupling member. However, depending on the phases of the coupling member 86 and the drive head 14 in the rotational moving direction, the portion where the coupling member 86 and the drive head 14 contact to each other is different. Therefore, the contact positions in this embodiment is not limiting to the present invention. It will suffice if a portion of the free end portion 86*a* of the coupling member (the detailed will be described hereinafter) contacts to a portion of the drive head 14.

When the process cartridge B is inserted to the mounting completion position, the axis L2 is substantially coaxial with the axis L1 (axis L3) as shown in parts (a4) and (b4) of FIG. 5. In other words, the rotational axes of the coupling member 86, the drive head 14 and the driving side flange 87 are all substantially coaxial.

By the engagement of the coupling member 86 provided in the process cartridge B with the drive head 14 as the main assembly side engaging portion in this manner, the transmission of the rotational force is enabled from the main assembly to the cartridge. When the process cartridge B is dismounted from the apparatus main assembly A, the process is the reciprocal, that is, from the state of (a4) and (b4) toward the state of (a1) and (b1) in FIG. 5. Similarly to the mounting operation, the coupling member 86 inclines relative to the axis L1, so that the coupling member 86 is disengaged from the drive head 14 as the main assembly side engaging portion. That is, the process cartridge B is moved in the X3 direction opposite from the X2 direction substantially perpendicularly to the rotational axis L3 of the drive head 14, and the coupling member 86 disengages from the drive head 14.

The movement of the process cartridge B in the X2 direction or X3 direction may occur only in the neighborhood of the mounting completion position. In another position other than the mounting completion position, the process cartridge B may move in any direction. In other words, it will suffice if a track of movement of the cartridge immediately before the engagement or disengagement of the coupling member 86 relative to the drive head 14 is the predetermined direction which is substantially perpendicular to the rotational axis L3 of the drive head 14.

4. Coupling Member

Figure 6:
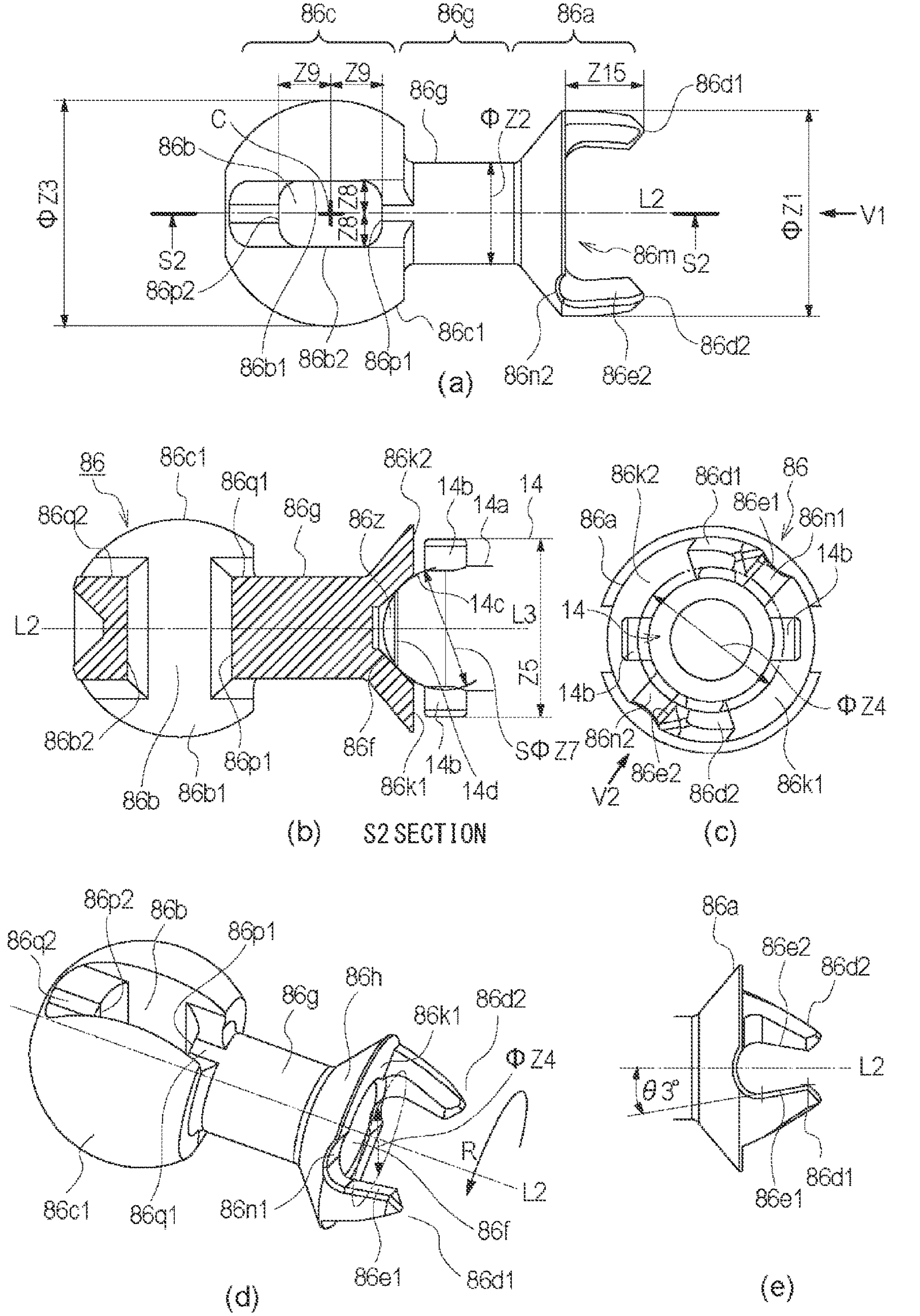
FIG. 6 is an illustration of the coupling member according to the embodiment.

Referring to FIG. 6, the coupling member 86 will be described. As regards the rotational direction, the clockwise direction may be called right-handed rotational direction, and the counterclockwise direction may be called left-handed rotational direction. A rotational moving direction R in FIG. 6 is counterclockwise direction when the cartridge is seen from the driving side toward the non-driving side.

For the purpose of better explanation, an imaginary line will drawn on a planar view, and an imaginary plane will be drawn on a perspective view. When a plurality of imaginary lines are to be used, first imaginary line, second imaginary line, third imaginary line or the like will be used. Similarly, when a plurality of imaginary planes are to be used, first imaginary plane, second imaginary plane, third imaginary plane or the like will be used. An inside of the cartridge (inward direction of the cartridge) and an outside of the cartridge (outward of direction of the cartridge) are based on the frame of the cartridge, unless otherwise mentioned.

Part (a) of FIG. 6 is a side view of the coupling member 86. Part (b) of FIG. 6 is a S2 sectional view of the coupling member 86 along a line S2-S2 of part (a) of FIG. 6. Part (b) of FIG. 6 shows the coupling with the drive head 14 as the main assembly side engaging portion without cutting.

Part (c) of FIG. 6 illustrates a state in which the coupling member 86 is engaged with the drive head 14. It is a view of the coupling member 86 and the drive head 14 as seen in the direction indicated by an arrow V1 of part (a) of FIG. 6 from the outside of the driving side end portion (end surface) of the cartridge and the drive head 14. Part (d) of FIG. 6 is a perspective view of the coupling member 86. Part (e) of FIG. 6 illustrates a neighborhood of a free end portion 86*a* (which will be described hereinafter), as seen in the direction along the receiving portions 86*e*1 and 86*e*2 for receiving the rotational force (a direction V2 in part (c) of FIG. 6).

As shown in FIG. 6, the coupling member 86 mainly comprises three portions. Briefly, it comprises two end portions and a portion therebetween.

A first portion is a free end portion 86*a* engageable with the drive head 14 as the main assembly side engaging portion to receive the rotational force from the drive head 14. The free end portion 86*a* includes an opening 86*m* expanding toward the driving side.

A second portion is a substantially spherical connecting portion 86*c* (accommodated portion). The connecting portion 86*c* is pivotably held (connected) by a driving side flange 87 which is a force receiving member. One end portion side of the drum (cylinder end portion) is provided with a driving side flange 87, and the other end portion side is provided with a non-driving side flange 64.

The first portion can be deemed as including the one end portion side of the coupling member, and the second portion can be deemed as including the other end portion side of the coupling member. The second portion can be deemed as including a rotational center when the coupling member rotates (pivots) in the state that the coupling member is held by the driving side flange 87.

A third portion is an interconnecting portion 86 *g* connecting the free end portion 86*a* and the connecting portion 86*c* with each other.

Here, a maximum rotation diameter φZ2 of the interconnecting portion 86 *g* is smaller than a maximum rotation diameter φZ3 of the connecting portion 86*c* (φZ2<φZ3), and is smaller than a maximum rotation diameter φZ1 of the free end portion 86*a* (φZ2<Z1). In other words, a diameter of at least a part of the interconnecting portion 86 *g* is smaller than a diameter of a maximum diameter portion of the connecting portion. In addition, a diameter of at least a part of the interconnecting portion 86 *g* is smaller than a diameter of a maximum diameter portion of the free end portion 86*a*. These diameters are the maximum diameters about the rotational axis of the coupling member, and they are the maximum diameters of imaginary circles of the respective cross-sectional portions of the coupling member on an imaginary flat plane perpendicular to the rotational axis of the coupling member.

The maximum rotation diameter φZ3 of the connecting portion 86*c* is larger than the maximum rotation diameter of the free end portion 86*a* (φZ3>φZ1). With such relationships, when the coupling member 86 is inserted into a hole having a diameter not less than φZ1 and not more than φZ3 from the free end portion 86*a* side, the coupling member 86 does not penetrate throughout the hole. For this reason, when and after a unit including the coupling member 86 is assembled up, the coupling member is prevented from the unit in which the coupling member is inserted. In this embodiment, the maximum rotation diameter φZ1 of the free end portion 86*a* is larger than the maximum rotation diameter φZ2 of the interconnecting portion 86 *g* and is smaller than the maximum rotation diameter φZ3 of the connecting portion 86*c* (φZ3>φZ1>φZ2).

These maximum rotation diameters φZ1, φZ2 and φZ3 can be measured as shown in part (a) of FIG. 6. More particularly, the diameters of the respective portions of the coupling member are measured in longitudinal sections including the rotational axis of the coupling member, and the maximum measurements of the respective portions are the maximum diameters. The diameters may be based on a three dimensional view shape provided by the rotation of the coupling member about the rotational axis thereof. More particularly, with respect to each of the portions, a point furthest from the rotational axis in the radial direction is determined. A track of the point when the point is revolved about the rotational axis of the coupling member is used as an imaginary circle, and the diameter of the imaginary circle is deemed as the maximum rotation diameter of the portion.

As shown in part (b) of FIG. 6, the opening 86*m* includes a conical shape receiving surface 86*f* as an expanding portion expanding toward the drive head 14 in the state that the coupling member 86 is mounted to the apparatus main assembly A. The receiving surface 86*f* is provided by the member having an outer peripheral surface at the free end portion, and a recess 86*z* is formed in the free end portion by the receiving surface 86*f* projecting outwardly. The recess 86*z* includes an opening 86*m* (opening) in a side opposite from the drum 62 (cylinder) with respect to the axis L2.

As shown in parts (a) and (c), on a circumference extending about the axis L2 at the extreme end portion of the free end portion 86*a*, there are provided two claw portions 86*d*1 and 86*d*2 at point symmetry positions with respect to the axis L2. Standing-by portions 86*k*1 and 86*k*2 are provided circumferentially between claw portions 86*d*1 and 86*d*2. In this embodiment, a pair of projections are provided, but only one such a projection may be provided. In such a case, the standing-by portion is that portion between the downstream side of the projection and the upstream side of the projection with respect to the clockwise direction. The standing-by portions are the spaces required for the drive pins 14*b* of the drive head 14 provided in the apparatus main assembly A to wait without contacting the claw portions 86*d*. The spaces are greater than the diameters of the drive pin 14*b* as the applying portion for applying the rotational force.

The spaces function as plays when the cartridge is mounted to the apparatus main assembly A. In the radial direction of the coupling member 86, the recess 86*z* is inside the claw portions 86*d*1 and 86*d*2. A width of the claw portion 86*d* in the diametrical direction is substantially equivalent to a width of the standing-by portion.

As shown in part (c) of FIG. 6, when the transmission of the rotational force from the drive head 14 to the coupling member 86 is awaited, the drive pins 14*b* for applying the rotational force are in the standing-by portions 86*k*1 and 86*k*2, respectively (preparatory position or stand-by position). Furthermore, in part (d) of FIG. 6, in upstream sides of the claw portions 86*d*1 and 86*d*2 with respect to a rotational direction indicated by a arrow R, there are provided receiving portions 86*e*1 and 86*e*2 for receiving a rotational force in a direction crossing with the R direction (part (a) of FIG. 6), respectively. The R direction in the Figure is the direction in which the coupling rotates in the image formation as a result of receiving the driving force from the drive head 14 of the main assembly.

The drive head 14 for transmitting the drive into process cartridge B and the drive pins 14*b* constitutes a drive transmission mechanism. A member may have a plurality of functions, depending on the configuration of the drive head. In such a case, a surface of a member actually contacting and transmitting the drive is the member constituting the drive transmission mechanism.

In the state that the coupling member 86 is engaged with the drive head 14 and the drive head 14 is rotating, the surfaces of the drive pins 14*b* of the main assembly side contact side surfaces of the receiving portions 86*e*1 and 86*e*2 of the coupling member 86. By this, the rotational force is transmitted from the drive head 14 as the main assembly side engaging portion to the coupling member 86 as the drive transmission part.

In the base portions of the receiving portions 86*e*1 and 86*e*2, there are provided undercuts (clearance spaces) 86*n*1 and 86*n*2 concaved from the standing-by portions 86*k*1 and 86*k*2 toward the connecting portion 86*c*. Referring to FIG.

7, the undercuts 86_n_1 and 86_n_2 will be described in detail. Part (b) of FIG. 7 is a S3 section of part (a) of FIG. 7.

Figure 7:
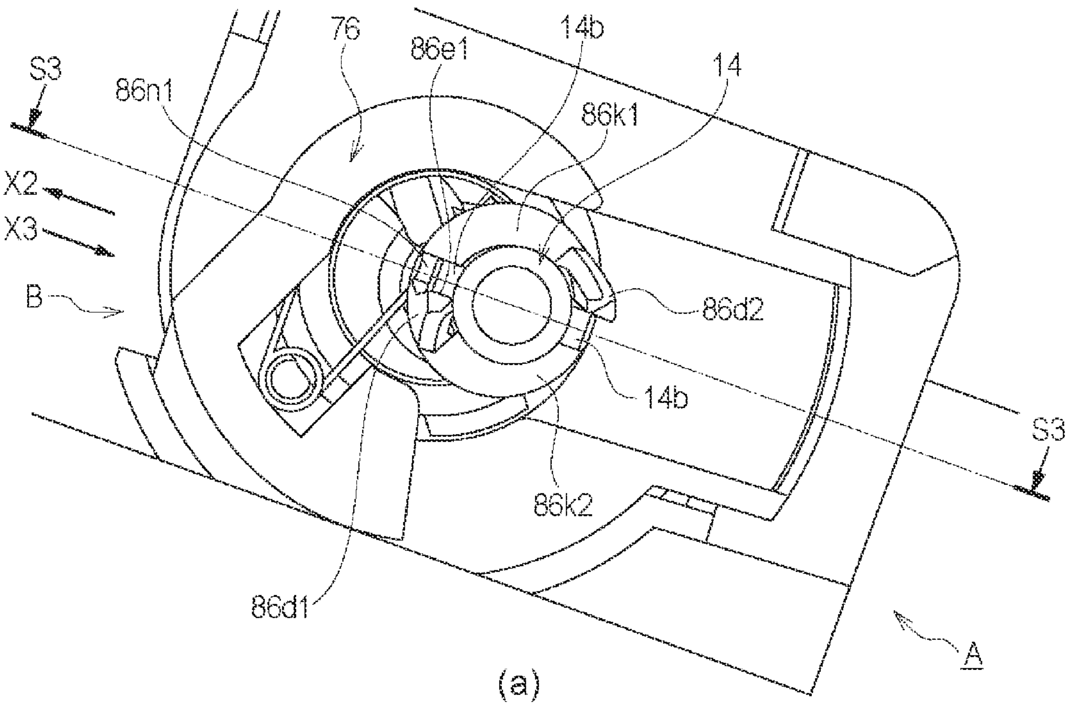
FIG. 7 is an illustration of a clearance space of the coupling member according to this embodiment.
Figure 7:
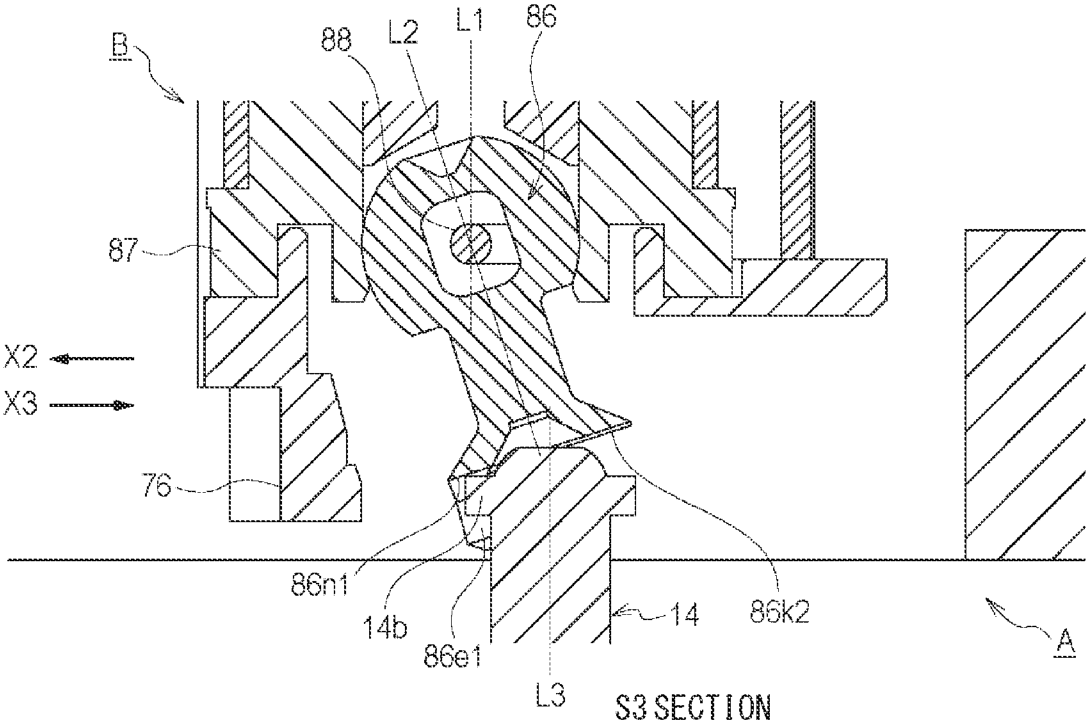

FIG. 7 shows a state in which the coupling member 86 is inclined along the drive pins 14_b_ for applying the rotational force, from the state in which the drive pins 14_b_ contact the receiving portions 86_e_1 and 86_e_2. As shown in FIG. 7, the undercuts 86_n_1 and 86_n_2 are provided to avoid interference between the standing-by portions 86_k_1 and 86_k_2 and the drive pins 14_b_ when the coupling member 86 is inclined in the state that the receiving portions 86_e_1 and 86_e_2 and the drive pins 14_b_ are in contact with each other. Therefore, when the entirety of the standing-by portions 86_k_1 and 86_k_2 are cut up toward the connecting portion 86_c_, or when the drive pins 14_b_ are shortened, the undercut may not be provided. However, in this embodiment, the undercuts 86_n_1 and 86_n_2 are provided taking into account that if the entirety of the standing-by portions 86_k_1 and 86_k_2 are cut toward the connecting portion 86_c_, the rigidity of the coupling member 86 may lower.

As shown in part (c) of FIG. 6, in order to stabilize the rotational torque transmitted to the coupling member 86, the receiving portions 86_e_1 and 86_e_2 are preferably provided at the point symmetry positions with respect to the axis L2. By doing so, a rotational force transmission radius is constant, and therefore, the rotational torque transmitted to the coupling member 86 is stabilized. In addition, in order to stabilize the position of the coupling member 86 receiving the rotational force, it is preferable that the receiving portions 86_e_1 and 86_e_2 are disposed the diametrically opposite positions (180° opposing). Particularly in the case that no flange around the receiving portion and the standing-by portion at the free end portion, as in this embodiment, it is preferable that the number of the receiving portions is two. In the case of an annular flange extending around the outer periphery of the receiving portion, the receiving portions are not exposed when seen from a radially outward position along the rotational axis. Therefore, the receiving portions are relatively easily protected during transportation of the cartridge, irrespective of the attitude of the coupling member. However, with the structure in which the receiving portions is not seen from the outside along the rotational axis of the coupling member by the provision of the flange, the flange tends to interfere with the engaging portion.

As shown in parts (d) and (e) of FIG. 6, in order to stabilize the position of the coupling member 86 receiving the rotational force, it is desirable that the receiving portions 86_e_1 and 86_e_2 are inclined at a angle θ3 relative to the axis L2 so that the free end portions approach to the axis L2. This is because, as shown in part (b) of FIG. 6, by the rotational torque transmitted to the coupling member 86, the coupling member 86 is attracted toward the drive head 14 as in the main assembly side engaging portion. By this, the conical shape receiving surface 86_f_ contacts the spherical surface portion 14_c_ of the drive head 14, by which the position of the coupling member 86 is further stabilized.

In this embodiment, the number of the claw portions 86_d_1 and 86_d_2 is two, but this number is not restrictive to the present invention and may be different as long as the drive pins 14_b_ can enter the standing-by portions 86_k_1 and 86_k_2. However, because of the necessity of the drive pins 14_b_ entering the standing-by portions, the increase of the number of the claw portions may require reduction of the claw portions per se (width in the circumferential direction in part (c) of FIG. 6). In such a case, it is preferable that two (a pair of) projections are provided as in this embodiment.

Furthermore, the receiving portions 86_e_1 and 86_e_2 may be provided radially inside the receiving surface 86_f_. Or, the receiving portions 86_e_1 and 86_e_2 may be provided at positions radially outside the receiving surface 86_f_ with respect to the axis L2. However, in this embodiment, the driving force from the drive head 14 is received by the side surfaces of the claw portions 86_d_1, 86_d_2 projected from the receiving surface 86_f_ in the direction away from the drum 62 along the rotational axis. Therefore, the claw portions 86_d_1 and 86_d_2, of the free end portion 86_a_, for receiving the driving force from the apparatus main assembly are exposed. If an annular flange is provided sounding the projections (claws), the flange will interfere with a part therearound when the coupling member 86 is inclined, and therefore, the inclinable angle of the coupling member 86 is restricted. In addition, the provision of the annular flange may require that the parts therearound are disposed so as not to interfere, with the result of the upsizing of the cartridge B.

Therefore, the structure not having a portion other than the driving force receiving positions (claw portions 86_d_1, 86_d_2 in this embodiment) is contributable to the downsizing of the cartridge B (and main assembly A). On the other hand, without the flange surrounding the projections, the liability that the projections are conducted by the other parts during transportation increases. However, as will be described hereinafter, by urging the coupling member 86 by a spring, the claw portions 86_d_1 and 86_d_2 can be accommodating within a most outer configuration portion of the bearing member 76. By this, the possibility of the damage of the claw portions 86_d_1, 86_d_2 during the transportation can be reduced.

In this embodiment, the projection amount Z15 of the claw portions 86_d_1 and 86_d_2 from the standing-by portions 86_k_1 and 86_k_2 is 4 mm. This amount is preferable in order to assuredly engaging the claw portions 86_d_1 and 86_d_2 with the drive pins 14_b_ without interference of the standing-by portions 86_k_1 and 86_k_2 with the drive pins 14_b_, but may be another depending on the part accuracy. However, if the standing-by portions 86_k_1 and 86_k_2 are too far from the drive pin 14_b_, the formation when the drive is transmitted to the coupling member 86 may increase. On the other hand, if the projection amount of the claw portions 86_d_1 and 86_d_2 is increased, the cartridge B and/or the apparatus main assembly A may be upsized. Therefore, the projection amount Z15 is preferably in the range not less than 3 mm and not more than 5 mm.

In this embodiment, a length of the free end portion 86_a_ in the direction of the axis L1 is approx. 6 mm Therefore, the length of a base portion (portion other than the claw portions 86_d_1 and 86_d_2) of the free end portion 86_a_ is approx. 2 mm, and as a result, the length of the claw portions 86_d_1 and 86_d_2 in the direction of the axis L1 is longer than the length of the base portion (portion other than the claw portions 86_d_1 and 86_d_2).

An inner diameter φZ4 of the receiving portions 86_e_1 and 86_e_2 is larger than the maximum rotation diameter φZ2 of the interconnecting portion 86_g_. In this embodiment, φZ4 is larger than φZ2 by 2 mm.

As shown in FIG. 6, the connecting portion 86_c_ comprises a substantial spherical shape 86_c_1 having a pivoting center C substantially on the axis L2, arcuate surface portions 86_q_1 and 86_q_2, and a hole portion 86_b_.

The maximum rotation diameter φZ3 of the connecting portion 86_c_ is larger than the maximum rotation diameter φZ1 of the free end portion 86_a_. In this embodiment, φZ3 is larger than φZ1 by 1 mm. As for the spherical portion, a substantial diameter may be compared, and if it is partly cut for the convenience of molding, a diameter of an imaginary sphere may be compared. The arcuate surface portions 86_q_1 and 86*q*2 are on an arcuate plane provided by extending an arcuate configuration having the same diameter as the interconnecting portion 86*g*. The hole portion 86*b* is a through-hole extending in the direction perpendicular to the axis L2. The through-hole 86*b* includes a first inclination-regulated portions 86*p*1 and 86*p*2 and transmitting portions 86*b*1 and 86*b*2 parallel with the axis L2.

The first inclination-regulated portions 86*p*1 and 86*p*2 have flat surface configurations equidistant from the center C of the spherical 86*c*1 (Z9=Z9). The transmitting portions 86*b*1 and 86*b*2 have flat surface configurations equidistant from the center C of the spherical 86*c*1 (Z8=Z8). A diameter of the pin 88 pivotably supporting the coupling member 86 through the hole portion 86*b* is 2 mm Therefore, the coupling member 86 is inclinable if Z9 exceeds 1 mm. When Z8 is 1 mm, the pin 88 can pass through the hole portion, and if Z8 exceeds 1 mm, the coupling member 86 is rotatable about the axis L1 by a predetermined amount.

The end portions, with respect to the direction perpendicular to the axis L2, of the hole portion 86*b* of the first inclination-regulated portions 86*p*1, 86*p*2 extend to outer edges of the arcuate surface portions 86*q*1 and 86*q*2. The end portions, with respect to the direction perpendicular to axis L2, of the hole portion 86*b* of the transmitting portions 86*b*1, 86*b*2 extend to the outer edge of the spherical 86*c*1.

In addition, as shown in FIG. 6, interconnecting portion 86 *g* has a cylindrical shape connecting the free end portion 86*a* and the connecting portion 86*c*, and is a columnar (or cylindrical) shaft portion extending substantially along the axis L2.

The material of the coupling member 86 in this embodiment may be resin material such as polyacetal, polycarbonate, PPS, liquid crystal polymer. The resin material may contain glass fibers, carbon fibers or the like, or metal inserted therein, so as to enhance the rigidity. In addition, the entirety of the coupling member 86 is made of metal or the like. In this embodiment, metal is used which is preferable from the standpoint of downsizing of the coupling. More particularly, it is made of zinc die-cast alloy. A part of the spherical surface of the connecting portion 86*c* is cut out at the portion close to the interconnecting portion 86 *g* in the free end side 86*a*. In addition, the configuration of the coupling member is so designed that the total length including the first to third portions is not more than approx. 21 mm A length from the pivoting center C to the free end portion engaging with the main assembly drive pin measured in the longitudinal direction is not more than 15 mm With the decrease of the distance from the center of the pivoting of the coupling member, the distance through which the coupling retracts from the drive pins when the coupling inclines by the same angle decreases. In other words, if the coupling member is shortened for the purpose of downsizing of the cartridge, it is necessary to increase the pivotable angle required to escape from the drive pin. The free end portion 86*a*, the connecting portion 86*c*, and the interconnecting portion 86 *g* may be integrally molded, or may be provided by connecting different parts. In the state that the photosensitive drum, the coupling member and the flange supporting the coupling member is taken out of the cartridge, the coupling member is inclinable in any inclining directions.

5. Structure of Drum Unit

Figure 8:
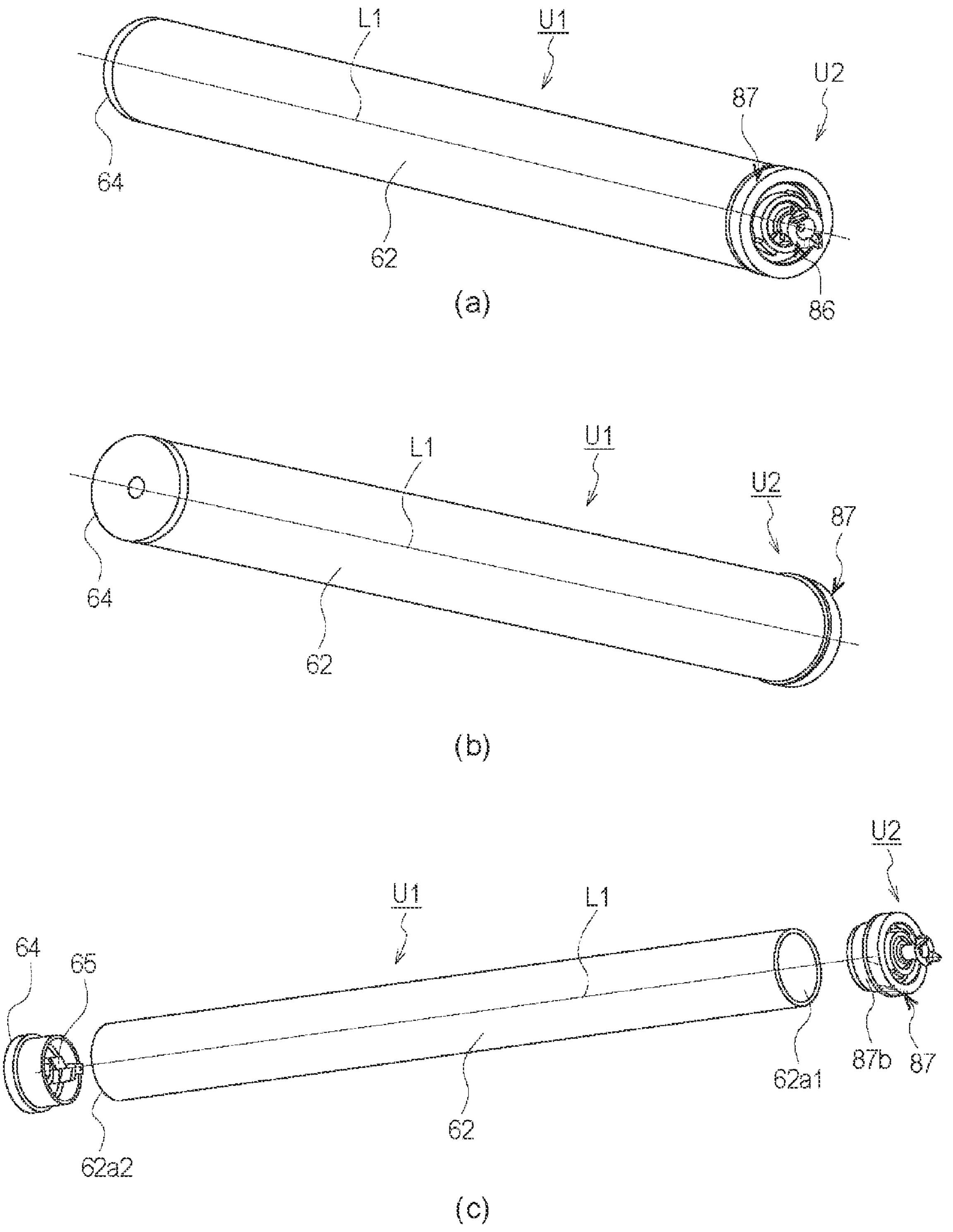
FIG. 8 is an illustration of a drum unit according to the embodiment of the present invention.
Figure 9:
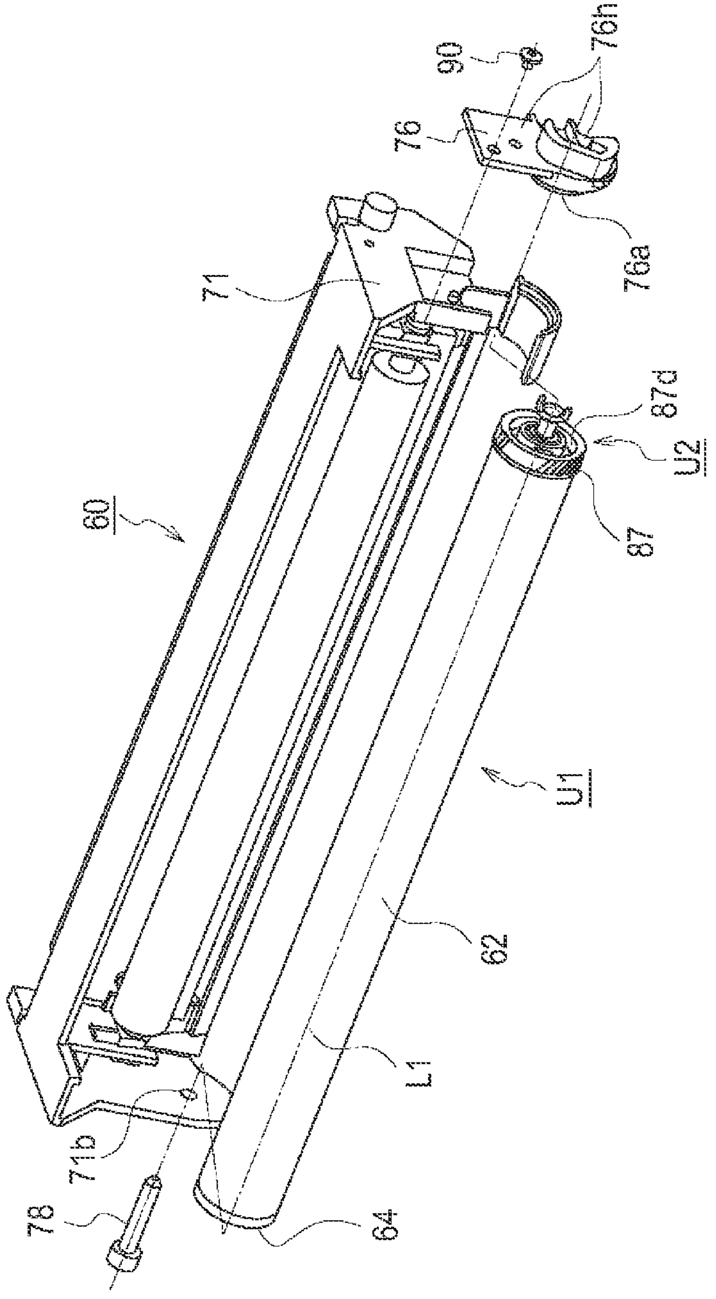
FIG. 9 is an illustration of behavior in assembling of the drum unit into a cleaning unit.

Referring to FIGS. 8 and 9, the structure of the photosensitive drum unit U1 (drum unit U1) will be described.

FIG. 8 is an illustration of the drum unit U1, in which part (a) is a perspective view as seen from the driving side, part (b) is a perspective view as seen from the non-driving side, and part (c) is an exploded perspective view. FIG. 9 is an illustration of assembling the drum unit U1 with the cleaning unit 60.

As shown in FIG. 8, the drum 62, the drum unit U1 comprises a driving side flange unit U2 for receiving the rotational force from the coupling member, the non-driving side flange 64 and a grounding plate 65. The drum 62 as the rotatable member comprises an electroconductive member of aluminum or the like and a surface photosensitive layer thereon. The drum 62 may be hollow or solid.

The driving side flange unit U2 as a force receiving member to which the rotational force is transmitted from the coupling member is provided at the driving side end portion of the drum 62. More particularly, as shown in part (c) of FIG. 8, in the driving side flange unit U2, a fixed portion 87*b* of the driving side flange 87 which is a force receiving member is engaged in an opening 62*a*1 at the end of the drum 62 and is fixed to the drum 62 by bonding and/or clamping or the like. When the driving side flange 87 rotates, the drum 62 also rotates integrally therewith. The driving side flange 87 is fixed to the drum 62 such that a rotational axis as a flange axis of the driving side flange 87 substantially coaxial with the axis L1 of the drum 62.

Here, the substantial co-axial means the completely co-axial and approximately coaxial in which they are slightly deviated due to the manufacturing tolerances of the parts. The same applies to the following descriptions.

Similarly, the non-driving side flange 64 is provided at the non-driving side end portion of the drum 62 substantially coaxially with the drum 62. In this embodiment, the non-driving side flange 64 is made of resin material. As shown in part (c) of FIG. 8, the non-driving side flange 64 is fixed to the opening 62*a*2 at the longitudinal end portion of the drum 62 by bonding and/or clamping or the like. The non-driving side flange 64 is provided with an electroconductive grounding plate 65 (main metal). The grounding plate 65 is in contact with the inner surface of the drum 62 and is electrically connected with the apparatus main assembly A.

As shown in FIG. 9, the drum unit U1 is supported by the cleaning unit 60.

In the non-driving side of the drum unit U1, a shaft receiving portion 64*a* (part (b) of FIG. 8) of the non-driving side flange 64 is rotatably supported by the drum shaft 78. The drum shaft 78 is press-fitted into the supporting portion 71*b* provided in the non-driving side of the cleaning frame 71.

On the other hand, as shown in FIG. 9, in the driving side of the drum unit U1, there is provided a bearing member 76 for contacting and supporting the flange unit U2. A wall surface (plate-like portion) 76*h* as a base portion (fixed portion) of the bearing member 76 is fixed to the cleaning frame 71 by screws 90. In other words, the bearing member 76 is fixed to the cleaning frame 71 by the screws. The driving side flange 87 is supported by the cleaning frame 71 and the bearing member 76 (the bearing member 76 will be described hereinafter. The supporting member is provided with projections inside and outside of the cartridge, respectively with respect to a reference surface which is a plate-like portion 76*h* of the bearing member 76. The bearing member 76 which is the supporting member is a part of the frame of the cartridge, and therefore, the projection from the bearing member 76 can be deemed as a frame projection (projection). Similarly, the projection (first projection) for receiving the urging force from the main assembly Ad the projection (second projection) for mounting the spring can be deemed as projections extending from the frame, because the bearing member 76 is mounted to the body of the cartridge frame. In order to assure the strength or in view of shrinkage in the resin material molding, the bearing member 76 and the cartridge frame may be provided with a rib, a groove and/or a lightening recess provided at a position not described.

In this embodiment, the bearing member 76 is fixed to the cleaning frame 71 by screws 90, but it may be fixed by bonding or by melted resin material. The cleaning frame 71 and the bearing member 76 may be made integral.

6. Driving Side Flange Unit

Figure 10:
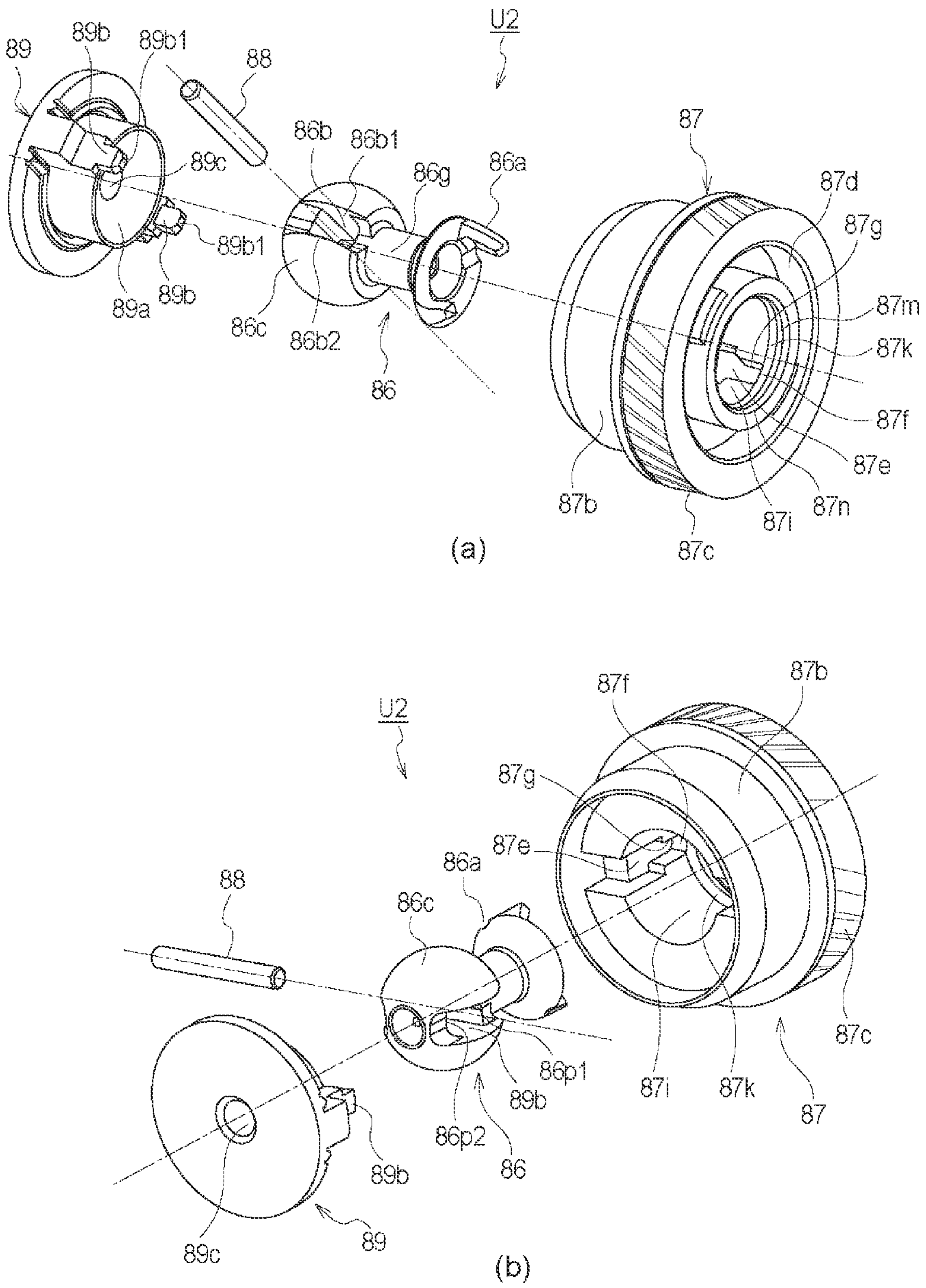
FIG. 10 is there exploded view of the driving side flange unit according to the embodiment of the present invention.
Figure 11:
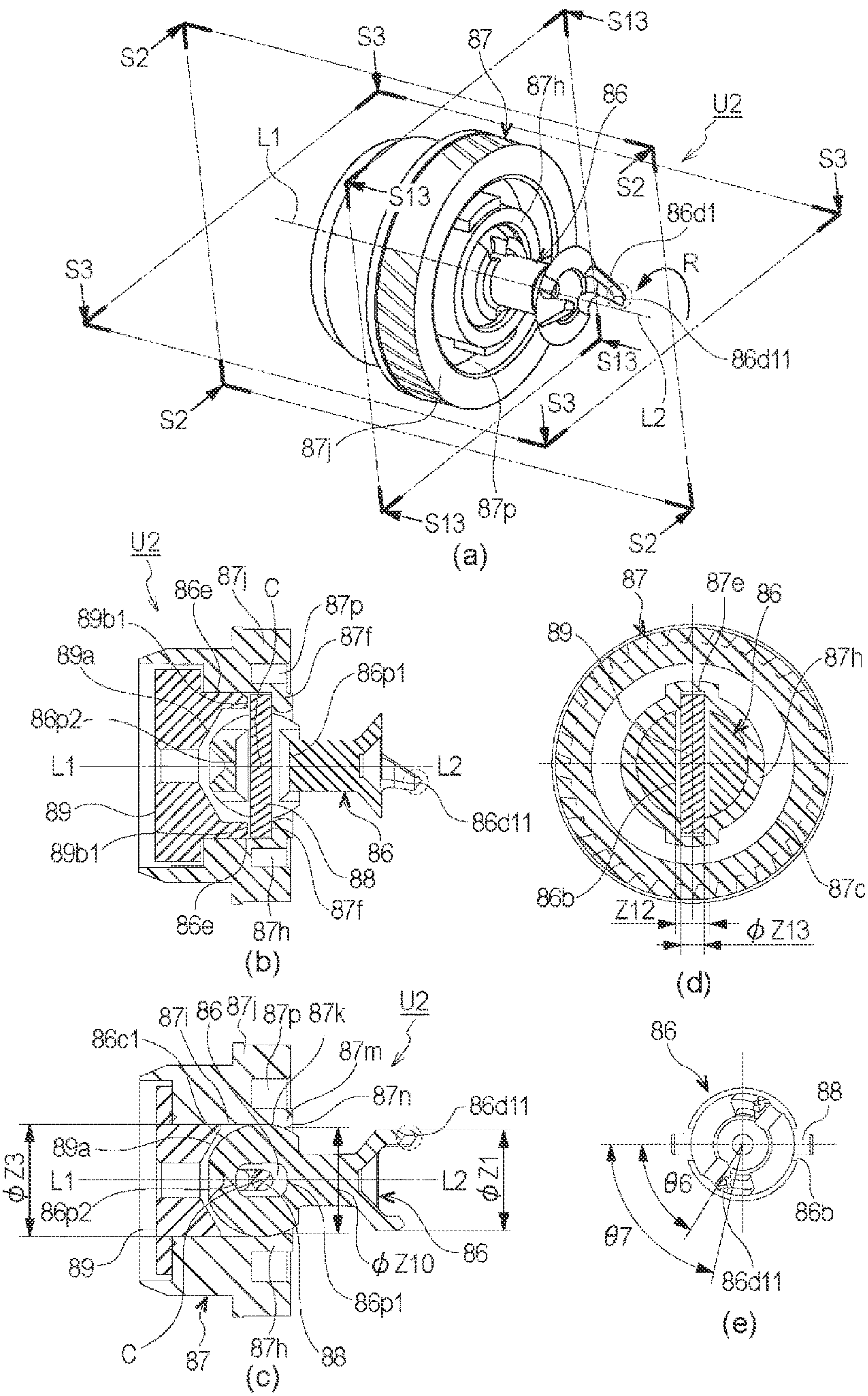
FIG. 11 is a perspective view and a sectional view of a driving side flange unit according to the embodiment.
Figure 12:
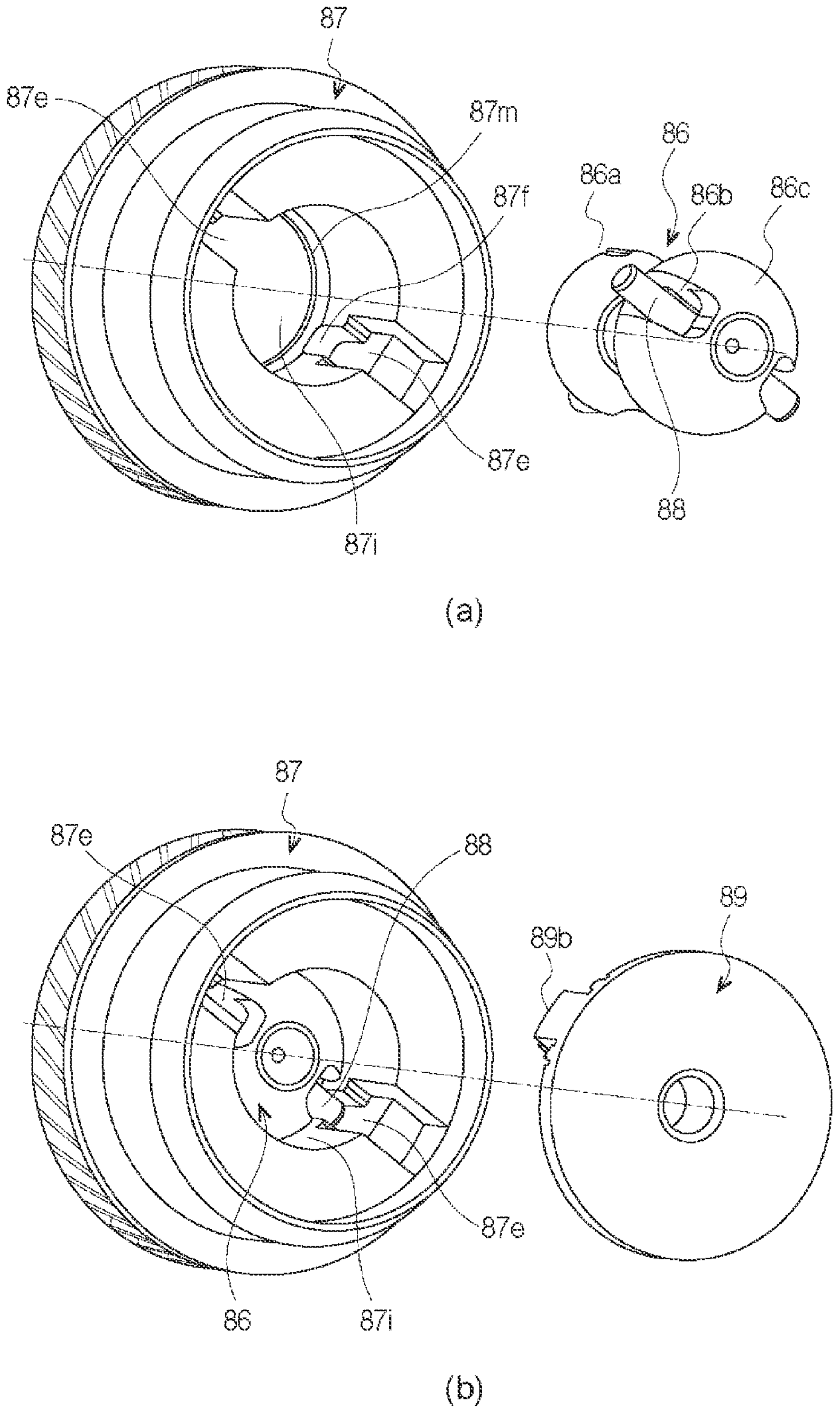
FIG. 12 is an illustration of an assembling method of the driving side flange unit, according to the embodiment.

Referring to FIGS. 10, 11 and 12, the structure of the driving side flange unit U2 will be described.

FIG. 10 is an exploded perspective view of the driving side flange unit U2, in which part (a) is a view as seen from the driving side, and part (b) is a view as seen from the non-driving side. FIG. 11 is an illustration of the driving side flange unit U2, in which part (a) is a perspective view of the driving side flange unit U2, part (b) is a sectional view taken along S4-S4 of part (a) of FIG. 11, part (c) is a sectional view taken along S5-S5 of part (a) of FIG. 11. FIG. 12 is an illustration of an assembling method for the driving side flange unit U2.

As shown in FIGS. 10 and 11, the driving side flange unit U2 comprises the coupling member 86, the pin 88 (shaft), the driving side flange 87, a closing member 89 as the regulating member. The coupling member 86 is engageable with the drive head 14 to receive the rotational force. The pin 88 has a substantially circular column configuration (or cylindrical), and extends in the direction substantially perpendicular to the axis L1. The pin 88 receives the rotational force from the coupling member 86 to transmit the rotational force to the driving side flange 87. The pin 88 as the shaft portion is provided with a rotation regulating portion for limiting rotation of the coupling member in the rotational moving direction by contacting a part of the through-hole in order to transmit the through engagement with the through-hole of the coupling member. It is also provided with a pivoting regulating portion for limiting pivoting of the coupling member by contacting a part of the penetrating shaft in order to limit the pivoting of the pin 88 and the coupling member 86.

The driving side flange 87 receives the driving force from the pin 88 to transmit the rotational force to the drum 62. The closing member 89 as a regulating member functions to prevent disengagement of the coupling member 86 and the pin 88 for the driving side flange 87. By this, the coupling member 86 is capable of taking various attitudes relative to the driving side flange 87. In other words, the coupling member 86 is held pivotably about a pivoting center, so as to take a first attitude, a second attitude which is different from the first attitude or the like. As for the free end portion of the coupling member, it can take various positions (a position, a second position different from the first position).

As described in the foregoing, the driving side flange unit U2 comprises a plurality of members, and the driving side flange 87 as a first member and the closing member 89 as a second member are unified into a flange. The driving side flange 87 functions both to receive the drive from the pin 88 and to transmit the drive to the drum 62. On the contrary, the closing member 89 substantially out of contact to the inside of the drum and supports the pin 88 together with the driving side flange 87.

Referring to FIG. 10, the constituent elements will be described.

As described hereinbefore, the coupling member 86 includes the free end portion 86*a* and the connecting portion 86*c* (accommodated portion). The connecting portion 86*c* is provided with a through hole portion 86*b*. The inside (inner wall) of the hole portion 86*b* has transmitting portions 86*b*1 and 86*b*2 for transmitting the rotational force to the pin 88. The inside (inner wall) of the hole portion 86*b* is also provided with first inclination-regulated portions 86*p*1 and 86*p*2 as inclination-regulated portions for being contacted by the pin 88 to limit the inclination amount of the coupling member 86 (also part (b2) of FIG. 15). A part of the peripheral surface of the pin 88 as the shaft portion functions as the inclination regulating portion (first inclination regulating portion).

The driving side flange 87 includes the fixed portion 87*b*, a first cylindrical portion 87*j*, an annular groove portion 87*p* and a second cylindrical portion 87*h*. The fixed portion 87*b* is fixed to the drum 62 to transmit the driving force by contacting to the inner surface of the cylinder of the drum 62. The second cylindrical portion 87*h* is provided inside the first cylindrical portion 87*j* in the radial direction, and the annular groove portion 87*p* is provided between the first cylindrical portion 87*j* and the second cylindrical portion 87*h*. The first cylindrical portion 87*j* is provided with a gear portion (helical gear) 87*c* on the radially outside, and is provided with a supported portion 87*d* on the radially inside (annular groove portion 87*p* side). The gear portion 87*c* is preferably a helical gear from the standpoint of drive transmission property, but a spur gear is usable. The second cylindrical portion 87*h* of the driving side flange 87 is hollow configuration and has a cavity as an accommodating portion 87*i* therein. The accommodating portion 87*i* accommodates the connecting portion 86*c* of the coupling member 86. In the driving side of the accommodating portion 87*i*, there is provided a conical portion 87*k* as the disengagement prevention portion (overhang portion) for limiting disengagement of the coupling member 86 toward the driving side, by contacting to the connecting portion 86*c*. More particularly, the conical portion 87*k* contacts to the outer periphery of the connecting portion 86*c* of the coupling member 86 to prevented the disengagement of the coupling member. More specifically, the conical portion 87*k* contacts to the substantially spherical portion of the connecting portion 86*c* to prevent the disengagement of the coupling member 86. Therefore, the minimum inner diameter of the conical portion 87*k* is smaller than the inner diameter of the accommodating portion 87*i*. In other words, the conical portion 87*k* overhangs from the inner surface of the accommodating portion 87*i* toward the axis center of the coupling member (hollow portion side) to contact to the peripheral surface of the connecting portion 86*c* to prevent the disengagement.

In this embodiment, the conical portion 87*k* as a center shaft coaxial with the axis L1, but may be a spherical surface or a crossing with the axis L1. The driving side of the conical portion 87*k* is provided with an opening 87*m* for projecting the free end portion 86*a* of the coupling member 86, and the diameter of the opening 87*m* (φZ10) is larger than the maximum rotation diameter φZ1 of the free end portion 86*a*. In a further driving side of the opening 87*m*, there is provided a second inclination regulating portion 87*n* as another inclination regulating portion contacting to the outer periphery of the coupling member 86 when the coupling member 86 is inclined (pivoted). More particularly, the second inclination regulating portion 87*n* contacts to the interconnecting portion 86 *g* as a second inclination-regulated portion when the coupling member 86 is inclined. A gear portion 87*c* transmits the rotational force to the developing roller 32. The supported portion 87*d* is supported by a supporting portion 76*a* of the bearing member 76 (supporting member) and is provided on the back side of the gear 87*c* with respect to the thickness direction thereof. They are coaxial with the axis L1 of the drum 62.

The structure is such that when the coupling member 86 contacts the first inclination regulating portion an inclination angle is smaller than when the coupling member 86 contacts the second inclination regulating portion, as will be described hereinafter.

The accommodating portion 87*i* inside the second cylindrical portion 87*h* is provided with a pair of groove portions 87*e* (recesses) extending in parallel with the axis L1, at 180° away from each other about the axis L1. The groove portion 87*e* opens toward the fixed portion 87*b* in the direction of the axis L1 of the driving side flange 87 and continues to the hollow portion 87*i* in the diametrical direction. The bottom portion of the groove portion 87*e* is provided with a retaining portion 87*f* which is a surface perpendicular to the axis L1. The recess 87*e* is provided with a pair of receiving portions 87 *g* for receiving the rotational force from the pin 88, as will be described hereinafter. (at least a part of) the groove portion 87*e* and (at least a part of) the annular groove portion 87*p* overlap with each other in the axis L1 direction (part (b) of FIG. 12). Therefore, the driving side flange 87 can be downsized.

The closing member 89 as the regulating member is provided with a conical base portion 89*a*, a hole portion 89*c* provided in the base portion 89*a*, and a pair of projected portions 89*b* at positions approx. 180° away from each other about the axis of the base portion. The projected portion 89*b* includes a longitudinal direction regulating portion 89*b*1 at a free end with respect to axis L1 direction.

In this embodiment, the driving side flange 87 is a molded resin material manufactured by injection molding, and the material thereof is polyacetal, polycarbonate or the like. The driving side flange 87 may be made of metal, depending on the load torque. In this embodiment, the driving side flange 87 is provided with a gear portion 87*c* for transmitting the rotational force to the developing roller 32. However, the rotation of the developing roller 32 by be effected not through the driving side flange 87. In such a case, the gear portion 87*c* may be omitted. The gear portion 87*c* is provided in the driving side flange 87 as in this embodiment, it is preferable that the gear portion 87*c* is integrally molded together with the driving side flange 87.

Figure 13:
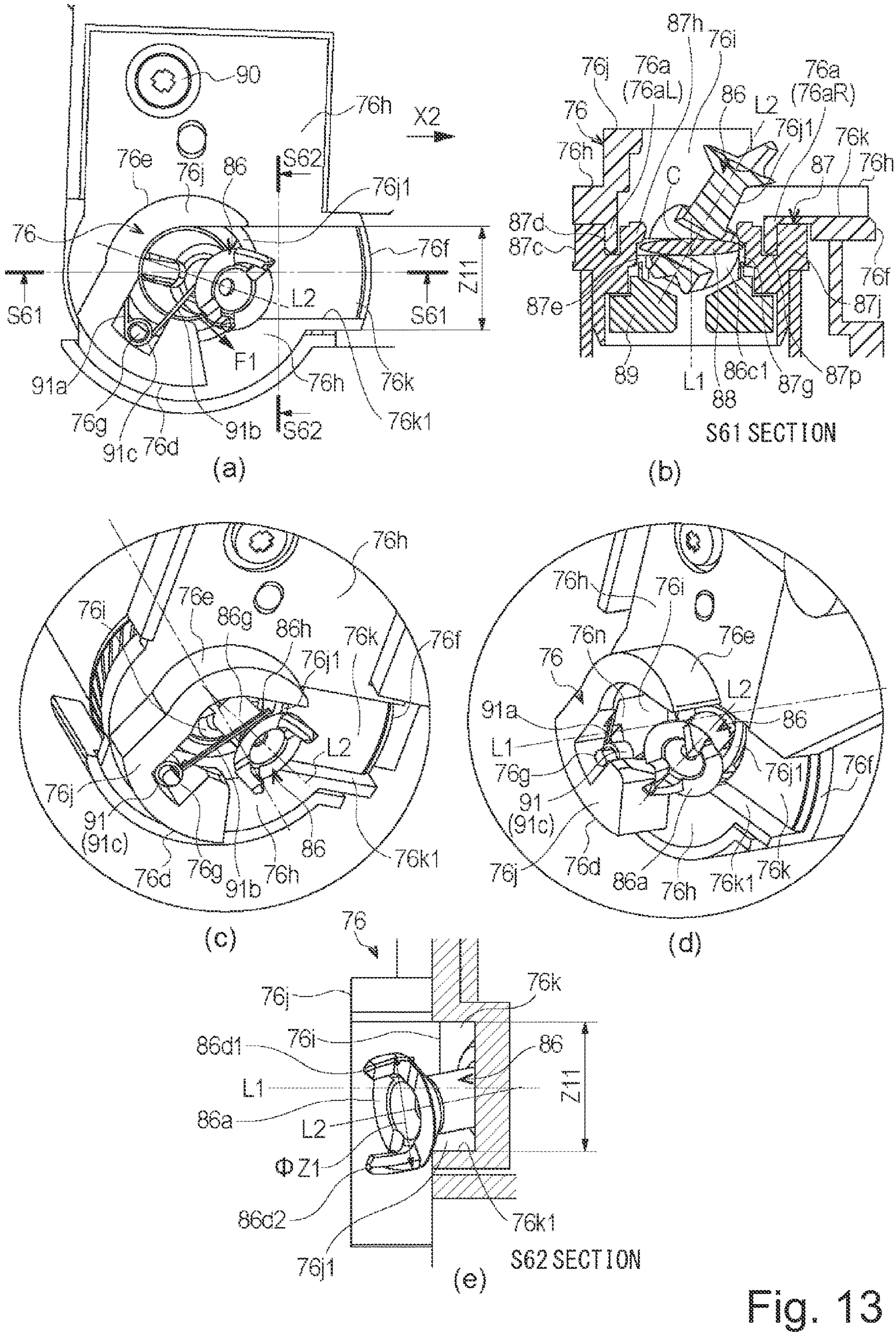
FIG. 13 is an illustration of a bearing member, according to the embodiment.
Figure 14:
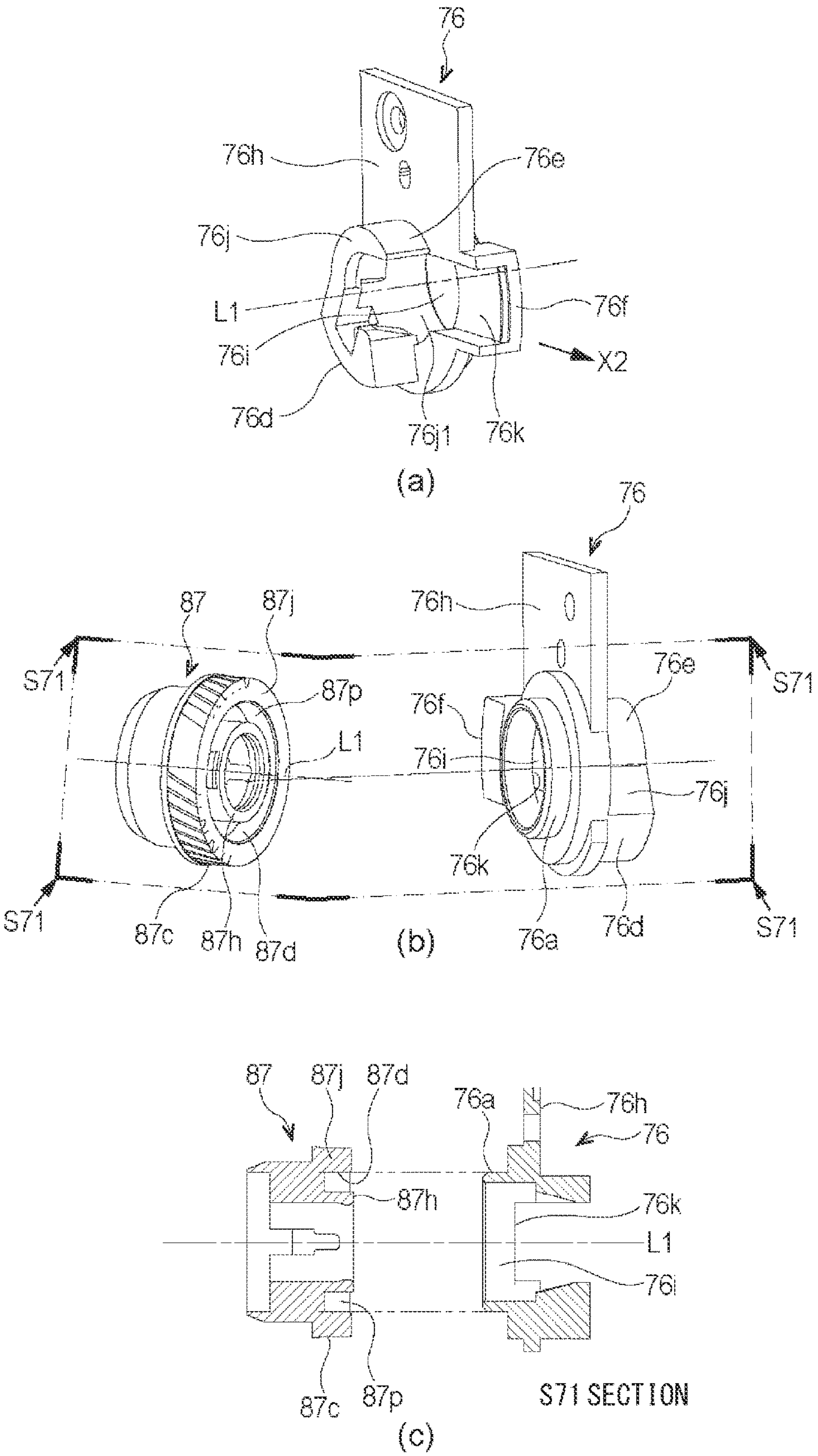
FIG. 14 is an illustration of a bearing member, according to the embodiment.

Referring to FIGS. 13 and 14, the bearing member 76 will be described in detail. FIG. 13 is an illustration showing only the bearing member 76 and parts therearound of the cleaning unit U1. Part (a) of FIG. 13 is a perspective view as seen from the driving side. Part (b) of FIG. 13 is a sectional view taken along a line S61-S61 of part (a) of FIG. 13, part (c) of FIG. 13 and part (d) of FIG. 13 are perspective views. Part (e) of FIG. 13 is a sectional view taken along a line S62-S62 of part (a) of FIG. 13. FIG. 14 is a perspective view of the bearing member 76, part (a) of FIG. 14 is a view as seen from the driving side, and part (b) of FIG. 14 a view as seen from the non-driving side and also shows the driving side flange 87 for convenience of explanation. Part (c) of FIG. 14 is a sectional view taken along S71 plane of part (b) of FIG. 14.

As shown in FIG. 14, the bearing member 76 mainly comprises a plate-like portion 76*h*, a first projected portion 76*j* projecting from plate-like portion 76*h* in one direction (driving side), a supporting portion 76*a* as a second projected portion projecting from the plate-like portion 76*h* in the other direction (non-driving side). The bearing member 76 further comprises a cut-away portion 76*k* as a retracted portion (receiving portion). The cut-away portion 76*k* as the retracted portion (receiving portion) is recessed from a reference surface of the bearing member 76, and in this embodiment, it is a groove portion extending toward the downstream side with respect to the mounting direction. The recess is preferably in the form of a groove from the standpoint of assuring the rigid of the bearing member 76, but the shape is not limited to this example. The recess from the reference surface is called retracted portion because it permits the coupling member to incline and retract, thus preventing interference between the coupling and the main assembly side drive pin. In other words, the recess from the reference surface is the receiving portion. This is because the inclined coupling member enters the recessed portion. A coupling guide of the main assembly side which will be described hereinafter is capable of entering the recess. It is not necessary that whole of the coupling member and/or the coupling guide enters the recess, but at least a part there of may enter. Therefore, the recess provided in the cartridge frame is a space for permitting retraction of the coupling and is a receiving portion for receiving the coupling member or the like.

More specifically, it will suffice if the coupling member inclining toward the downstream with respect to the mounting direction cartridge inclines (retracts) more than toward the directions, and the recess may have an expanding shape. The shape of the retracted portion (receiving portion) is not limited to a groove, but it will suffice if it is a recess extending toward the downstream beyond the rotational axis of the flange, with respect to the cartridge mounting direction. The first projected portion 76*j* is provided in a radially inside portion with a hollow portion 76*i* for accommodating the coupling member 86, and the hollow portion 76*i* is spatially connected with the cut-away portion 76*k* the cut-away portion 76*j*1 provided in a part of the first projected portion 76*j*. The cut-away portion 76*k* as the retracted portion is provided downstream of the hollow portion 76*i* with respect to the mounting direction (X2) of the process cartridge B. Thus, when the cartridge is mounted to the main assembly, the coupling member 86 is retractable (greatly pivotable) into the cut-away portion 76*k* as the retracted portion.

In addition, the cylindrical supporting portion 76*a* enters the annular groove portion 87*p* of the driving side flange 87 to rotatably support the supported portion 87*d*.

Moreover, the first projected portion 76*j* is provided with a cylindrical portion 76*d* and a spring receiving portion 76*e* which function as a guided portion and a first positioned portion when the process cartridge B is mounted to the apparatus main assembly A. At a free end side of the cut-away portion 76*k* with respect to the mounting direction (X2), a free end portion 76*f* functioning as a second positioned portion is provided. The cylindrical portion 76*d* and the free end portion 76*f* and disposed at the positions different in the direction of the axis L1 with the plate-like portion 76*h* and the cut-away portion 76*k* therebetween, and have concentric arcuate configurations having different diameters.

In this embodiment, the first cylindrical portion 87*j*, the annular groove portion 87*p*, the second cylindrical portion 87*h* and the groove portion 87*e* are overlapping in the direction of the axis L1. Therefore, the supporting portion 76*a* of the bearing member 76 entering the annular groove portion 87*p*, the pin 88, the 86*c*1 of the coupling member 86 and the gear portion 87*c* are overlapping in the direction of the axis L1. As described hereinbefore, the bearing member 76 is provided with the cut-away portion 76*k* recessed toward the non-driving side beyond the plate-like portion 76*h*, and when the coupling member 86 is inclined (pivoted), a part of the coupling member 86 is accommodated in the cut-away portion 76*k*. With this structure of the parts around the coupling member 86, the inclination (pivoting) amount of the coupling member 86 can be made large assuredly, while reducing the amount of the projection of the bearing member 76 and/or the coupling member 86 toward the driving side as compared with the gear portion 87*c*. Here, overlapping means that when parts of an object are projected on an imaginary line, the parts are overlapped. In other words, an imaginary plane (reference plane) is determined, on which the parts are projected, and if the projected parts are overlapped on the imaginary plane, the parts are overlapped.

As shown in part (e) of FIG. 13, when the coupling member 86 inclines toward the cut-away portion 76*k*, the most outer configuration of the first projected portion 76*j* in the direction of the axis L1 is outside of the (claw portions 86*d*1, 86*d*2) of the coupling member 86. By this, the risk that the claw portions 86*d*1 and 86*d*2 of the coupling member 86 collide against the other part during the transportation can be reduced.

In this embodiment, the developing roller 32 pushes the drum 62 in the direction indicated by an arrow X7, as described hereinbefore. That is, the drum unit U1 urged toward the cut-away portion 76*k*. The cut-away portion side supporting portion 76*a*R of the supporting portion 76*a* supporting (the driving side flange 87 of) the drum unit U1 is provided with the cut-away portion 76*k*. The supporting portion 76*a*L in the opposite side not having the cut-away portion 76*k* has a higher rigidity than that of the cut-away portion side supporting portion 76*a*R. Therefore, in this embodiment, the supported portion 87*d* is provided on the back side of the gear portion 87*c* with respect to the thickness direction to receive the inner surface of the driving side flange 87. By doing so, the drum unit U1 is substantially supported by the opposite side supporting portion 76*a*L. That is, the cut-away portion side supporting portion 76*a*R having a less rigidity receive a smaller load so that the supporting portion 76*a* is not easily deformed.

As shown in FIG. 13, the torsion coil spring 91 as the urging means (urging member) is provided at a position which is in the disengagement side Of the axis L1 of the driving side flange 87 with respect to the mounting and demounting direction of the coupling member 86 and which is below the axis L1. The torsion coil spring 91 includes a cylindrical coil portion 91*c*, a first arm 91*a* extending from the coil portion 91*c* and a second arm 91*b* (first end portion, second end portion). By the coil portion 91*c* being supported (locked) by a spring hook portion 76*g*, the spring is mounted to the bearing member 76. The spring hook portion 76 *g* has a cylindrical portion which is taller than the coil portion 91*c* to prevent the torsion coil spring 91 from disengaging from the spring hook portion 76*g*. The spring hook portion 76 *g* has a portion having a substantially D-like configuration, and the projection penetrates the coil portion 91*c*, by which the torsion coil spring 91 is mounted to the cartridge. In the state that the torsion coil spring 91 is mounted, diameter of the coil portion 91 is larger than the diameter of the spring hood portion 76*g*. The spring hook portion 76 *g* projects from the longitudinal end portion of the cartridge frame toward an outside of the cartridge along the rotational axis direction of the driving side flange.

The first arm 91*a* of the torsion coil spring 91 contacts a spring receiving portion 76*n* of the bearing member 76, and the second arm 91*b* thereof contacts a connection 86 *g* or a spring receiving portion 86*h* of the coupling member 86. By this, the torsion coil spring 91 urges by an urging force F1 such that the free end portion 86*a* of the coupling member 86 faces cut-away portion 76*k* side. A width Z11 of the cut-away portion 76*k* is larger than the diameter φZ1 of the free end portion 86*a* of the coupling member 86, and therefore, the free end portion 86*a* has latitude of movement up and down directions. The coil portion 91*c* of the torsion coil spring 91 is below the axis L1, and therefore, the free end portion 86*a* and coupling member 86 is urged downwardly by the urging force F1 and the gravity. By this, the axis L2 of the coupling member 86 inclines toward the cut-away portion 76*k* relative to the axis L1, and the free end portion 86*a* inclines to contact to the lower surface 76*k*1. In this embodiment, the free end portion 86*a* takes a position below the axis L1 by the urging force F1 of the torsion coil spring 91. As will be described hereinafter in conjunction with FIG. 23, the coupling member 86 is inclined so that the free end portion 86*a* thereof takes the position lower than the axis L1.

As described above, the free end portion 86*a* of the coupling member 86 is inclined in the direction of approaching to the drive head 14, by the torsion coil spring 91. Depending on the mounting direction X2, the direction of gravity, the weight of the coupling member 86 or the like, the free end portion 86*a* of the coupling member 86 is directed in the X2 direction due to the weight of the coupling member. In such a case, the coupling member 86 may be directed toward the desired direction using the gravity without provision of the torsion coil spring 91 as the urging means (urging member). The coupling member 86 of this embodiment is urged by the torsion coil spring 91 to contact to the lower side surface of the cut-away portion 76*k* in the form of a groove. By this, the coupling member is sandwiched by the torsion coil spring and the lower side surface of the groove so that the attitude of the coupling member is stabilized. By properly arranging the torsion coil spring 91, for example, the coupling member may be contacted to the upper part surface of the cut-away portion 76*k* in the form of the groove configuration. However, the coupling attitude can be stabilized more in the case of using the gravity than in the case of using the urging force of the spring against the gravity.

Referring to FIG. 11, the description will be made as to the supporting method and connecting method of the constituent parts.

The position of the pin 88 in the longitudinal direction of the drum 62 (axis L1) is limited by the retaining portion 87*f* and the longitudinal direction regulating portion 89*b*1, and the position thereof in the rotational moving direction (R direction) of the drum 62 is limited by the receiving portion 87*g*. The pin 88 penetrates the hole portion 86*b* of the coupling member 86. The play between the hole portion 86*b* and the pin 88 is set so as to permit pivoting of the coupling member 86. With such a structure, the coupling member 86 is capable of inclining (pivoting, swing, whirling) in any directions relative to the driving side flange 87.

By the connecting portion 86*c* of the coupling member 86 contacting to the accommodating portion 87*i*, the movement of the driving side flange 87 in the radial direction is limited. By the connecting portion 86*c* contacting to the base portion 89*a* of the closing member 89, the movement from the driving side toward the non-driving side is limited. Furthermore, by the contact between the spherical 86*c*1 and the conical portion 87*k* of the driving side flange 87, the movement of the coupling member 86 from the non-driving side toward the driving side is limited. By the contact between the pin 88 and the transmitting portions 86b1, 86b2, the movement of the coupling member 86 in the rotational moving direction (R direction) is limited. By this, the coupling member 86 is connected with the driving side flange 87 and the pin 88.

Here, as shown in part (d) of FIG. 11, a width Z12 of the hole portion 86b is larger than the diameter φZ13 of the pin 88. By doing so, the coupling member 86 and the pin 88 are connected with each other with a play in the rotational moving direction (R direction) of the drum 62, and therefore, the coupling member 86 can rotate through a predetermined amount about the axis L.

As described above, the position of the coupling member 86 in the axis L1 direction is limited by the contact to the base portion 89a or conical portion 87k, but because of the tolerances of parts, the coupling member 86 is made movable in the axis L1 direction through a small distance.

Referring to FIG. 12, an assembling method of the driving side flange unit U2 will be described.

As shown in part (a) FIG. 12, the pin 88 is inserted into the through hole portion 86b of the coupling member 86.

Then, as shown in part (a) of FIG. 12, the pin 88 and the coupling member 86 are inserted into the accommodating portion 87i (along the axis L1) with the phase of the pin 88 matching the pair of groove portions 87e of the driving side flange 87.

As shown in part (b) of FIG. 12, the pair of projected portions 89b of the closing member 89 as the regulating member is inserted into the pair of groove portions 87e, and in this state, the closing member 89 is fixed to the driving side flange 87 by welding or bonding.

In this embodiment, the diameter φZ1 of the free end portion 86a of the coupling member 86 is smaller than the diameter φZ10 of the opening 87m. By this, the coupling member 86, the pin 88 and the closing member 89 can all be assembled into the driving side, and therefore, the assembling is easy. In addition, the diameter φZ3 of the connecting portion 86c is smaller than the diameter of the opening 87m, by which the spherical surface portion 86c1 and the conical portion 87k can be contacted with each other. By this, the disengagement of the coupling member 86 toward the driving side can be prevented, and the coupling member 86 can be held with high precision. Because of the relationship of φZ1 (<φZ10)<φZ3, the driving side flange unit U2 can be easily assembled, and the position of the coupling member 86 can be maintained with high precision.

7. Inclining (Pivoting) Operation of Coupling

Figure 15:
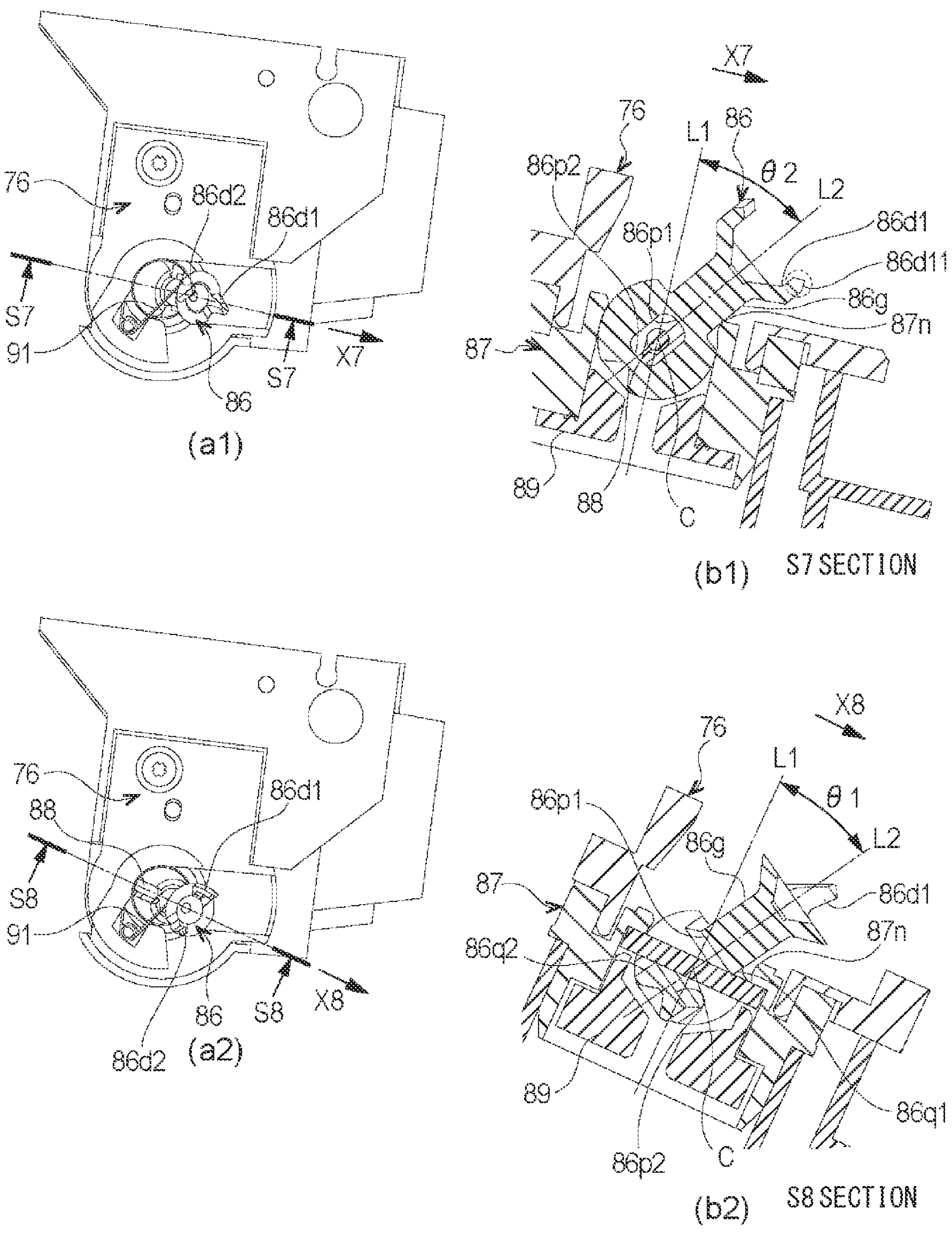
FIG. 15 is an illustration of a behavior of the pivoting of the coupling member relative to an axis L1, in this embodiment.

Referring to FIG. 15, the inclining (pivoting) operation of the coupling member 86 will be described.

FIG. 15 is an illustration of inclination (pivoting) of the coupling member 86 (including the axis L2) relative to the axis L1. Parts (a1) and (a2) of FIG. 15 is a perspective view of the process cartridge B in the state in that the coupling member 86 is inclined (pivoted). Part (b1) of FIG. 15 is a sectional view taken along a line S7-S7 of (a1) of FIG. 15. Part (b2) of FIG. 15 is a sectional view taken along a line S8-S8 of (a2) of FIG. 15.

Referring to FIG. 15, the inclination (pivoting) of the coupling member 86 about the center of the sphere of the connecting portion 86c will be described.

As shown in (a1) and (b1) of FIG. 15, the coupling member 86 is capable of inclining about the axis of the pin 88 about the center of the sphere of the connecting portion 86c relative to the axis L1. More specifically, the coupling member 86 is capable of inclining (pivoting) to such an extent that the second inclination-regulated portion (a part interconnecting portion 86g) contacts to the second inclination regulating portion 87n of the driving side flange 87. Here, the inclination (pivoting) angle relative to the axis L1 is a second inclination angle θ2 (second inclination amount, second angle). The phase relation between the hole portion 86b and the claw portions 86d1, 86d2 are selected such that any one of the claw portion 86d1 and the claw portion 86d2 takes a leading position with respect to the direction in which the coupling member 86 inclines (arrow X7 direction) when the coupling member 86 inclines about the axis of the pin 88. More particularly, the hole portion 86b and the claw portions 86d1, 86d2 are disposed such that the free end 86d11 of the claw portion 86d1 is not less than 59° and not more than 77° relative to an imaginary line penetrating through the center of the hole portion 86b (θ6 and θ7) in part (e) of FIG. 11). The angles θ6 and θ7 are not limited to the examples, and preferably in the range not less than approx. 55° and not more than approx. 125° With such a structure, when one of the claw portions 86d1, 86d2 is in a leading position with respect to the inclination of the coupling member 86, the pin 88 takes a large angle position (not less than approx. 55° and not more than approx. 125°) relative to the direction of inclination of the coupling member 86. Then, the coupling member 86 can incline to the second inclination amount or the amount close thereto, that is, it can incline to a larger amount then the first inclination amount which will be described hereinafter. Thus, the free end 86d11 can be retracted greatly in the axis L1 direction.

As shown in (a2) and (b2) of FIG. 15, the coupling member 86 is capable of inclining (pivoting) relative to the axis L1 about the center of the sphere of the connecting portion 86c around the axis perpendicular to the axis of the pin 88 to a extent that the first inclination-regulated portions 86p1 and 86p2 contact to the pin 88. Because of the above-described phase relation between the hole portion 86b (pin 88) and the claw portions 86d1, 86d2, the coupling member 86 inclines (pivots) about an axis perpendicular to the axis of the pin 88. At this time, the claw portions 86d1 and 86d2 are in the positions which are opposed to each other across the direction (arrow X8 direction) of the inclination of the coupling member 86. The inclination (pivoting) angle relative to the axis L1 is a first inclination angle θ1 (first inclination amount, first angle). In this embodiment, the coupling member 86, the driving side flange 87 and the pin 88 are constructed such that first inclination angle θ1<second inclination angle θ2 is satisfied, for the reasons which will be described hereinafter with FIG. 25.

By combination of the inclination (pivoting) about the axis of the pin 88 and the inclination (pivoting) about the axis perpendicular to the axis of the pin 88, the coupling member 86 is capable of inclining (pivoting) in a direction different from those described above. Because the inclination (pivoting) in any directions are provided by the combination, the inclination (pivoting) angle in any direction is not less than first inclination angle θ1 and not more than second inclination angle θ2. In other words, the coupling is pivotable not less than the first inclination angle θ1 (first pivoting angle) and the second inclination angle (second pivoting angle)

In this manner, the coupling member 86 can incline (pivot) relative to the axis L1 substantially all directions. In other words, the coupling member 86 can incline (pivot) relative to the axis L1 in any directions. That is, the coupling member 86 can swing relative to the axis L1 in any directions. Further, the coupling member 86 can whirl relative to the axis L1 in any directions. Here, the whirling of the coupling member 86 is revolving of the inclined (pivoted) axis L2 around the axis L1.

As described above, the arcuate surface portions 86*q*1 and 86*q*2 determine the first inclination angle θ1, and the interconnecting portion 86 *g* has a dimension determining the second inclination angle θ2. Therefore, the diameters of the interconnecting portion 86 *g* and the arcuate surface portions 86*q*1 and 86*q*2 may be different from each other, although they are the same in this embodiment.

8. Driving Portion of the Apparatus Main Assembly

Figure 16:
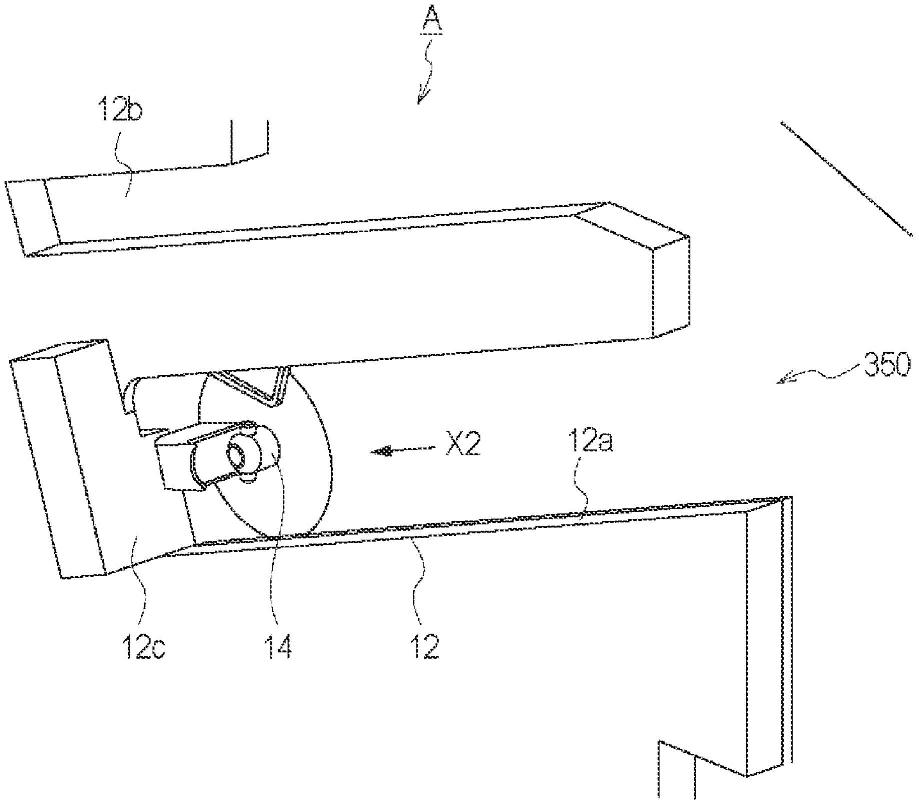
FIG. 16 is a perspective view of a driving portion of a main assembly according to the embodiment of the present invention.

Referring to FIG. 16 toward FIG. 18, a structure of the cartridge driving portion of the apparatus main assembly A will be described.

Figure 17:
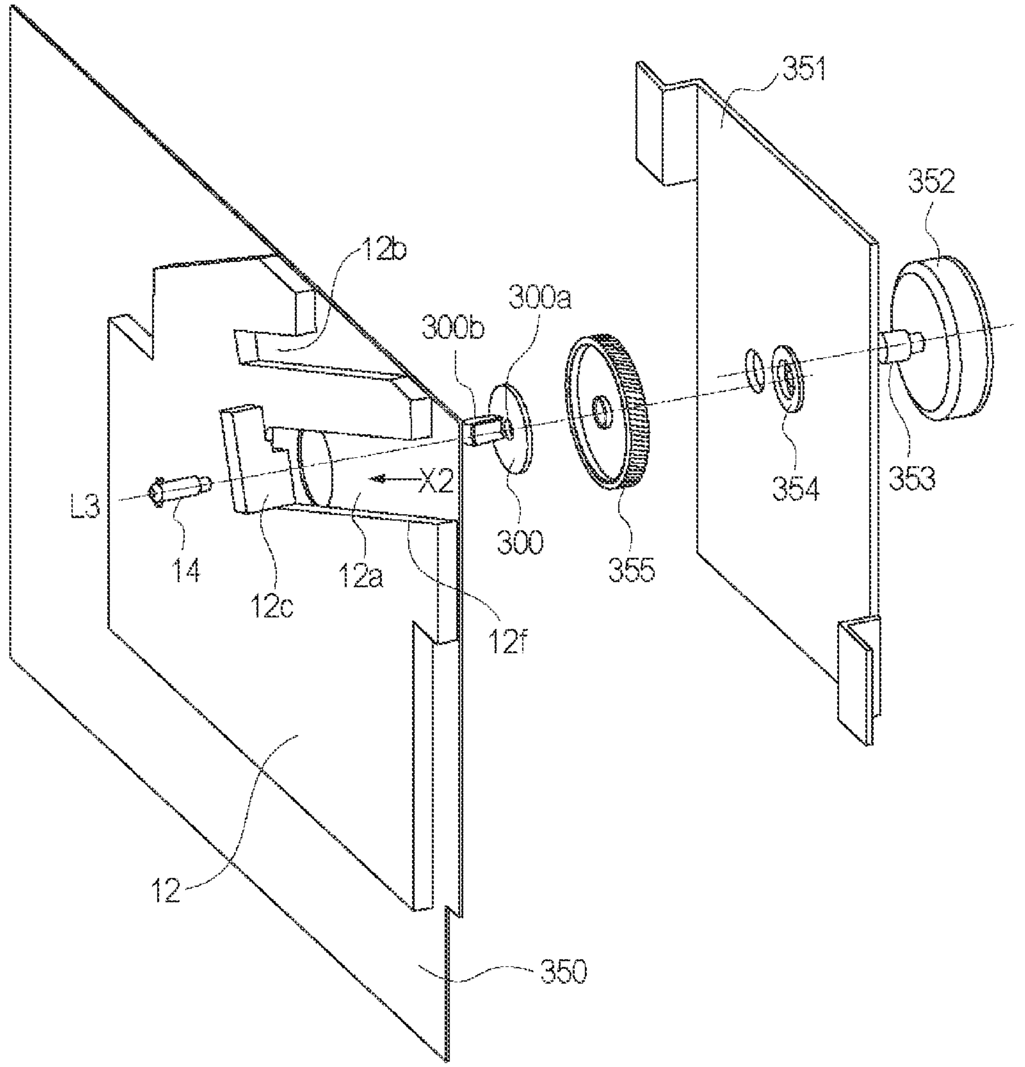
FIG. 17 is an exploded view of the driving portion of the main assembly according to the embodiment of the present invention.

FIG. 16 is a perspective view of the driving portion of the apparatus main assembly A (neighborhood of the drive head 14 of part (a) of FIG. 4), as seen from an upstream inside of the apparatus main assembly A with respect to the mounting direction (X2 direction) of the process cartridge B. FIG. 17 is an exploded perspective view of the driving portion, part (a) of FIG. 18 is a partly enlarged view of the driving portion, and part (b) of FIG. 18 is a sectional view taken along a cutting plane S9-S9 of part (a) of FIG. 18.

The cartridge driving portion comprises a drive head 14 as the main assembly side engaging portion, a first side plate 350, a holder 300, a driving gear 355 and so on.

Figure 18:
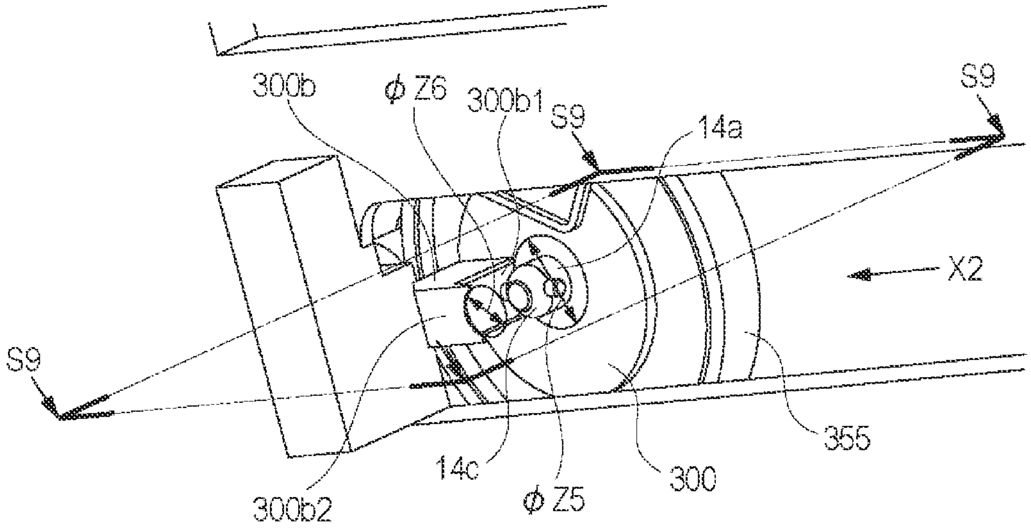
FIG. 18 is an illustration of a driving portion of the main assembly according to the embodiment of the present invention.
Figure 18:
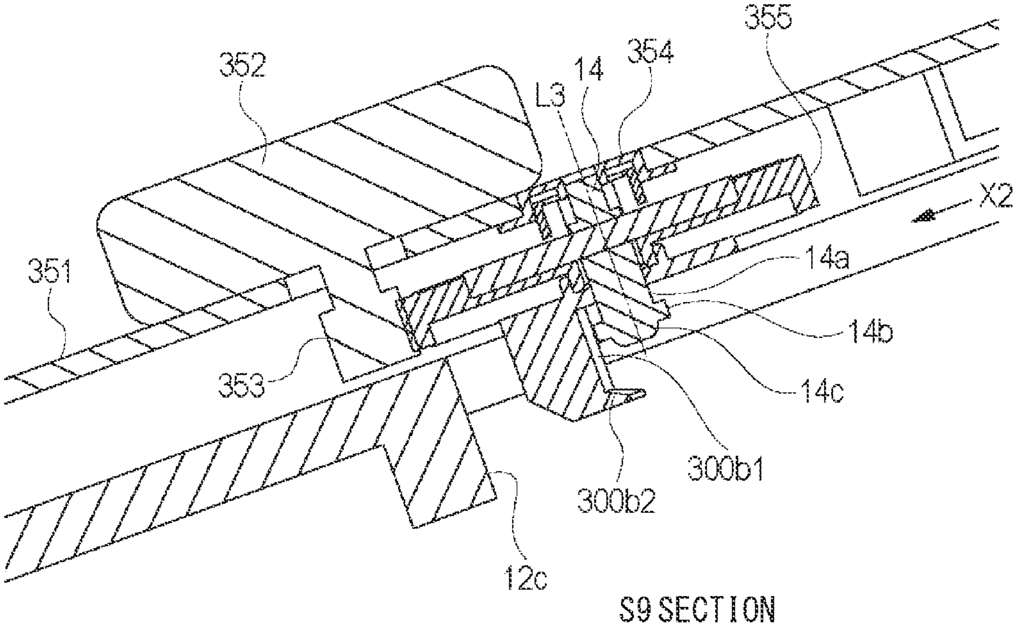

As shown in part (b) of FIG. 18, a driving shaft 14*a* of the drive head 14 as the main assembly side engaging portion is non-rotatably fixed to the driving gear 355 by a means (unshown). Therefore, when the driving gear 355 rotates, the drive head 14 as the main assembly side engaging portion also rotates. The driving shaft 14*a* is rotatably supported by a supporting portion 300*a* of the holder 300 and a bearing 354 at the respective end portions.

As shown in part (b) of FIGS. 17 and 18, a motor 352 as the driving source is mounted to a second side plate 351, and the rotation shaft thereof is provided with a pinion gear 353. The pinion gear 353 is engaged with the driving gear 355. Therefore, when the motor 352 rotates, the driving gear 355 rotates, and the drive head 14 as the main assembly side engaging portion also rotates. The second side plate 351 and the holder 300 are fixed to the first side plate 350.

As shown in FIGS. 16 and 17, the guiding member 12 as the guiding mechanism includes a first guiding member 12*a* and a second guiding member 12*b* for guiding the mounting of the process cartridge B. At a terminal end of the first guiding member 12*a* with respect to the cartridge mounting direction (X2 direction), a mounting end portion 12*c* perpendicular to the X2 direction is provided. The guiding member 12 is also fixed to the first side plate 350.

As shown in FIGS. 17 and 18, the holder 300 is provided with the supporting portion 300*a* for rotatably supporting the driving shaft 14*a* of the drive head 14 as the main assembly side engaging portion, and a coupling guide 300*b*. The coupling guide 300*b* is positioned downstream of the supporting portion 300*a* with respect to the mounting direction (X2 direction) of the process cartridge B (rear side of the main assembly), and is provided with an interconnecting portion 300*b*1 and a guide portion 300*b*2. Here, the interconnecting portion 300*b*1 has an arcuate configuration of a diameter φZ5 about the axis L3, in which the diameter φZ5 is selected so as to be larger than the maximum rotation diameter φZ2 of the free end portion 86*a* of the coupling member 86. A free end of the guide portion 300*b*2 has an arcuate configuration of a diameter φZ6 about the axis L3. The diameter φZ6 is determined relative to the interconnecting portion 86 *g* of the coupling member 86 so as to provide a predetermined gap S therebetween. The predetermined gap S is provided to prevent interference between the interconnecting portion 86 *g* and the guide portion 300*b*2 in consideration of tolerances or the like, when the process cartridge B is rotated (which will be described hereinafter with FIG. 22).

9. Mounting of Process Cartridge to Apparatus Main Assembly

Figure 19:
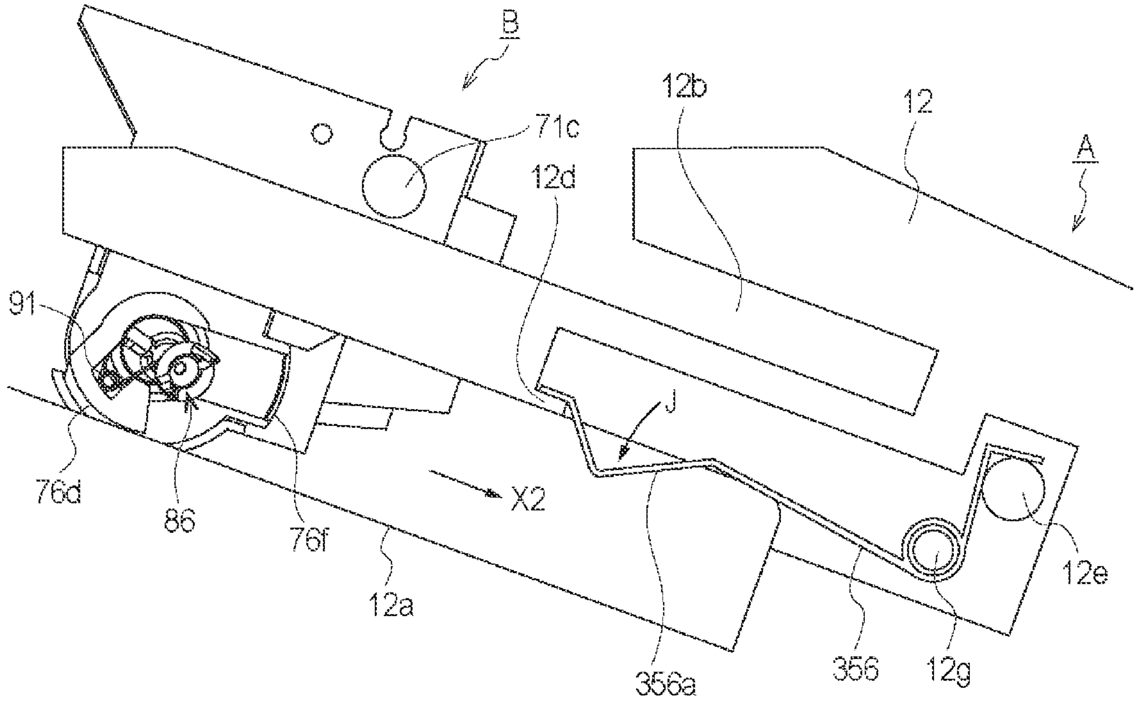
FIG. 19 is an illustration illustrating the state in the process of mounting the cartridge to the main assembly according to the embodiment of the present invention.

Referring to FIG. 19 to FIG. 22, mounting of the process cartridge B to the apparatus main assembly A will be described. In FIGS. 19 and, the parts other than those required for the description of the mounting operation are omitted.

Figure 20:
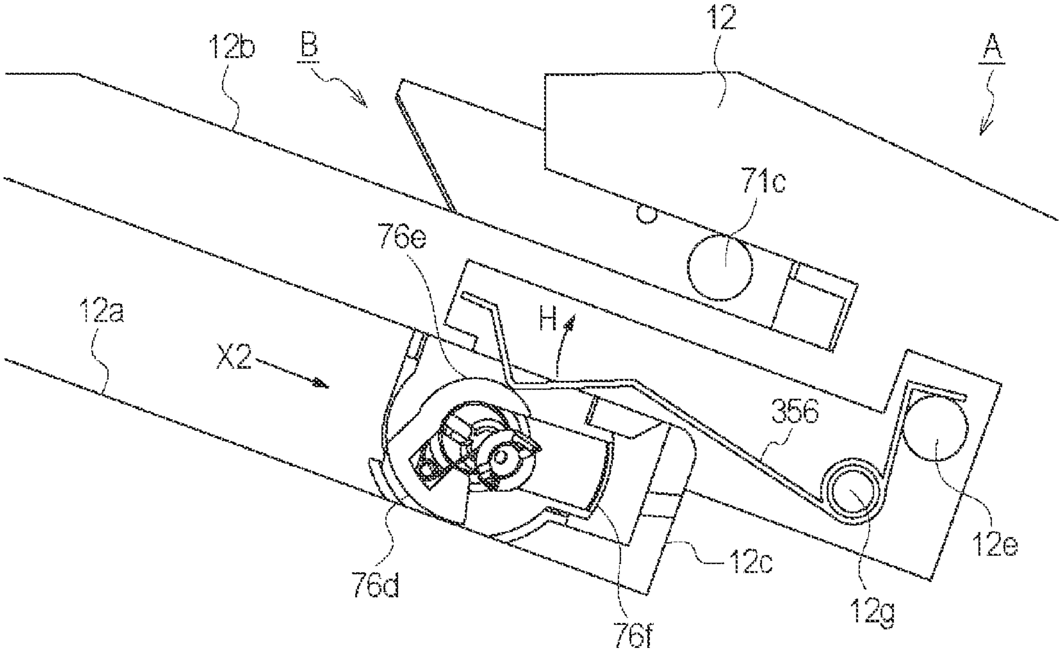
FIG. 20 is an illustration illustrating the state in the process of mounting the cartridge to the main assembly according to the embodiment of the present invention.
Figure 21:
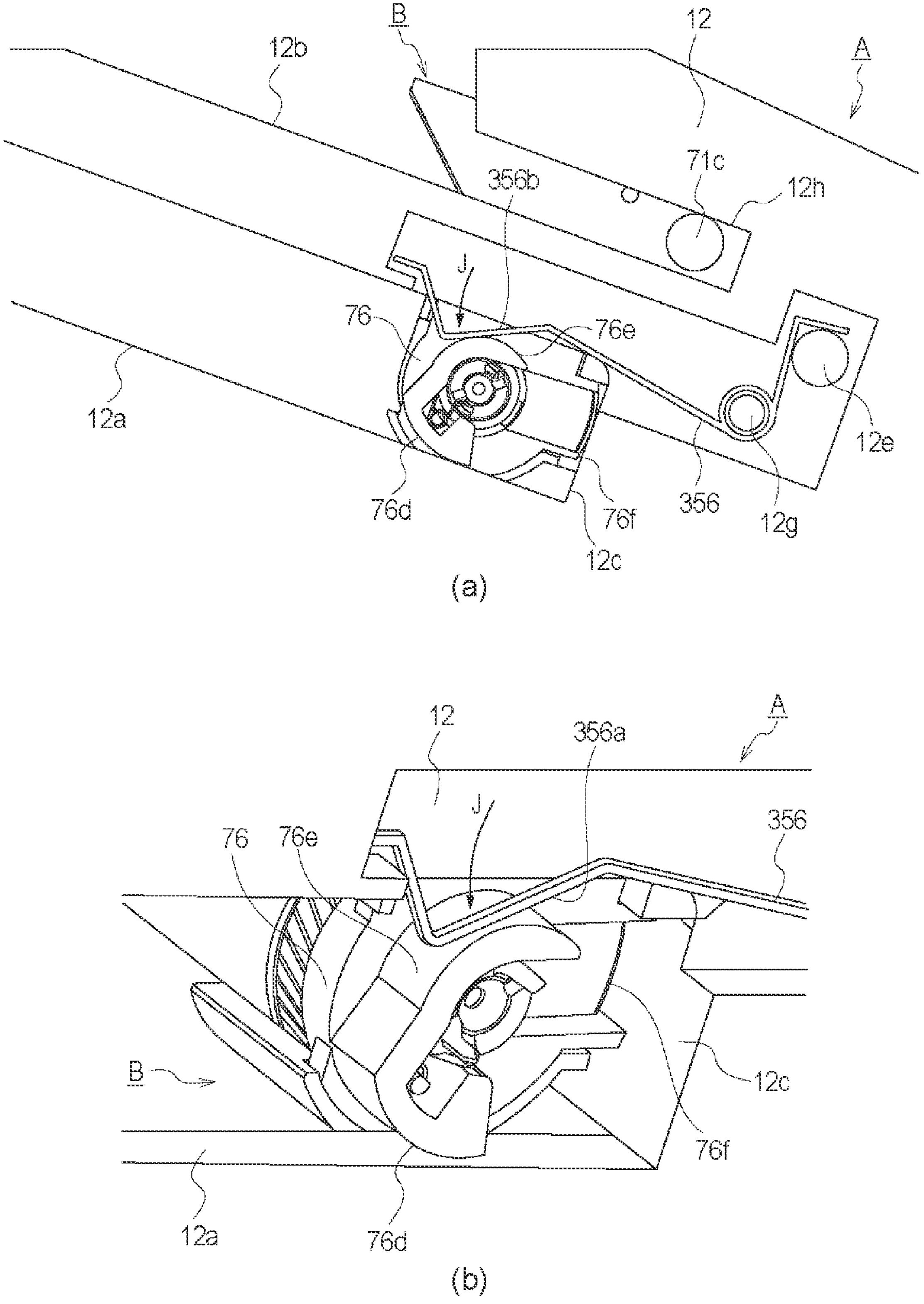
FIG. 21 is an illustration illustrating the state in which the mounting of the cartridge to the main assembly of the apparatus has completed, in the embodiment of the present invention.
Figure 22:
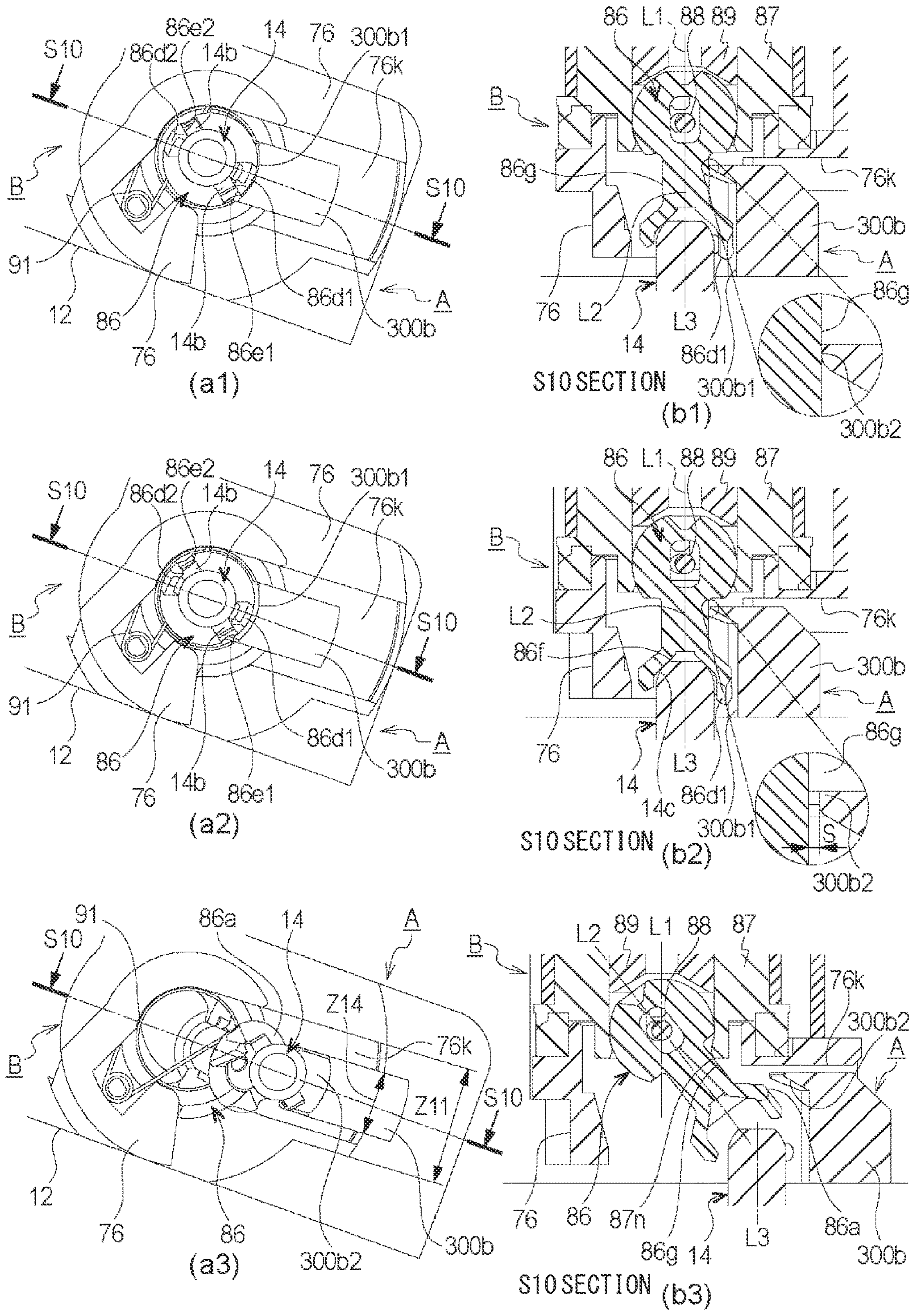
FIG. 22 is an illustration of a coupling guide in the embodiment of the present invention.

Part (a) of FIGS. 19, 20 and 21 is a view of the apparatus main assembly A as seen from outside in the driving side. Part (b) of FIG. 21 is a perspective view in the state shown in part (a) of FIG. 21. FIG. 22 is an illustration of details of the neighborhood of the coupling member 86 at the time when the mounting of the process cartridge B to the apparatus main assembly A is completed. In FIG. 22, the apparatus main assembly A is shown as having a drive head 14 as the main assembly side engaging portion, a coupling guide 300*b* of the holder 300, and the guiding member 12, and the other parts are members of the process cartridge B.

In (a1) of the FIG. 22, the process cartridge B is in the mounting completed position, and the coupling member 86 is inclined (pivoted). In (a2) of FIG. 22, the process cartridge B is in the mounting completed position, and the axis L2 of the coupling member 86 is substantially coaxial with the axis L3 of the drive head 14 as the main assembly side engaging portion. Part (a3) of FIG. 22, is an illustration of a relationship between the coupling member 86 and the coupling guide 300*b* at the time when the coupling member 86 is inclined (pivoted). Parts (b1) to (b3) of FIG. 22 are sectional views taken along lines S10-S10 of (a1) to (a3) of FIG. 22, respectively.

As shown in FIG. 19, the guiding member 12 as the apparatus main assembly A guiding mechanism is provided with pulling spring 356 as an urging member (elastic member). The pulling spring 356 is rotatably supported on a rotational shaft 320*c* of the guiding member 12, and the position thereof is limited by stoppers 12*d* and 12*e*. An operating portion 356*a* of the pulling spring 356 is urged in the direction of an arrow J in FIG. 19.

As shown in FIG. 19, when the process cartridge B is mounted to the apparatus main assembly A, it is inserted so that a first arcuate portion 76*d* of the process cartridge B moves along the first guiding member 12*a*, and a rotation stopper boss 71*c* of the process cartridge B moves along the second guiding member 12*b*. The first arcuate portion 76*d* of the process cartridge contacts the guide groove of the main assembly side, and at this time, the coupling member 86 is inclined toward the downstream of the mounting direction (X2 direction) by the torsion coil spring 91 as the urging member (elastic member). Here, the coupling member 86 is covered by the first arcuate portion 76*d* of the bearing member 76. By this, the process cartridge B can be inserted to a neighborhood of the mounting completed position in the state, without interference with any parts of the apparatus main assembly A in the insertion path for the process cartridge B.

As shown in FIG. 20, when the process cartridge B is further inserted in the arrow X2 direction in the Figure, the spring receiving portion 76*e* of the process cartridge B is brought into contact to the operating portion 356*a* of the pulling spring 356. By this, the operating portion 356*a* elastically deforms in an arrow H direction in the Figure.

Thereafter, the process cartridge B is mounted to a predetermined position (mounting completed position) (FIG. 21). At this time, the first arcuate portion 76*d* of the process cartridge B contacts the first guiding member 12*a* of the guiding member 12, and the leading end portion 76*f* with respect to the mounting direction contacts to the mounting end portion 12*c*. Similarly, a rotation stopper boss 71*c* of the process cartridge B contacts to a positioning surface 12*h* of the guiding member 12 as the guiding mechanism. In this manner, the position of the process cartridge B relative to the apparatus main assembly A is determined.

At this time, the operating portion 356*a* of the pulling spring 356 presses the spring receiving portion 76*e* of the process cartridge B in the arrow J direction in the Figure to assure the contact between the first arcuate portion 76*d* and the first guiding member 12*a* and the contact between the leading end portion 76*f* and the mounting end portion 12*c*. By this, the process cartridge B is correctly positioned relative to the apparatus main assembly A.

When the process cartridge B is mounted to the apparatus main assembly A, the coupling member 86 is engaged with the drive head 14 as the main assembly side engaging portion (FIG. 5) as described hereinbefore, so that the mounting of the process cartridge B to the main assembly is completed.

As shown in (a1) and (b1) of FIG. 22, even when the mounting of the process cartridge B is completed, the coupling member 86 tends to incline (pivot) in the mounting direction (X2 direction) by the torsion coil spring 91. In other words, even after the completion of the mounting, the torsion coil spring 91 continues to apply the urging force to the coupling member 86 (substantially toward the downstream with respect to the cartridge mounting direction). At this time, the interconnecting portion 86 *g* contact the guide portion 300*b*2 of coupling guide 300*b* so that the inclination (pivoting) of the coupling member 86 is limited. By limiting the inclination amount of the coupling member 86, the claw portions 86*d*1 and 86*d*2 simultaneously contact the drive pin 14*b* of the drive head 14. More particularly, the claw portions are disposed at substantially point symmetry positions about the rotation axis of the coupling member. When the rotational force is transmitted to the coupling member 86 in this state, the axis L2 of the coupling member 86 is substantially aligned with the axis L3 of the drive head 14 by a couple of forces and the contact between the spherical surface portion 14*c* and the conical portion 86*f*, as shown in (a2) and (b2) of FIG. 22. And, the above-described gap S is provided between the interconnecting portion 86 *g* and the guide portion 300*b*2, so that the coupling member 86 can be rotated stably.

When the inclination (pivoting) of the coupling member 86 is not limited, one of the claw portions 86*d*1 and 86*d*2 constituting the pair may not contact the drive pin 14*b*. In such a case, the above-described couple of forces is not supplied with the result of incapability of aligning the axis L2 of the coupling member 86 with the axis L3 of the drive head 14.

The coupling guide 300*b*1 does not interfere with the coupling member 86 in the mounting and demounting process of the process cartridge B even when the coupling member 86 is in a inclined (pivoted) state. To accomplish this, the coupling guide 300*b* is provided in a non-driving side of the free end portion 86*a* ((a3) and (b3) of FIG. 22). The cut-away portion 76*k* of the bearing member 76 is further recessed to the non-driving side of the guide portion 300*b*2 so as to avoid the interference with the guide portion 300*b*2. In addition, the width Z11 of the cut-away portion 76*k* of the bearing member 76 measured in the direction perpendicular to the line S10-S10 is larger than the width Z14 of the coupling guide 300*b*. By this, the size of the cartridge can be reduced while suppressing interference between the coupling guide and the cartridge.

In this embodiment, the inclination (pivoting) of the coupling member 86 by the torsion coil spring 91 is limited by the coupling guide 300*b*. However, as described above, the inclination (pivoting) of the coupling member 86 may be effected by another means other than the torsion coil spring 91. For example, when the coupling member 86 inclines by the weight thereof, the coupling guide 300*b* may be disposed at a lower side. As described above, the coupling guide 300*b* may be provided at a position where the inclination (pivoting) of the coupling member 86 is limited in the mounting of the process cartridge B.

10. Engagement and Disengagement of Coupling in Dismounting Operation of Process Cartridge.

Figure 24:
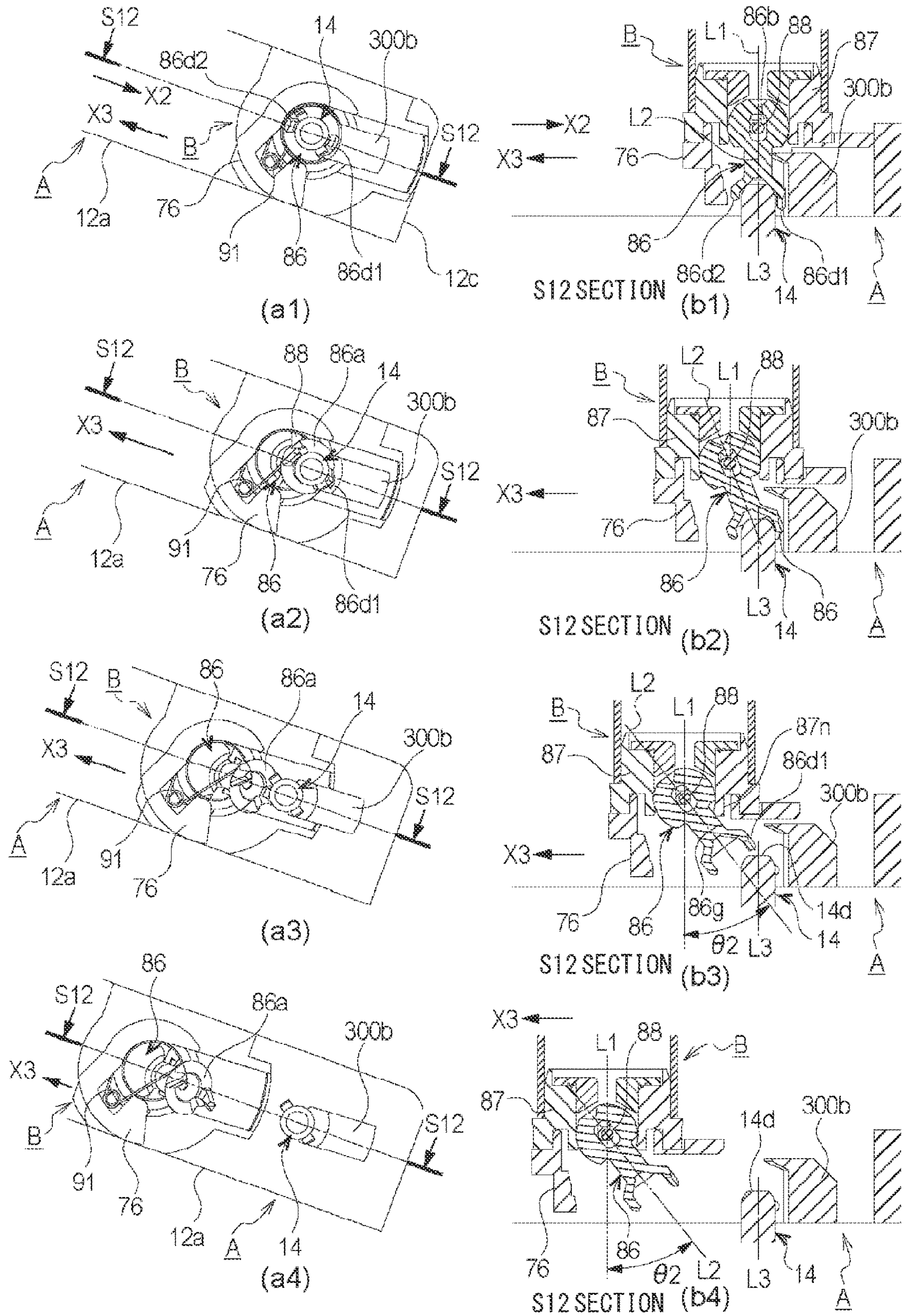
FIG. 24 is an illustration of dismounting of the cartridge from the main assembly in the embodiment of the present invention.

Referring to FIG. 24, the dismounting of the process cartridge B from the apparatus main assembly A from the mounting completed position of the process cartridge B while the coupling member 86 is disengaging from the drive head 14 as the main assembly side engaging portion will be described.

The description will be made as to an example of this embodiment, in which the claw portions 86*d*1 and 86*d*2 of the coupling member 86 are in the upstream and downstream positions, respectively, with respect to the dismounting direction, as shown in FIG. 24. In this embodiment, in this state, the phase relation between the hole portion 86*b* penetrated by the pin 88 and the claw portions 86*d*1 and 86*d*2 is such that the axis of the pin 88 is substantially perpendicular to the dismounting direction (X3 direction). Part (a1) of FIG. 24 shows a state from which the disengagement of the coupling member 86 from the main assembly A occurs at the time of the dismounting of the process cartridge B from the apparatus main assembly A. Parts (a1) to (a4) of FIG. 24 are perspective views as seen from an outside in the driving side, parts (b1) to (b4) of FIG. 24 are sectional views taken along lines (a1) to (a4) of FIG. 24, respectively. In FIG. 24, similar to FIG. 22, the apparatus main assembly A is shown as having a drive head 14 as the main assembly side engaging portion, a coupling guide 300*b* of the holder 300, and the guiding member 320, and the other parts are members of the process cartridge B.

The process cartridge B is moved in the dismounting direction (X3 direction) from the state shown in parts (a1) and (b1) in which the coupling member 86 is engaged with the drive head 14. Then, as shown in (a2) and (b2) of FIG. 24, the (axis L2 of) the coupling member 86 is inclined (pivoted) relative to the axis L1 and in the axis L3, while the process cartridge B move in the dismounting direction (X3 direction). At this time, the amount of the inclination (pivoting) of the coupling member 86 is determined by the contact of the free end portion 86*a* to the parts of the drive head 14 (the drive shaft 14*a*, the drive pin 14*b*, the spherical surface portion 14*c* and the free end portion 14*d*).

When the process cartridge B is further moved in the dismounting direction (X3 direction), the coupling member 86 is disengaged from the drive head 14 as the main assembly side engaging portion, as shown in (a3) and (b3) of FIG. 24. The coupling member 86 is urged by the torsion coil spring 91 as the urging means (urging member), by which it is further inclined (pivoted). The inclination angle of the coupling member 86 urged by the torsion coil spring as the urging member is larger than the inclination angle in the direction other than the urged direction.

By the contact between the second inclination regulating portion 87*n* and in the interconnecting portion 86 *g* the inclination (pivoting) of the coupling member 86 is limited.

The maximum rotation diameter φZ2 of the interconnecting portion 86 *g* and the second inclination angle θ2 are determined so that the coupling member 86 can incline (pivot) to such an extent that the upstream claw portion **86*d*1 with respect to the dismounting direction can be positioned in the non-driving side beyond the free end portion 14*d* of the drive head 14. By doing so, as shown in (a4) and (b4) of FIG. 24, the process cartridge B can be dismounted from the apparatus main assembly A while the coupling member 86 is disengaging from the drive head 14** as the main assembly side engaging portion.

Figure 23:
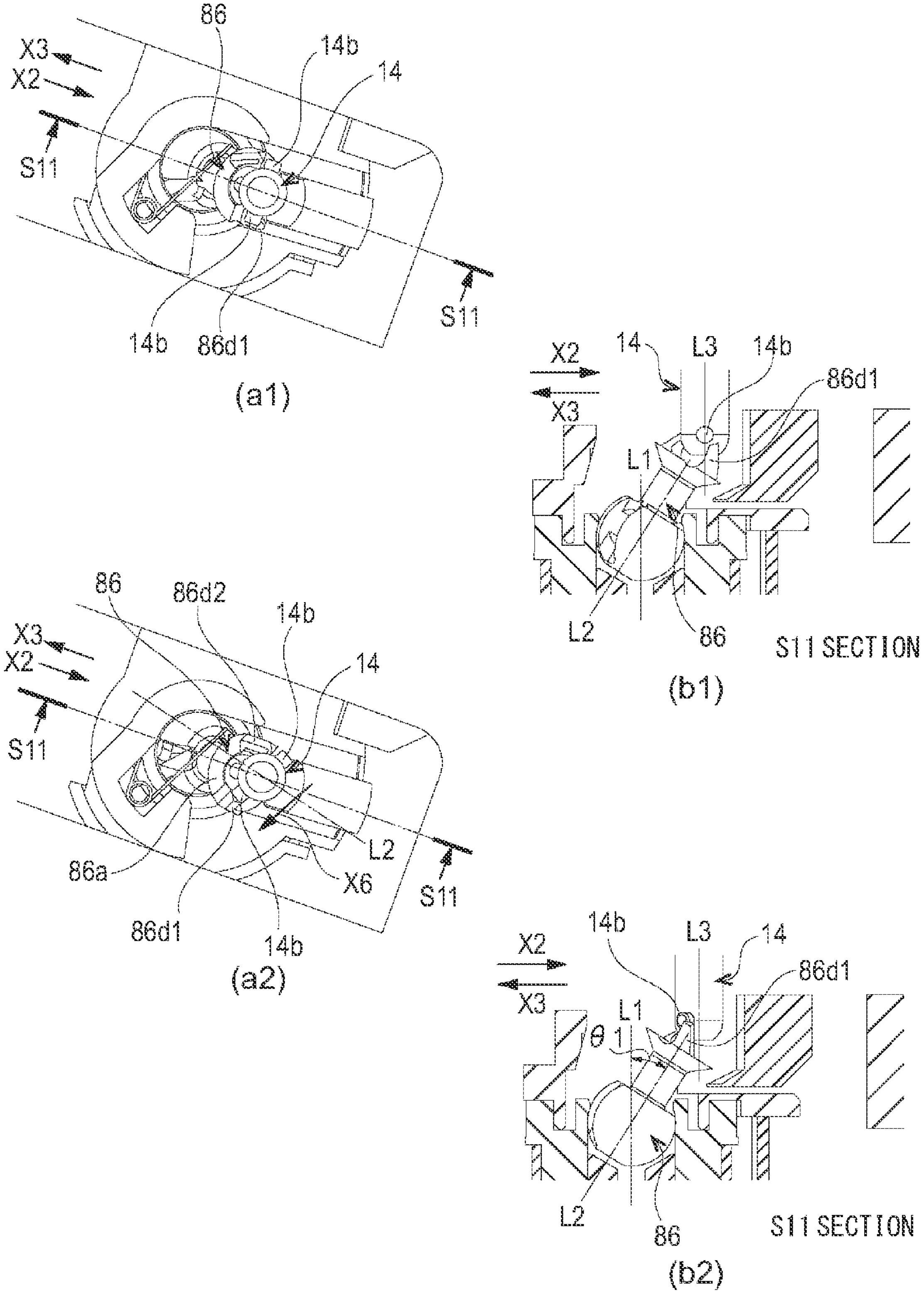
FIG. 23 is an illustration of dismounting of the cartridge from the main assembly in the embodiment of the present invention.

In the case that the claw portions **86*d*1 and 86*d*2 are in the phase other than that described above, the coupling member 86 circumvents the parts of the drive head 14 as the main assembly side engaging portion by the inclination (pivoting) and/or the above-described whirling, or by a combination of these motions. By the circumventing motion, the coupling member 86 can be disengaged from the drive head 14 as the main assembly side engaging portion. As shown in (a1) and (b1) of FIG. 23, in the case that the axial direction of the drive pin 14*b* and the dismounting direction (X3 direction) are substantially perpendicular to each other, the inclination occurs such that the free end portion 86*b* direct away from the dismounting direction (X2 direction), so that the claw portion 86*d*1 dodges the drive pin 14*b* in the non-driving side direction. Or, when the claw portions 86*d*1 and 86*d*2 are opposed to each other interposing the dismounting direction (X3 direction) as shown in (a2) and (b2) of FIG. 23, the inclination (pivoting) occurs such that the free end portion 86*a* moves in the direction (X6 direction) parallel with the axial direction of the drive pin 14*b*. By this, the claw portion 86*d*1 can dodge the drive pin 14*b* in the direction indicated by the arrow X6. In such a case, it is necessary that the free end portion 86*a* is moved to below the axis L3 and the axis L1, and therefore, the position of the lower surface 76*k*1 of the bearing member 76 is determined as described above, and the direction of the urging force of the torsion coil spring 91 is determined so that the free end portion 86*a* is directed downward. Here, the lower, below and downward are not necessarily limited to those on the basis of the direction of gravity. More particularly, it will suffice if the free end portion 86*a* is movable in the direction necessary for the claw portion 86*d*1 placed in the downstream side with respect to the mounting direction (upstream side with respect to the dismounting direction) to dodge the drive pin 14*b*. Therefore, in the case that the rotational moving direction R of the drum 62 is opposite to that of this embodiment, the claw portion placed in the downstream side with respect to the mounting direction is in the upper side, and therefore, the direction in which the free end portion 86*a* is to move is upward. Therefore, in the case that the claw portions 86*d*1 and 86*d*2 are placed in the upper and lower positions across the mounting direction X2 of the coupling member 86, it is preferable that the free end portion 86*a* is movable toward the claw portion with which the direction of the rotational force received from the drive pin 14*b* is codirectional with the mounting direction. In the two examples shown in FIG. 23, the inclination (pivoting) angle required before the release of the coupling member 86 from the drive head 14 as the main assembly side engaging portion may be smaller than the second inclination angle θ2 shown in FIG. 24. In this embodiment, in the case shown in (a2) and (b2) of FIG. 23, the phase relation between the hole portion 86*b* of the coupling member 86 and the claw portions 86*d*1 and 86*d*2 is determined such that the inclination (pivoting) angle is the first inclination angle θ1. Part (b1) of FIG. 23 is a sectional view taking along a line S11-S11 of (a1) of FIG. 23. Part (b2) of FIG. 23 is a sectional view taking along a line S11-S11 of (a2) of FIG. 23**.

Dimensions of the parts in this embodiment will be described.

As shown in FIG. 6, the diameter of the free end portion **86*a* is φZ1, the diameter of the interconnecting portion 86** *g* is φZ2, the sphere diameter of the substantially spherical connecting portion **86*c* is φZ3, and rotation diameters of the claw portions 86*d*1 and 86*d*2 are φZ4. In addition, the diameter of the spherical of the free end of the drive head 14 as the main assembly side engaging portion is SφZ7, and the length of the drive pin 14*b* is Z5. Furthermore, as shown in (b1) and (b2) of FIG. 15, the inclinable (pivotable) amount (second inclination angle) of the coupling member 86 about the axis of the pin 88 is θ2, and the inclinable (pivotable) amount (first inclination angle) thereof about the axis perpendicular to the axis of the pin 88 is θ1. The gap between the interconnecting portion 86** *g* and the guide portion **300*b*2** at the time when the axis L2 and the axis L3 are substantially coaxial is S.

In this embodiment, φZ1=10 mm, φZ2=5 mm, φZ3=11 mm, φZ4=7 mm, Z5=8.6 mm, SφZ7=6 mm, θ1=30°, θ2=40° and S=0.15 mm.

Figure 25:
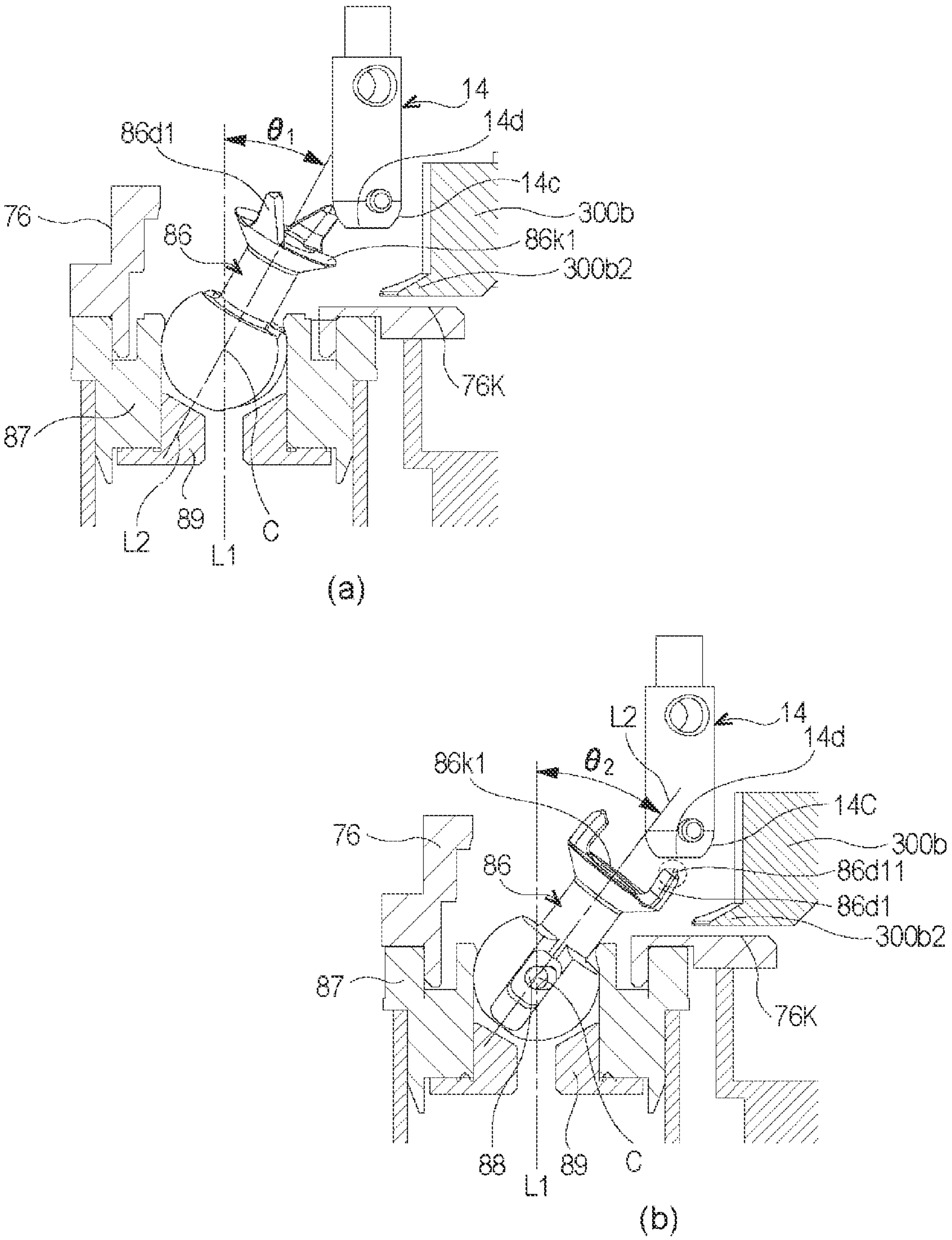
FIG. 25 is an illustration illustrating the state in the process of mounting the cartridge to the main assembly according to the embodiment of the present invention.

These dimensions are examples and are not restrictive to the present invention, if the similar operations are possible. More specifically, it will suffice if θ1 and θ2 are not less than approx. 20° and not more than approx. 60°. Preferably, they are not less than 25° and not more than 45°. Further preferably, θ1<θ2 is satisfied, and θ1 this not less than approx. 20° and not more than approx. 35°, and θ2 is not less than approx. 30° and not more than approx. 60°. The difference between θ1 and θ2 is not less than approx. 3° and not more than approx. 20°, and preferably, it is not less than approx. 5° and not more than approx. 15°. It will be considered to design the angles θ1 and θ2 such that as shown in FIG. 25, when the cartridge B is mounted, the leading portion (which will be described hereinafter) is positioned in the non-driving side beyond the free end portion **14*d* of the drive head 14 and in the driving side beyond the guide portion 300*b*2. With such design, the coupling 86 can be properly engaged with the drive head 14. The free end portion is the leading end portion 86*d*11 of the claw portion 86*d*1 when the inclination angle of the coupling member 86 is the second inclination angle θ2, and it is the standing-by portion 86*k*1 wherein the inclination angle of the coupling member 86 is the first inclination angle θ1. Because the standing-by portion 86*k*1 is closer to the rotation axis C than the leading end portion 86*d*11, and therefore, if first inclination angle θ1<second inclination angle θ2 is satisfied, the position of the leading end portion in the axis L1 direction when the coupling member 86 is inclined can be made the similar. By this, it is unnecessary to widen the gap between the drive head 14 and the guide portion 300*b*2**, so that the apparatus main assembly A and/or the cartridge B can be downsized.

By satisfying φZ1<φZ3, the assembling is easy as in this embodiment. Furthermore, by satisfying φZ1<φZ10<φZ3 taking into account the minimum diameter φZ10 of the conical portion **87*k* as the disengagement prevention portion (overhang portion, disengagement preventing portion), the position of the coupling member 86** in the driving side flange unit U2 can be determined with high precision.

According to this embodiment, the conventional cartridge which can be dismounted to the outside of the main assembly after being moved in the predetermined direction substantially perpendicular to the rotational axis of the main assembly side engaging portion can be further improved.

Embodiment 2

This embodiment will be described in conjunction with the accompanying drawings. In this embodiment, the structures of the parts other than a free end portion 286*a* of a coupling member 286, a drive head 214 and a coupling guide 400*b* are similar to those of the first embodiment, and therefore, the description of such other parts is omitted by assigning the same reference numerals as in the first embodiment. Even if the same reference numerals are assigned, the parts may be partly modified so as to match the structure of this embodiment.

Figure 26:
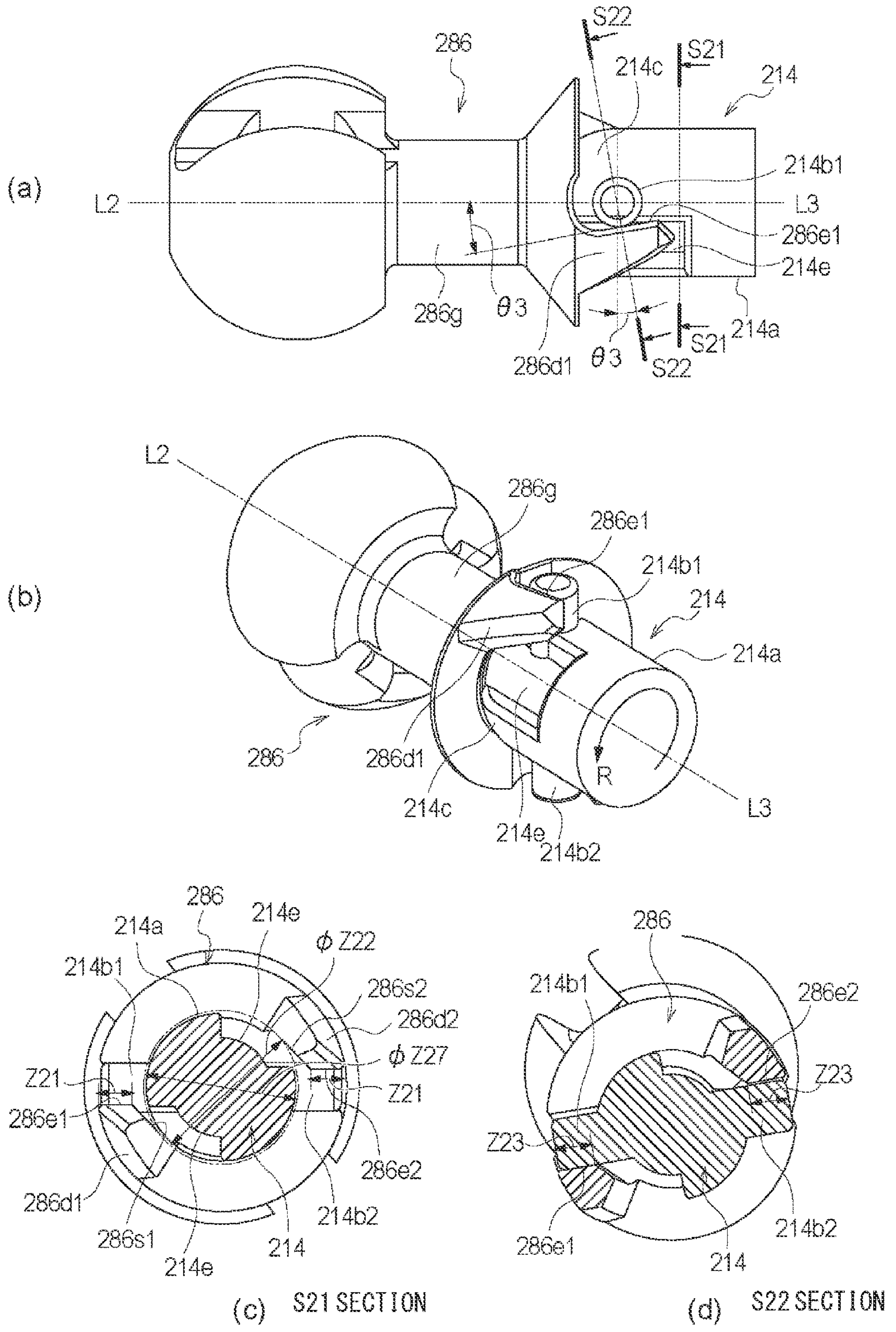
FIG. 26 illustrates the coupling member and an engaging portion of a main assembly side in the embodiment of the present invention.

FIG. 26 is an illustration of the coupling member 286 and the drive head 214 as the main assembly side engaging portion. Part (a) of FIG. 26 is a side view, part (b) of FIG. 26 is a perspective view, part (c) of FIG. 26 is a sectional view taken along a line S21-S21 of part (a) of FIG. 26. Part (d) of FIG. 26 is a sectional view taken along a line S22-S22 of part (a) of FIG. 26, the line S22-S22 being perpendicular to a receiving portion 286*e*1 and passing through the center of a drive pin 214*b* as the applying portion.

As shown in FIG. 26, the configurations of the claw portions 286*d*1 and 286*d*2 of the coupling member 286 is different from those of the first embodiment. The claw portions 286*d*1, 286*d*2 have respective flat internal wall surfaces 286*s*1, 286*s*2 facing toward the axis L2, and a widths Z21 of the receiving portions 286*e*1, 286*e*2 in the diametrical direction is larger than those of Embodiment 1. More particularly, as compared with Embodiment 1, the widths of the claw portions 286*d*1, 286*d*2 in the diametrical direction are larger. A diameter φZ22 of an inscribed circle of the internal wall surfaces 286*s*1, 286*s*2 about the axis L2 is larger than the diameter φZ7 of the driving shaft 214*a* of the drive head 214. Here, an amount of overlapping between the drive pins 214*b*1, 214*b*2 and the receiving portions 286*e*1, 286*e*2 in part (d) of FIG. 26 in the axial direction of the drive pins 214*b*1, 214*b*2 (direction perpendicular to the axis L2 (L3)) is called engagement amount Z23.

On the other hand, the drive head 214 is provided at a base portion of the drive pin 214*b* with a receiving spherical surface portion 214*c* and a recess 214*e* recessed from the drive shaft 214*a* in a downstream side of the drive pin 214*b* with respect to the rotational moving direction (R direction).

Figure 27:
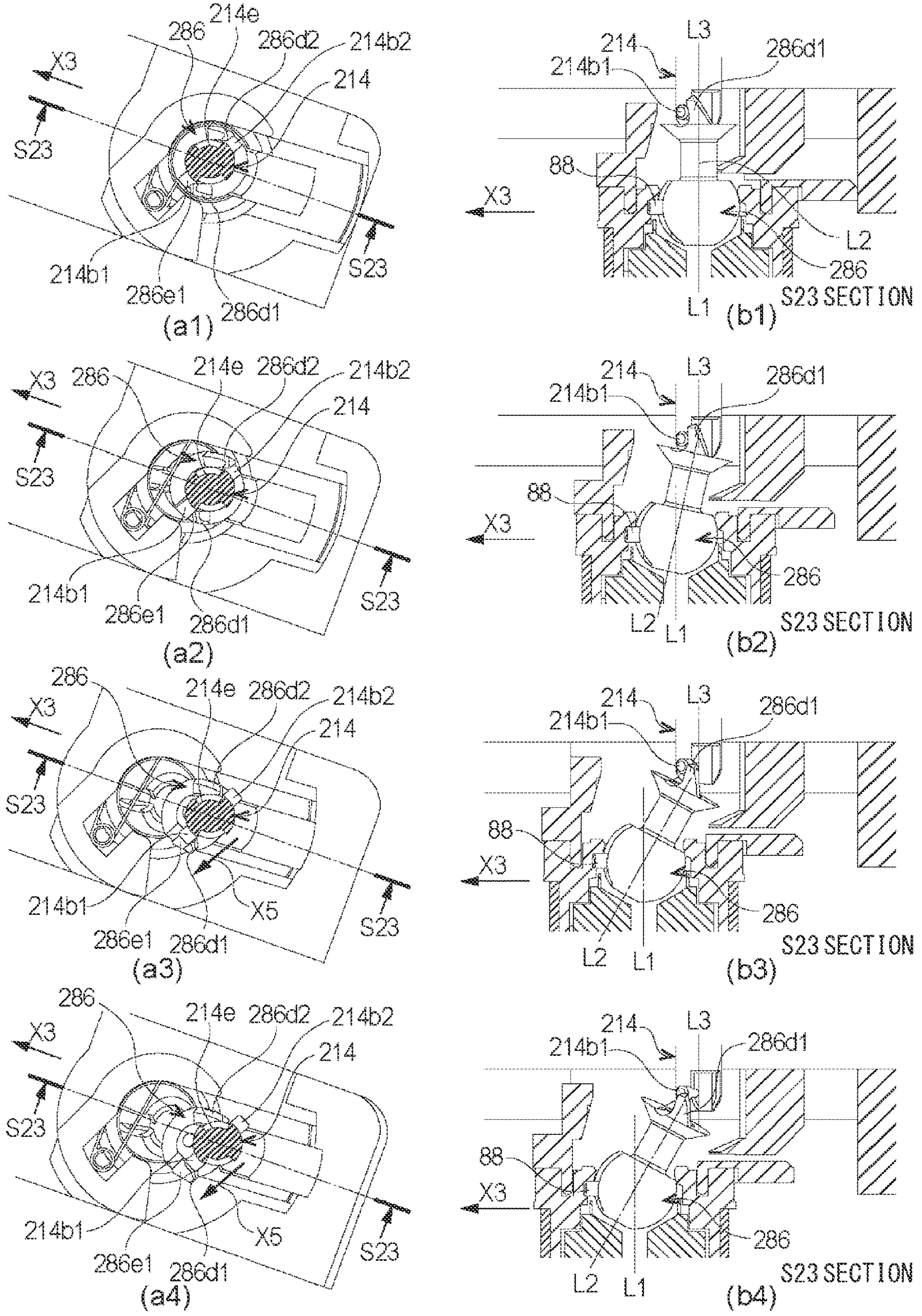
FIG. 27 is an illustration of release operations between the coupling member and the main assembly side engaging portion when the cartridge according to the embodiment of the present invention is mounted to and dismounted from the main assembly.

Referring to FIG. 27, engaging and disengaging operations between the coupling member 286 and the drive head 214 when the process cartridge B is mounted to and dismounted from the apparatus main assembly A will be described in detail. The operation peculiar to this embodiment will be described. This is when the phase of the drive pins 214*b*1 and 214*b*2 is deviated from the dismounting direction (X3 direction) of the cartridge B by a predetermined amount θ4, for example by θ4=60° which case will be described.

FIG. 27 is an illustration of the operation of the coupling member 286 when the cartridge B is dismounted from the apparatus main assembly A. Parts (a1) to (a4) of FIG. 27 are views as seen from the outside in the driving side of the main assembly A, illustrating the dismounting of the process cartridge B from the apparatus main assembly A, in this order. Parts (b1) to (b4) of FIG. 27 are sectional views taken along lines S23-S23 of (a1) to (a4) of FIG. 27 seen from the bottom. For better illustration, the coupling member 286, the drive head 214 and the pin 88 are not sectional views.

As shown in (a1) of FIG. 27, when the process cartridge B is dismounted from the apparatus main assembly A, the cartridge B is first in the mounting completed position in the apparatus main assembly A in which the coupling member 286 is engaged with the drive head 214. In many cases, the process cartridge B is dismounted from the apparatus main assembly A after a series of image forming operations it is completed. At this time, the receiving portions 286*e*1 and 286*e*2 of the coupling member are contacted to the drive pins 214*b*1 and 214*b*2, respectively.

From the state, the cartridge B is moved in the dismounting direction (X3 direction the, and shown in (a2) and (b2) of FIG. 27. The cartridge B is moved in the dismounting direction (X3 direction) while the axis L2 of the coupling member 286 is inclining relative to the axis L1 of the driving side flange 87 and the axis L3 of the drive head 214. At this time, the claw portion 286*d*1 (receiving portion 286*e*1) in the downstream side of the drive pin 214*b*1 with respect to the dismounting direction (X3 direction) keeps in contact with the drive pin 214*b*1.

The cartridge B is further moved in the dismounting direction (X3 direction), as shown in (a3) and (b3) of FIG. 27. Then, the axis L2 further inclines (pivots) so that a first inclination-regulated portions 286*p*1 and 286*p*2 (unshown) and the pin 88 as the first inclination regulating portion contact to each other, or the second inclination regulating portion 87*n* and the interconnecting portion 286 *g* as the second inclination-regulated portion contact to each other, similarly to the first embodiment. By this, the inclination (pivoting) of the coupling member 286 is limited. In the case of the phase) (θ=60° of the drive pin 214*b* and the claw portions 286*d*1 and 286*d*2 shown in FIG. 27, the claw portion 286*d*1 (receiving portion 286*e*1) may not move to the non-driving side of the drive pin 214*b* but may keep the contact state. This is because the movement distances of the claw portions 286*d*1 and 286*d*2 toward the non-driving side by the inclination (pivoting) of the axis L2 is small.

At this time, since the drive head 214 is provided with the cut-away portion 214*e*, the coupling member 286 inclines (pivots) in the direction of an arrow X5 so that the claw portions 286*d*1 and 286*d*2 move along the drive pins 214*b* and 214*b*2.

As shown in (a4) and (b4) of FIG. 27, the coupling member 286 further inclines (pivots) in the direction of the arrow X5 by the claw portion 286*d*2 entering the cut-away portion 214*e*. By the inclination (pivoting) of the coupling member 286, the contact between the claw portion 286*d*1 and the drive pin 214*b*1 is released in the direction of the arrow X5. By this, the process cartridge B can be dismounted from the apparatus main assembly A.

In this embodiment, as compared with Embodiment 1, the widths Z21 of the receiving portions 286*e*1 and 286*e*2 are larger. More specifically, the width of the base portion is approx. 1.5 mm With such a structure, the engagement amount Z23 (part (d) of FIG. 26) between the drive pin 214*b*1, 214*b*2 and in the receiving portion 286*e*1, 286*e*2 in the axial direction of the drive pin 214*b* is larger than that in Embodiment 1. By this, the engagement between the pair of applying portions and the pair of receiving portions is assured so that stabilized transmission is accomplished irrespective of variation of the part accuracy or the like. By increasing the width of the base portion of the receiving portion, the driving force transmission can be stabilized, but if it is too large, the interference with the drive head may occur with the result of adverse affect. Therefore, it is preferable that in an imaginary flat plane perpendicular to the rotational axis of the coupling member and including the receiving portion for receiving the driving force from the engaging portion, a angle between the rotational axis and the line connecting the end portions of the projections is not less than approx. 10° and not more than approx. 30°. Taking into account the rigidity for the reception of the drive, the width of the base portion is 1.0 mm or larger.

The cut-away portion 214*e* is desired to be enough to permit disengagement between the coupling member 286 and the drive head 214 even when the engagement amount Z23 is larger than the gap between the inner diameter φZ24 of the claw portion and the diameter φZ27 of the cylindrical portion of the drive head 214. Therefore, it is provided so as to permit large inclination (pivoting) of the coupling member 86 in the direction of the arrow X5. Here, the large inclination means that the claw portions 286*d*1 and 286*d*2 cam move toward the drive pins 214*b*1 and 214*b*2 through a distance larger than the engagement amount Z23.

Figure 28:
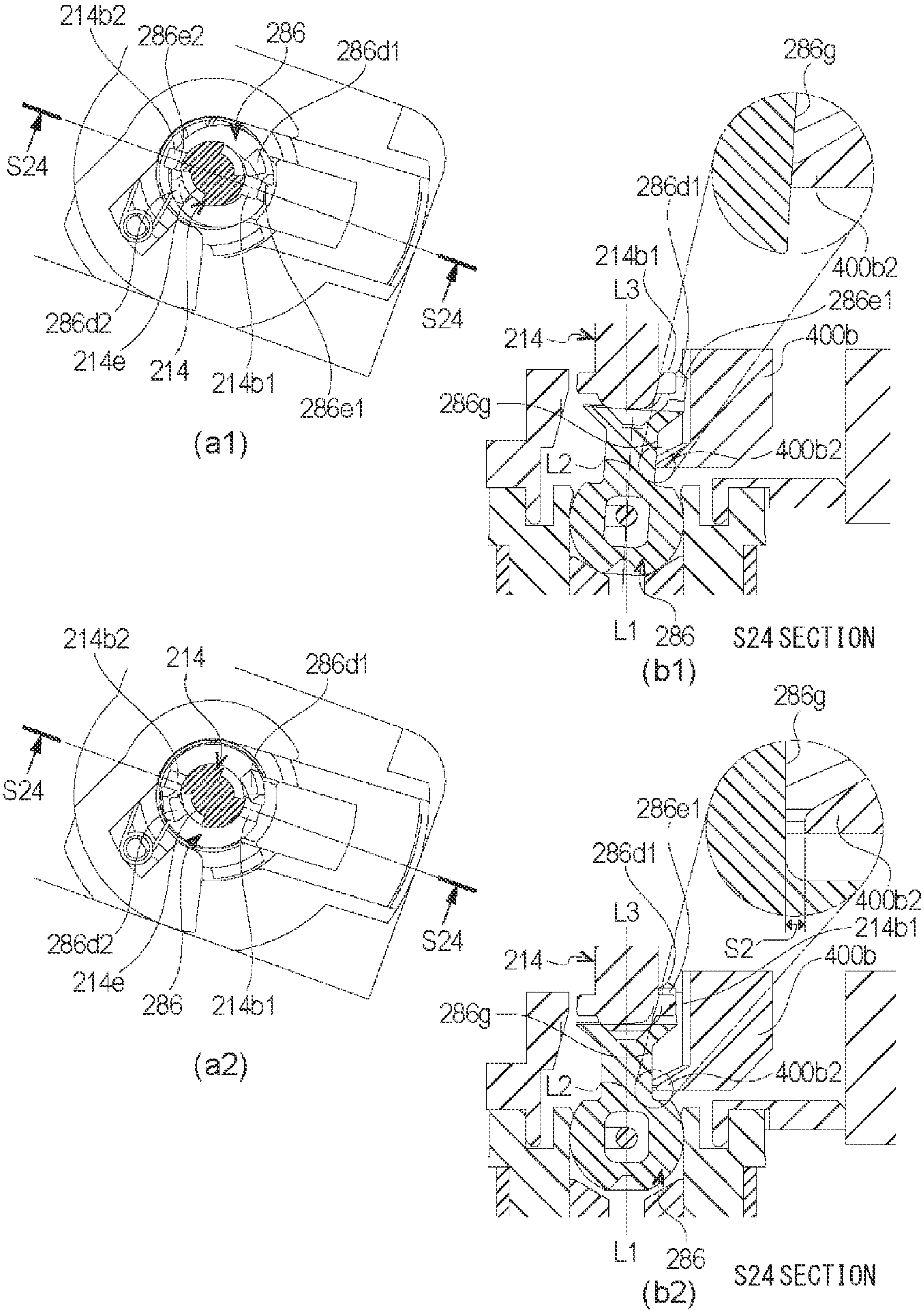
FIG. 28 is an illustration of a coupling guide according to the embodiment of the present invention.

Referring to FIG. 28, the structure of the coupling guide 400*b* in this embodiment will be described. The structure of the coupling guide 400*b* is similar to that of Embodiment 1, but the gap S2 between the interconnecting portion 286 *g* of the coupling member 286 and the coupling guide 400*b* is different from that of first embodiment.

FIG. 28 is an illustration of the coupling guide 400*b* and (a1) (b1) of FIG. 28 shows the state in which the cartridge B is mounted to the apparatus main assembly A, and the axis L2 of the coupling member 286 keeps inclined (pivoted). Parts (a2) and (b2) of FIG. 28 shows the state in which the axis L2 is aligned with the axis L1 and the axis L3. Part (b1) of FIG. 28 is a sectional view taking along a line S24-S24 of (a1) of FIG. 28. Part (b2) of FIG. 28 is a sectional view taking along a line S24-S24 of (a2) of FIG. 28.

As shown in (a1) and (b1) of FIG. 28, the coupling guide 400*b* is capable of limiting the inclination (pivoting) of the coupling member 286 so that the engagement between the drive pin 214*b* and the claw portion 286*d*1 is kept even when the coupling member 286 is inclined (pivoted). In this embodiment, as described hereinbefore, the engagement amount Z23 is larger than that in Embodiment 1. In this embodiment, the gap S2 in (b2) of FIG. 28 is larger than the gap S in Embodiment 1 ((b2) of FIG. 22). Despite such conditions, the engagement between the drive pin 214*b*1 and the receiving portion 286*e*1 can be kept to properly transmit the rotation even when the inclination (pivoting) of the coupling member 86 increases. In this manner, the gap S2 can be made larger than in Embodiment 1, and therefore, the dimensional accuracy of the interconnecting portion 286 *g* and/or the guide portion 400*b*2 can be eased.

As described above, the engagement amount Z23 between the drive pin 214*b*1, 214*b*2 and in the claw portion 286*d*1, 286*d*2 is increased, and the drive head 214 is provided with the cut-away portion 214*e*. By doing so, when the cartridge B is dismounted from the apparatus main assembly A, the engagement between the coupling member 286 and the drive head 214 can be released. In addition, with the structure of this embodiment, the gap S2 between the coupling guide 400*b* and the interconnecting portion 286 *g* can be increased as compared with Embodiment 1, by which the required part accuracy can be eased.

Embodiment 3

Figure 29:
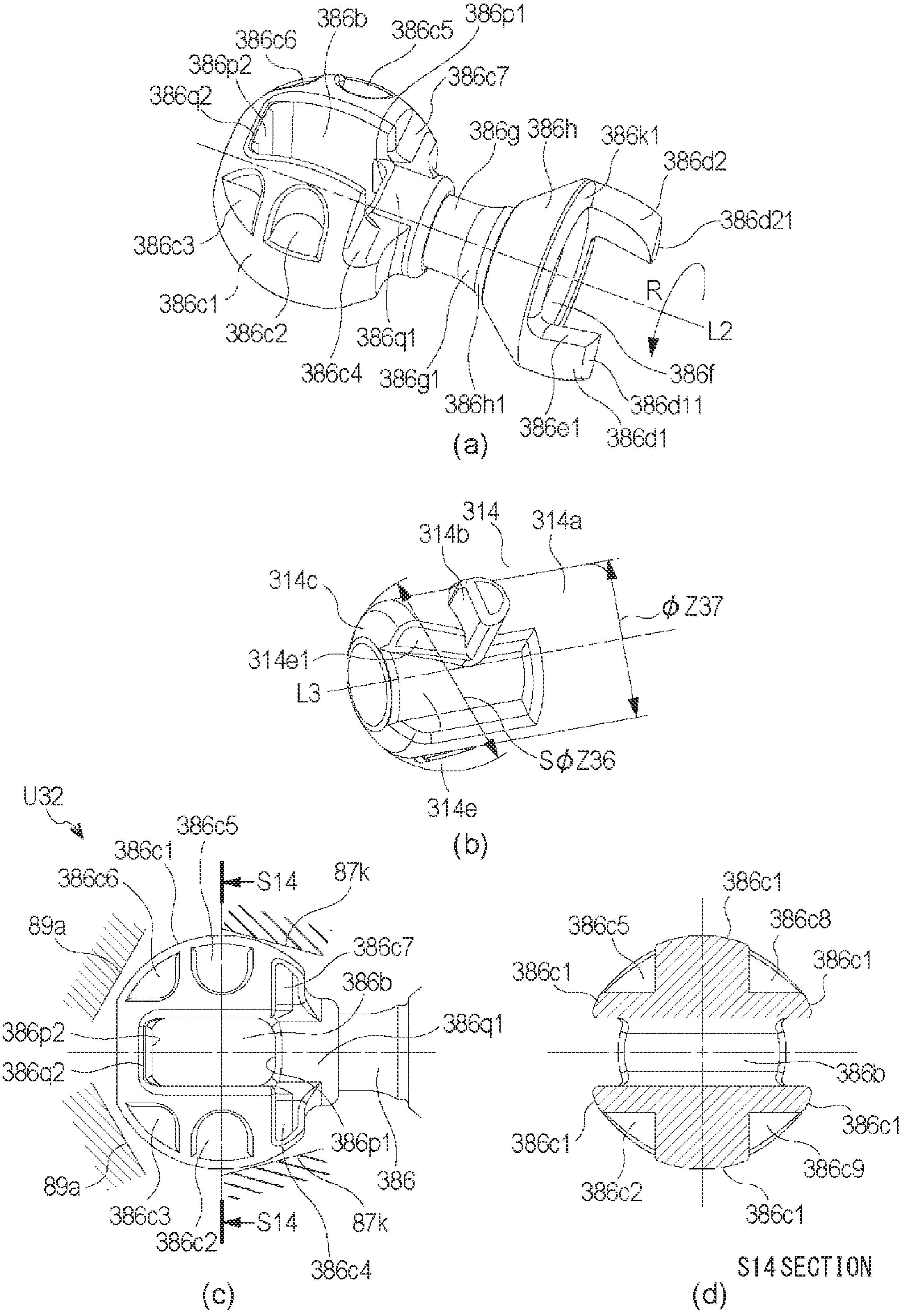
FIG. 29 illustrates a coupling member and a drive pin in the embodiment of the present invention.
Figure 30:
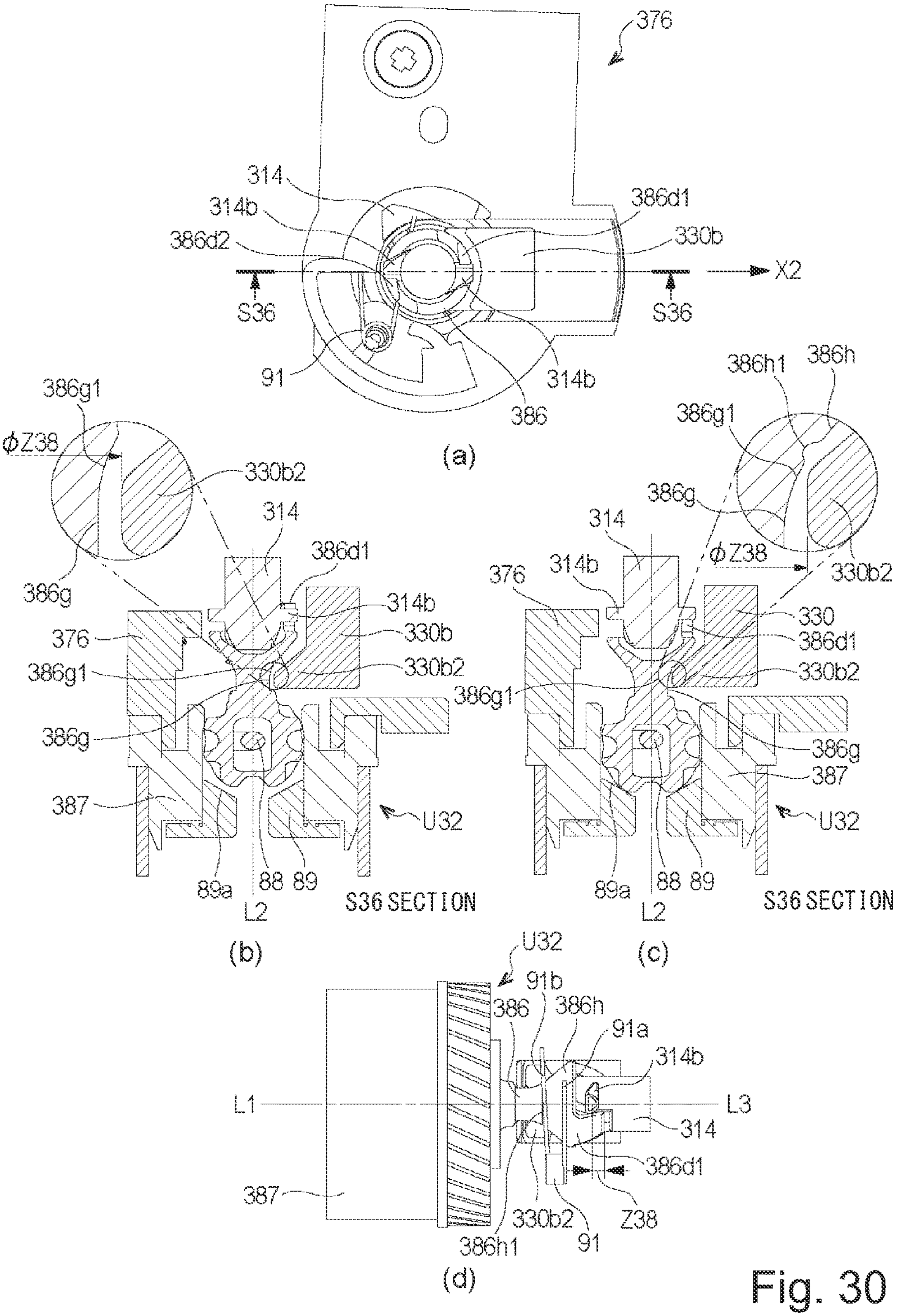
FIG. 30 is an illustration of the cartridge and the coupling guide in the embodiment of the present invention.
Figure 31:
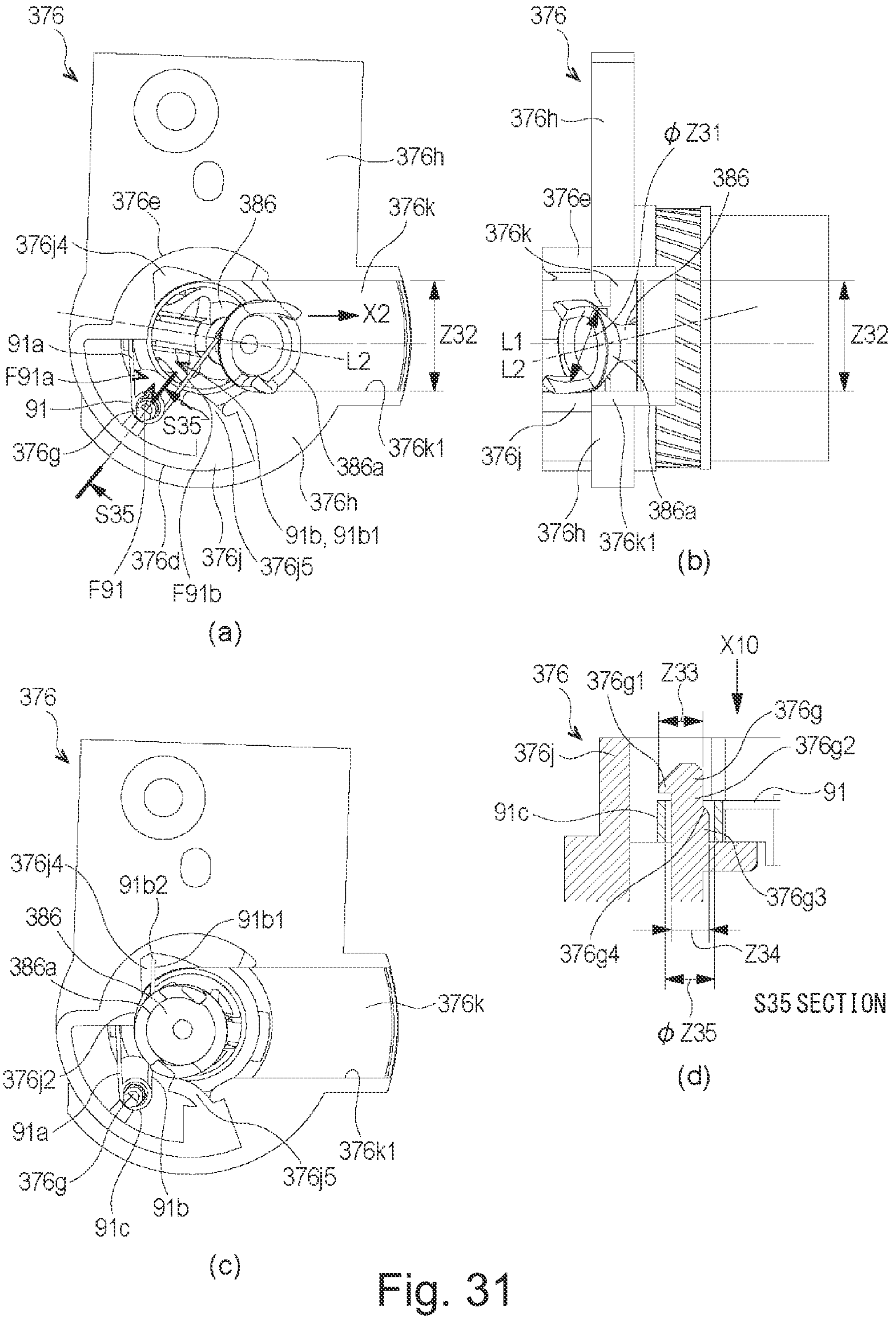
FIG. 31 is an illustration of a bearing member, according to an embodiment.

A third embodiment of the present invention will be described. FIG. 29 is an illustration of a coupling member 386 and a drive head 314 as the main assembly side engaging portion. FIG. 30 is an illustration of a R configuration portion 386*g*1 and shows a state in which the cartridge B is mounted to the apparatus main assembly A. FIG. 31 is an illustration of a bearing member 387 and the coupling member 386 and is a perspective view and a sectional view.

The coupling member 386 is provided with lightening portions 386*c*2-386*c*9 in a connecting portion 386*c* as is different from Embodiment 1 and Embodiment 2. A diameter of an interconnecting portion 386 *g* is small, and a thickness defined by a spring receiving portion 386*h* and a receiving surface 386*f* is small. By this, the material can be saved.

In providing the lightening portions 386*c*2-386*c*9, it is preferable that the spherical 386*c*1 remains evenly along the circumferential direction. In this embodiment, the connecting portion 386*c* is construct in such that the void of the spherical portion 386*c*1 provided by the lightening portions 386*c*2-386*c*9 and the hole portion 386*b* is less than continuously 90°. The spherical portion may be substantially spherical in consideration of the lightening and/or manufacturing variation or the like. With the above-described structure of the connecting portion 386*c*, the position of the coupling member 86 in the driving side flange unit U32 can be stabilized. Particularly, the position of the coupling member can be stabilized at the position of the line S14-S14 supported by the accommodating portion 87*i* and at the position opposing to the conical portion 87*k* and the base portion 89*a*, as shown in part (c) of FIG. 29.

An arcuate surface portion 386*q*1 and an arcuate surface portion 386*q*2 have diameters different from each other.

As shown in FIG. 30, a R (rounded) configuration 386*g*1 is provided between the interconnecting portion 386 *g* and the spring receiving portion 386*h*. As described hereinbefore, in the driving side flange unit U32, there is provided a play for permitting small amount of movement of the coupling member 386 in the axis L1 direction. When the coupling member 386*a* shifts to the non-driving side within the range of the play, the engagement amount Z38 between the drive pin 314*b* and the claw portion 386*d*1, 386*d*2 in the axis L1 direction decreases. Here, the engagement amount Z38 is a distance in the axis L3 direction between the center point of the arcuate configuration of the drive pin 314*b* and the free end of the claw portion 386*d*1. In addition, when the coupling member 386 inclines to the extent that the interconnecting portion 386 *g* and a guide portion 330*b*2 of the coupling guide 330*b* contact to each other, the engagement amount Z38 between the drive pin 314*b* and in the claw portion 386*d*1, 386*d*2 decreases with the possible result of adverse affect to the driving force transmission. However, by the provision of the R configuration portion 386*g*1, the free end of the guide portion 330*b*2 of the coupling guide 330*b* is contacted by the R configuration portion 386*g*1 when the coupling member 386 shifts toward the non-driving side. By this, as compared with the case in which the interconnecting portion 86 *g* contacts to the guide portion 300*b*2 as in Embodiment 1, the inclination of the coupling member 386 can be reduced. Therefore, the provision of the R configuration portion 386*g*1 is effective to prevent simultaneous occurrences of the decrease of the engagement amount Z38 attributable to the shifting of the coupling member 386 toward the non-driving side and the reduction of the engagement amount Z38 attributable to the inclination of the coupling member 386. The R configuration portion 386*g*1 is not limited to the arcuate configuration, but may be a conical surface configuration with the similar effects.

As shown in FIG. 29, in this embodiment, the claw portions 386*d*1 and 386*d*2 have flat surface at the free end portions, thus increasing the thickness in the circumferential direction, by which the deformation of the claw portions 386*d*1 and 386*d*2 during the drive transmission is reduced. In addition, in order to define the portion pressed by the torsion coil spring 91, the spring receiving portion 386*h* is provided with a spring receiving groove **386*h*1 (part (d) of FIG. 30, too). The portion contacting the second arm 91*b* of the spring 91 is regulated, and by applying a lubricant there, the sliding between the second arm 91*b* and the coupling member 386 it is effected with grease always in existing therebetween, and therefore, the scraping of these members and the sliding noise can be reduced. The coupling member 386 is made of metal, and the torsion coil spring 91 is made of metal, too. In the state that the coupling member 386 is being rotated by the driving force received from the main assembly side engaging portion 314, the torsion coil spring 91 continues to apply the urging force to the coupling member. Therefore, during the image forming operation, the sliding occurs between metal members, and in order to reduce the influence thereof, it is preferable to provide lubricant at least between the coupling member 386 and the torsion coil spring 91**.

On the other hand, as shown in part (b) of FIG. 29, the drive pin **314*b* of the main assembly side engaging portion 314 is not necessarily a circular column configuration member. The diameter sφZ36 of the spherical surface portion 314*c* is larger than the diameter sφZ6 of the spherical surface portion 14*c* and the diameter φZ37 of the driving shaft 314*a* in Embodiment 1, because it is contacted to a receiving surface 386*f* which is thinner than in Embodiment 1. For the purpose of sliding engagement (and disengagement) with the coupling member 386, a taper 314*e*1 is provided at a stepped portion minute between the cut-away portion 314*e* and the driving shaft 314*a***.

The diameter of the free end of the guide portion **330*b*2 of the coupling guide 330*b* shown in FIG. 30 is smaller than that of Embodiment 1 because the diameter of the interconnecting portion 386 *g*** is smaller than that of Embodiment 1.

Referring to FIG. 31, the bearing member 376 will be described in detail. As shown in FIG. 31 a width Z32 of a cut-away portion **376*k* of the bearing member 376 is larger than the diameter φZ31 of the free end portion 386*a*, so that the free end portion 386*a* directs downward relative to the mounting direction X2 and axis L1, similarly to Embodiment 1. On the other hand, a plate-like portion 376*h* is provided at the position closer to the driving side than in Embodiment 1. Therefore, when the coupling member 386 inclines, the outsidemost circumference (φZ31 part) of the free end portion 386*a* contacts a lower surface 376*k*1 of the cut-away portion 376*k*. By this, the downward inclination of the coupling member 386 is limited irrespective of the inclination angle of the coupling member 386, and therefore, the engagement with the main assembly side engaging portion 314*b* is further stabilized. (in Embodiment 1, the conical spring receiving portion 87*h* contacts the lower surface 76*k*1, and therefore, the amount of the downward inclination of the coupling member 86 is different depending on the inclination angle of the coupling member 86**).

A spring hook portion **376 *g* comprises a retaining portion 376*g*1, an insertion opening 376*g*2 and a supporting portion 376*g*3. The insertion opening 376*g*2 and the supporting portion 376*g*3 are connected with each other by a tapered portion 376*g*4 so that the spring 91 can be smoothly slipped in the direction of an arrow X10. The most outer diameter Z33 of the retaining portion 376*g*1 and the insertion opening 376*g*2 and the most outer diameter of the supporting portion 376*g*3 are smaller than the inner diameter φZ35 of the coil portion 91*c* of the spring 91. With the above-described structure of the spring hook portion 376*g*, the coil portion 91*c* can be easily slipped around the spring hook portion 376*g*, and the movement of the coil portion 91*c* in the direction of disengagement from the retaining portion 376*g*1 by the supporting portion 376*g*3 can be suppressed. By this, the possibility of the disengagement of the spring 91 from the spring hook portion 376 *g* can be reduced. The spring hook portion 376 *g* does not project beyond the first projected portion 376*j* outwardly (driving side), so that the possibility of the damage of the spring hook portion 376 *g*** during the transportation is reduced.

In this embodiment, it is preferable that the retaining portion **376*g*1 is disposed in the side opposite from the spring hook portion 376 *g* across the coupling member 386 (lower left side in part (a) of FIG. 31**).

To described briefly, a reaction force received by the torsion coil spring 91 (a resultant force of a force F**91*a* received by the first arm 91*a* and a force F91*b* received by the second arm 91*b*) directs toward the coupling member 386 side (upper right side in part (a) of FIG. 31). By this, the coil portion 91*c* shifts toward the coupling member 386. Therefore, the above-described position of the retaining portion 376 *g* is effective to assure that the mounting property of the torsion coil spring 91 the prevention of the disengagement thereof. Furthermore, in this embodiment, as shown in part (c) of FIG. 31, when the coupling member 386 is inclined so as to be close to the coil portion 91*c* side, the first arm and the second arm are substantially parallel with each other. Therefore, the force F91*a* and the force F91*b* are canceled, and therefore, the reaction force received by the torsion coil spring 91 is reduced. In this manner, the force F91 does not direct toward the retaining portion 376*g*1, by which the possibility of the disengagement of the torsion coil spring 91 from the spring hook portion 376 *g*** is reduced.

The bearing member 376 is provided with a contact prevention rib **376*j*5 and a contact prevention surface 376*j*2 in order to prevent contact of the coupling member 386 to the coil portion 91*c*. By this, even when the coupling member 386 inclines close to the coil portion 91*c*, the coupling member 386 contacts to the contact prevention rib 376*j*5, the contact prevention surface 376*j*2, so that the contact of the free end portion 386*a* to the coil portion 91*c* is prevented. By this, the possibility of the disengagement of the coil portion 91*c* from the retaining portion 376*g*1** can be suppressed.

Furthermore, radially inside of the first projected portion **376*j*, a space 376*j*4 is provided to permit movement of the second arm of the spring 91. Here, the second arm 91*b* has such a length that an arm portion 91*b*1 of the second arm 91*b* can be always contacted to the spring receiving portion 386*h* (FIG. 29) of the coupling member 386. By doing so, the contact of the free end 91*b*2 of the second arm to the spring receiving portion 386*h*** can be prevented.

In this embodiment, the disengagement prevention of the torsion coil spring 91 it is effected by the configuration of the spring hook portion **376*g***, but may be effected using application of silicon bond or hot melt. Alternatively, another resin material member may be used for the prevention of the disengagement.

Embodiment 4

Figure 32:
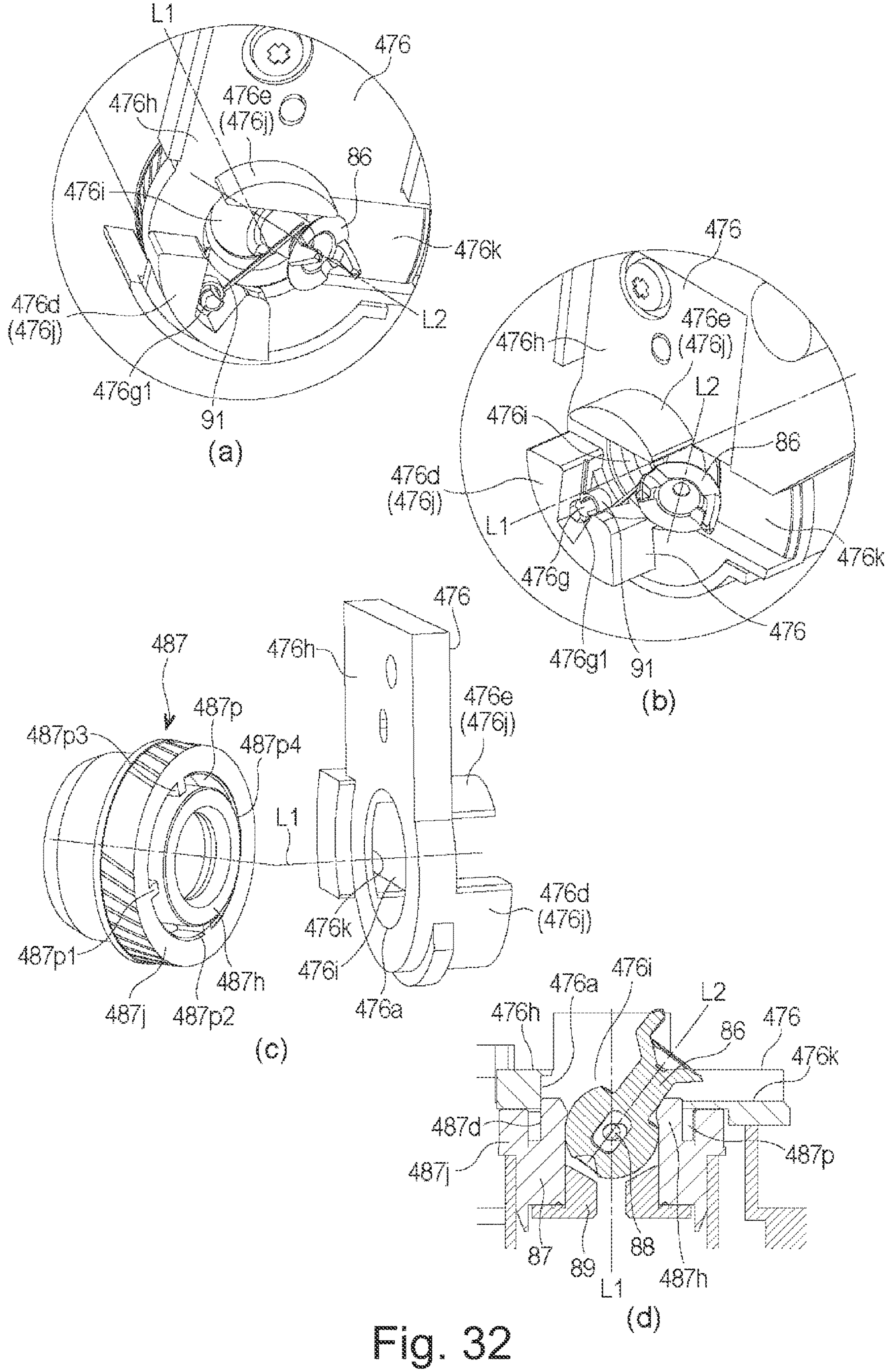
FIG. 32 is an illustration of a bearing member, according to an embodiment.

Referring to FIG. 32, another structure of driving side flange unit and a bearing member supporting it in this embodiment will be described. In this embodiment, the other parts of other than the driving side flange unit and the bearing member are the same as in the first embodiment, and the descriptions thereof is omitted by assigning that the same reference numerals. Even if the same reference numerals are assigned, the parts may be partly modified so as to match the structure of this embodiment.

As shown in FIG. 32, in this embodiment, a first projected portion 476*j* of the bearing member 476 is divided into upper and lower parts. The assembling property of the torsion coil spring 91 relative to the spring hook portion 476 *g* using a tool or assembling device is improved because the neighborhood structure parts are less. In Embodiment 1, the supporting portion 76*a* as the second projected portion is projected from the plate-like portion 76*h* toward the non-driving side, it is possible that a supporting portion 476*a* is provided inside a hollow portion 476*i*, as shown in parts (c) and (d) of FIG. 32. In such a case, the supported portion 487*d* of the driving side flange 487 is preferably provided on a second cylindrical portion 487*h* as long as the inclination (pivoting) of the coupling member 86 is not influenced. In this case, there is no second projected portion (supporting portion 76*a*) in the annular groove portion 87*p*, and therefore, it is unnecessary for the driving side flange 487 is provided with an annular groove portion 487*p*. Or, even if an annular groove portion 487*p* is provided from the standpoint of convenience in the resin material molding, it is possible that a first cylindrical portion 487*j* and the second cylindrical portion 487*h* are connected using rib configuration portions 487*p*1-487*p*4 to suppress the formation of the time when the drive is transmitted to the driving side flange 487.

Embodiment 5

Figure 33:
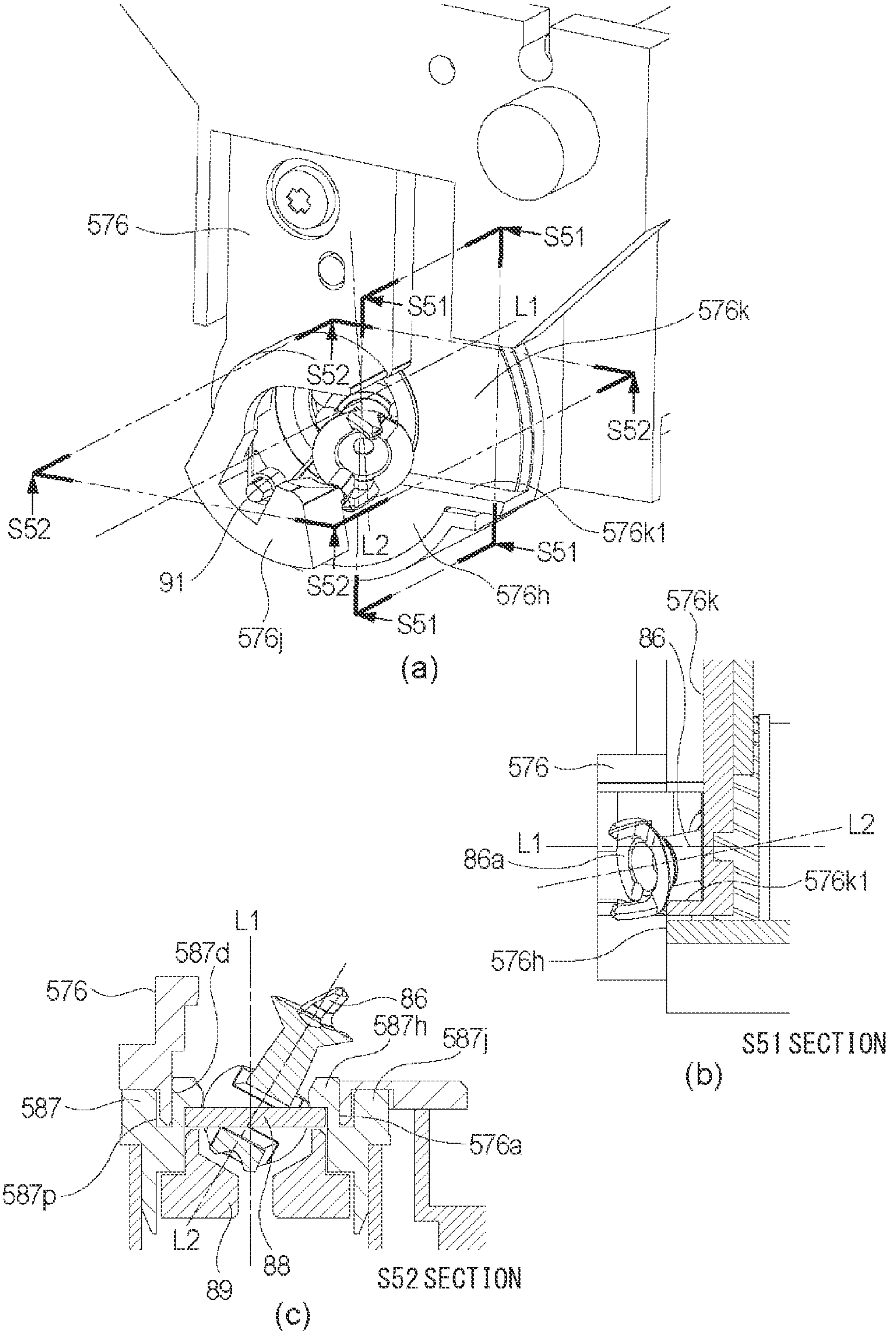
FIG. 33 is an illustration of a bearing member, according to an embodiment.

Referring to FIG. 33, a further structure of driving side flange unit and a bearing member supporting it in this embodiment will be described. In this embodiment, the other parts of other than the driving side flange unit and the bearing member are the same as in the first embodiment, and the descriptions thereof is omitted by assigning that the same reference numerals. Even if the same reference numerals are assigned, the parts may be partly modified so as to match the structure of this embodiment.

As shown in FIG. 33, a cut-away portion 576*k* of the bearing member 576 in this embodiment is different from that in Embodiment 1. In Embodiment 1, the cut-away portion 76*k* has been in the form of a groove recessing from the plate-like portion 76*h* toward the non-driving side and extending in parallel with the mounting direction X2. The cut-away portion 576*k* of the bearing member 576 is common with that of Embodiment 1 in that it is recessed from the plate-like portion 576*h* toward the non-driving side, but the groove-like configuration is not inevitable. It will suffice if the recess from the plate-like portion 576*h* is enough to provide a space for permitting inclination of the coupling member 86, and a lower surface 576*k*1 is capable of limiting the position of the coupling member 86 (free end portion 86*a*) in the vertical direction.

In Embodiment 1, the supported portion 87*d* is provided on an inner circumference of the first cylindrical portion 87*j* of the driving side flange 87, but in this embodiment, the outer peripheral surface of the second cylindrical portion 587*h* is used as the supported portion 587*d*. In one of the bearing members 576, a supporting portion 576*a* as the second projected portion enters a groove portion 587*p* to support the supported portion 587*d*. The second cylindrical portion 587*h* is projected more toward the driving side than the first cylindrical portion 587*j*, and therefore, by the provision of the supported portion 587*d* on the second cylindrical portion 587, the supporting length in the axis L1 direction can be increased as compared with the case in which the supported portion is provided on the first cylindrical portion 587*j*.

Other Embodiments

In the foregoing embodiments, the coupling member is accommodated in the flange unit of the photosensitive drum, but this is not inevitable, and it will suffice if the drive is received by the cartridge through the coupling member. More particularly, the structure may be that a developing roller is rotated through a coupling member. The present invention is suitably applicable to a developing cartridge not comprising a photosensitive drum in which the rotational force is transmitted from the main assembly side engaging portion to the developing roller. In such a case, the coupling member 86 transmits the rotational force to the developing roller 32 as the rotatable member in place of the photosensitive drum.

The present invention is applicable to the structure in which the driving force is transmitted to the photosensitive drum only. In the foregoing embodiments, the driving side flange 87 as the force receiving member is fixed to a longitudinal end portion of the drum 62 which is the rotatable member, the driving side flange 87 may be an independent part not fixed thereto. For example, it may be a gear member with which the driving force is transmitted to the drum 62 and/or to the developing roller 32 through a gear connection.

In the foregoing embodiments, the cartridge B is for forming monochromatic images. However, this is not inevitable. The structures and concept of the above-described embodiments are suitably applicable to a cartridge for forming multi-color images (two-color images, or full-color images, for example) using a plurality of developing means.

A mounting-and-demounting path of the cartridge B relative to the apparatus main assembly A may be a linear path, a combination of linear paths or curved path, and the structures of the above-described embodiments can be used in such cases.

INDUSTRIAL APPLICABILITY

The structures of the foregoing embodiments can be applied to a cartridge usable with an electrophotographic image forming apparatus and a drive transmission device for them.

REFERENCE NUMERALS

3: laser scanner unit (exposure means, exposure device)
7: transfer roller
9: fixing device (fixing means)
12: guiding member (guiding mechanism).
12*a*: first guiding member
12*b*: second guiding member
13: opening and closing door
14: drive head (main assembly side engaging portion)
14*a*: drive shaft (shaft portion)
14*b*: drive pin (applying portion)
20: developing unit
21: toner accommodating container
22: closing member
23: developing container
32: developing roller (developing means, process means, rotatable member)
60: cleaning unit
62: photosensitive drum (photosensitive member, rotatable member)
64: non-driving side flange
66: charging roller (charging means, process means)

71: cleaning frame
74: exposure window
75: coupling member
76: bearing member (supporting member)
**76*b***: guide portion
**76*d***: first arcuate portion
**76*f***: second arcuate portion
77: cleaning blade (removing means, process means)
78: drum shaft
86: coupling member
**86*a***: free end portion (cartridge side engaging portion)
**86*b*1**: transmitting portion
**86*p*1, 86*p*2**: first inclination (pivoting) regulated portion
86 connecting portion (accommodated portion)
**86*d*1, 86*d*2**: projection
**86*e*1, 86*e*2**: receiving portion
**86*f***: receiving surface
**86*g***: interconnecting portion
**86*h***: spring receiving portion
**86*k*1, 86*k*2**: standing-by portion
**86*m***: opening
**86*z***: recess
87: driving side flange (force receiving member).
**87*b***: fixed portion
**87*d***: supported portion
**87*e***: hole portion
**87*f***: retaining portion
**87*g***: receiving portion
**87*k***: conical portion
**87*m***: opening
**87*n***: second inclination regulating portion
**87*i***: accommodating portion
88: pin (shaft portion, shaft)
89: closing member (regulating member)
90: screw (fastening means, fixing means)
A: main assembly of electrophotographic image forming apparatus (apparatus main assembly)
B: process cartridge (cartridge)
T: toner (developer)
P: sheet (sheet material, recording material)
R: rotational moving direction
S: gap
U1: photosensitive drum unit (drum unit)
U2: driving side flange unit (flange unit)
L1 you, rotational axis of electrophotographic photosensitive drum
L2 rotational axis: of coupling member
L3: rotational axis of main assembly side engaging portion
θ1: inclination angle (first angle)
θ2: inclination angle (second angle)

The invention claimed is:

1. A cartridge comprising:

a photosensitive drum having a rotational axis about which the photosensitive drum is rotatable;

a developing roller having a rotational axis about which the developing roller is rotatable;

a casing rotatably supporting the photosensitive drum and the developing roller;

a coupling member operatively connected to the photosensitive drum, the coupling member including at least one projection capable of receiving a rotational force to rotate the photosensitive drum; and a spring including a movable part that is movable relative to the casing in a direction away from the rotational axis of the developing roller to urge the coupling member so that at least the projection of the coupling member moves away from the rotational axis of the developing roller, wherein the casing includes a groove open to outside of the casing, the groove extending toward the rotational axis of the photosensitive drum along an extended direction that is perpendicular to the direction of the rotational axis of the photosensitive drum, wherein, as seen in a direction of the rotational axis of the photosensitive drum, the rotational axis of the developing roller, the rotational axis of the photosensitive drum, and the groove are positioned in this order along the extended direction, and wherein a first end of the groove and a second end of the groove are open such that the groove forms a channel in the casing along the extended direction.

2. The cartridge according to claim 1, wherein the coupling member has a rotational axis about which the coupling member is rotatable, wherein the coupling member is movable to (i) a first position in which the rotational axis of the coupling member is coaxial with the rotational axis of the photosensitive drum and (ii) a second position in which the projection of the coupling member is positioned farther from the rotational axis of the developing roller than the projection of the coupling member is from the rotational axis of the developing roller when the coupling member is in the first position, and wherein the movable part of the spring urges the coupling member to move from the first position to the second position.

3. The cartridge according to claim 2, wherein, when the coupling member receives an urging force from the movable part of the spring and is in the first position, the coupling member is rotatable to transmit the rotational force to the photosensitive drum.

4. The cartridge according to claim 2, wherein the rotational axis of the coupling member is inclined relative to the rotational axis of the photosensitive drum when the coupling member is in the second position.

5. The cartridge according to claim 2, wherein, when the coupling member is in the first position, the movable part of the spring is positioned between the rotational axis of the developing roller and the rotational axis of the coupling member.

6. The cartridge according to claim 1, wherein the movable part of the spring urges the coupling member by contacting the coupling member.

7. The cartridge according to claim 1, wherein the spring is a torsion spring.

8. The cartridge according to claim 7, wherein the spring includes an arm as the movable part of the spring.

9. The cartridge according to claim 8, wherein the spring further includes a coil portion and the casing includes a supporting projection that supports the coil portion of the spring.

10. The cartridge according to claim 1, wherein the casing includes first and second projected parts project in the direction of the rotational axis of the photosensitive drum and away from the photosensitive drum, and wherein, as seen in the direction of the rotational axis of the photosensitive drum, the first projected part, the rotational axis of the photosensitive drum, and the second projected part are positioned in this order in a direction perpendicular to the extended direction.

11. A cartridge comprising:

a photosensitive drum having a rotational axis about which the photosensitive drum is rotatable;

a developing roller having a rotational axis about which the developing roller is rotatable;

a casing rotatably supporting the photosensitive drum and the developing roller;

a coupling member operatively connected to the photosensitive drum, the coupling member including at least one projection capable of receiving a rotational force to rotate the photosensitive drum; and a torsion spring including an arm that is movable relative to the casing to urge the coupling member so that at least the projection of the coupling member moves away from the rotational axis of the developing roller, wherein the casing includes a groove open to outside of the casing, the groove extending toward the rotational axis of the photosensitive drum along an extended direction that is perpendicular to the direction of the rotational axis of the photosensitive drum, wherein, as seen in a direction of the rotational axis of the photosensitive drum, the rotational axis of the developing roller, the rotational axis of the photosensitive drum, and the groove are positioned in this order along the extended direction, and wherein a first end of the groove and a second end of the groove are open such that the groove forms a channel in the casing along the extended direction.

12. The cartridge according to claim 11, wherein the coupling member has a rotational axis about which the coupling member is rotatable, wherein the coupling member is movable to (i) a first position in which the rotational axis of the coupling member is coaxial with the rotational axis of the photosensitive drum and (ii) a second position in which the projection of the coupling member is positioned farther from the rotational axis of the developing roller than the projection of the coupling member is from the rotational axis of the developing roller when the coupling member is in the first position, and wherein the arm urges the coupling member to move from the first position to the second position.

13. The cartridge according to claim 12, wherein, when the coupling member receives an urging force from the arm and is in the first position, the coupling member is rotatable to transmit the rotational force to the photosensitive drum.

14. The cartridge according to claim 12, wherein the rotational axis of the coupling member is inclined relative to the rotational axis of the photosensitive drum when the coupling member is in the second position.

15. The cartridge according to claim 12, wherein, when the coupling member is in the first position, the arm is positioned between the rotational axis of the developing roller and the rotational axis of the coupling member.

16. The cartridge according to claim 11, wherein the torsion spring urges the coupling member by contacting the coupling member.

17. The cartridge according to claim 11, wherein the torsion spring further includes a coil portion and the casing includes a supporting projection that supports the coil portion.

18. The cartridge according to claim 11, wherein the casing includes first and second projected parts projected in the direction of the rotational axis of the photosensitive drum and away from the photosensitive drum, wherein, as seen in the direction of the rotational axis of the photosensitive drum, the first projected part, the rotational axis of the photosensitive drum, and the second projected part are positioned in this order in a direction perpendicular to the extended direction.

19. A cartridge comprising:

a photosensitive drum having a rotational axis about which the photosensitive drum is rotatable;

a developing roller having a rotational axis about which the developing roller is rotatable;

a casing rotatably supporting the photosensitive drum and the developing roller;

a coupling member having a rotational axis about which the coupling member is rotatable, the coupling member being operatively connected to the photosensitive drum, the coupling member including at least one projection capable of receiving a rotational force to rotate the photosensitive drum, the coupling member being movable to (i) a first position in which the rotational axis of the coupling member is coaxial with the rotational axis of the photosensitive drum and (ii) a second position in which the projection of the coupling member is positioned farther from the rotational axis of the developing roller than the projection of the coupling member is from the rotational axis of the developing roller when the coupling member is in the first position; and a spring including a movable part that is movable relative to the casing and capable of urging the coupling member, wherein, when the coupling member is in the first position, the movable part of the spring is positioned between the rotational axis of the developing roller and the rotational axis of the coupling member, and wherein the movable part of the spring urges the coupling member to move from the first position to the second position, wherein the casing includes a groove open to outside of the casing, the groove extending toward the rotational axis of the photosensitive drum along an extended direction that is perpendicular to the direction of the rotational axis of the photosensitive drum, wherein, as seen in a direction of the rotational axis of the photosensitive drum, the rotational axis of the developing roller, the rotational axis of the photosensitive drum, and the groove are positioned in this order along the extended direction, and wherein a first end of the groove and a second end of the groove are open such that the groove forms a channel in the casing along the extended direction.

20. The cartridge according to claim 19, wherein, when the coupling member receives an urging force from the movable part of the spring and is in the first position, the coupling member is rotatable to transmit the rotational force to the photosensitive drum.

21. The cartridge according to claim 19, wherein the rotational axis of the coupling member is inclined relative to the rotational axis of the photosensitive drum when the coupling member is in the second position.

22. The cartridge according to claim 19, wherein the movable part of the spring urges the coupling member by contacting the coupling member.

23. The cartridge according to claim 19, wherein the spring is a torsion spring.

24. The cartridge according to claim 23, wherein the spring includes an arm as the movable part of the spring.

25. The cartridge according to claim 24, wherein the spring further includes a coil portion and the casing includes a supporting projection that supports the coil portion of the spring.

26. The cartridge according to claim 19, wherein the casing includes first and second projected parts that project in the direction of the rotational axis of the photosensitive drum and away from the photosensitive drum, and wherein, as seen in the direction of the rotational axis of the photosensitive drum, the first projected part, the rotational axis of the photosensitive drum, and the second projected part are positioned in this order in a direction perpendicular to the extended direction.

27. A cartridge comprising:

a photosensitive drum having a rotational axis about which the photosensitive drum is rotatable;

a developing roller having a rotational axis about which the developing roller is rotatable;

a casing rotatably supporting the photosensitive drum and the developing roller, the casing including (i) a surface provided at an end portion of the casing in a direction of the rotational axis of the photosensitive drum, the surface extending toward the rotational axis of the photosensitive drum in a plane that is perpendicular to the rotational axis of the photosensitive drum, and (ii) first, second, and third projected parts that project beyond the surface in the direction of the rotational axis of the photosensitive drum and away from the photosensitive drum, a torsion spring supported by the third projected part, the torsion spring including an arm that is movable relative to the casing in a direction perpendicular to the direction of the rotational axis of the photosensitive drum, wherein, as seen in the direction of the rotational axis of the photosensitive drum, (i) the rotational axis of the developing roller, the rotational axis of the photosensitive drum, and at least a portion of the surface are positioned in this order along a direction that is perpendicular to the rotational axis of the photosensitive drum, (ii) at least a portion of the arm is positioned between the rotational axis of the developing roller and the surface along the direction that is perpendicular to the rotational axis of the photosensitive drum, and (iii) at least a portion of first projected part is positioned on one side of a line extending along the direction that is perpendicular to the rotational axis of the photosensitive drum and at least a portion of the second projected part is positioned on the other side of the line.

28. The cartridge according to claim 27, further comprising a flange including a gear portion, the flange being connected to an end portion of the photosensitive drum, and the gear portion being positioned at the end portion of the casing.

29. The cartridge according to claim 27, wherein the first projected part includes an arcuate surface.

30. The cartridge according to claim 27, wherein the casing includes an arcuate surface positioned adjacent to the surface, and wherein, as seen in the direction of the rotational axis of the photosensitive drum, the arcuate surface forms an arcuate projection projected in a direction away from the rotational axis of the photosensitive drum.

31. The cartridge according to claim 27, wherein the first and second projected parts are separate from each other.

32. The cartridge according to claim 27, wherein the first and second projected parts are connected by a fourth projected part such that the first, second, and fourth projected parts form a combined structure that extends part way about the rotational axis of the photosensitive drum.

33. A cartridge comprising:

a photosensitive drum having a rotational axis about which the photosensitive drum is rotatable;

a developing roller having a rotational axis about which the developing roller is rotatable;

a casing rotatably supporting the photosensitive drum and the developing roller, the casing including (i) a surface provided at an end portion of the casing in a direction of the rotational axis of the photosensitive drum, the surface extending toward the rotational axis of the photosensitive drum in a plane that is perpendicular to the rotational axis of the photosensitive drum, and (ii) first, second, and third projected parts that project beyond the surface in the direction of the rotational axis of the photosensitive drum and away from the photosensitive drum;

a coupling member operatively connected to the photosensitive drum, the coupling member including at least one projection capable of receiving a rotational force to rotate the photosensitive drum; and a torsion spring supported by the third projected part, the torsion spring including an arm that is movable relative to the casing to urge the coupling member so that at least the projection of the coupling member moves away from the rotational axis of the developing roller, wherein, as seen in the direction of the rotational axis of the photosensitive drum, (i) the rotational axis of the developing roller, the rotational axis of the photosensitive drum, and at least a portion of the surface are positioned in this order along a direction that is perpendicular to the rotational axis of the photosensitive drum, (ii) at least a portion of the arm is positioned between the rotational axis of the developing roller and the surface along the direction that is perpendicular to the rotational axis of the photosensitive drum, and (iii) at least a portion of first projected part is positioned on one side of a line extending along the direction that is perpendicular to the rotational axis of the photosensitive drum and at least a portion of the second projected part is positioned on the other side of the line.

34. The cartridge according to claim 33, further comprising a flange including a gear portion, the flange being connected to an end portion of the photosensitive drum, and the gear portion being positioned at the end portion of the casing.

35. The cartridge according to claim 33, wherein the first projected part includes an arcuate surface.

36. The cartridge according to claim 33, wherein the casing includes an arcuate surface positioned adjacent to the surface, and wherein, as seen in the direction of the rotational axis of the photosensitive drum, the arcuate surface forms an arcuate projection projected in a direction away from the rotational axis of the photosensitive drum.

37. The cartridge according to claim 33, wherein the first and second projected parts are separate from each other.

38. The cartridge according to claim 33, wherein the first and second projected parts are connected by a fourth projected part such that the first, second, and fourth projected parts form a combined structure that extends part way about the rotational axis of the photosensitive drum.

39. The cartridge according to claim 33, wherein, when the arm of the torsion spring urges the coupling member, a rotational axis of the coupling member is inclined relative to the rotational axis of the photosensitive drum so that at least the projection of the coupling member moves away from the rotational axis of the developing roller.

* * * * *